(12) United States Patent
Baldachin et al.

(10) Patent No.: US 9,787,753 B2
(45) Date of Patent: Oct. 10, 2017

(54) NETWORK COMMUNICATIONS

(71) Applicant: 5TH TIER LIMITED, London (GB)

(72) Inventors: Jon Baldachin, London (GB); Raif Awaida, London (GB)

(73) Assignee: 5TH TIER LIMITED, London (GB)

( * ) Notice: Subject to any disclaimer, the term of this patent is extended or adjusted under 35 U.S.C. 154(b) by 363 days.

(21) Appl. No.: 14/578,052

(22) Filed: Dec. 19, 2014

(65) Prior Publication Data

US 2015/0106442 A1   Apr. 16, 2015

Related U.S. Application Data

(63) Continuation of application No. PCT/GB2013/051660, filed on Jun. 24, 2013.
(Continued)

(30) Foreign Application Priority Data

Jun. 22, 2012 (GB) .................................. 1211172.0
Jun. 22, 2012 (GB) .................................. 1211173.8
(Continued)

(51) Int. Cl.
*H04L 29/08* (2006.01)
*G06Q 30/02* (2012.01)
(Continued)

(52) U.S. Cl.
CPC ........ *H04L 67/02* (2013.01); *G06F 17/30899* (2013.01); *G06Q 30/0251* (2013.01);
(Continued)

(58) Field of Classification Search
CPC .......... G06F 17/30899; G06Q 30/0251; G06Q 30/0273
(Continued)

(56) References Cited

U.S. PATENT DOCUMENTS 6,052,730 A * 4/2000 Felciano ............. G06F 11/3476
709/203
6,067,565 A   5/2000 Horvitz
(Continued)

FOREIGN PATENT DOCUMENTS

WO   0030008 A1   5/2000
WO   0167313 A1   9/2001
(Continued)

OTHER PUBLICATIONS

"Handling The Client Request: HTTP Request Headers"—Prentice Hall and Sun Microsystems Press, Jun. 2010 http://pdf.coreservlets.com/HTTP-Request-Headers.pdf.*
(Continued)

*Primary Examiner* — Randy Scott
(74) *Attorney, Agent, or Firm* — EIP US LLP

(57) ABSTRACT

Measures, including methods, apparatus and non-transitory computer-readable storage mediums, are provided for processing browser sessions in a telecommunications network, the telecommunications network comprising a service provider network operated by a service provider responsible for providing telecommunications services to a plurality of subscriber client devices. The measures include, at an entity in the service provider network: receiving, from a subscriber client device in the plurality, a browser session request; transmitting the browser session request to a server entity located outside the service provider network; receiving, from the server entity, a browser session response in relation to the transmitted browser session request; transmitting the browser session response to the subscriber client device; and modifying, prior to the respective transmittal, at least one of the browser session request and the browser session response according to one or more browser session processing modification rules.

20 Claims, 28 Drawing Sheets

Related U.S. Application Data

(60) Provisional application No. 61/663,055, filed on Jun. 22, 2012.

(30) Foreign Application Priority Data

| Jun. 22, 2012 | (GB) | 1211174.6 |
| Jun. 22, 2012 | (GB) | 1211175.3 |
| Jun. 22, 2012 | (GB) | 1211176.1 |
| Jun. 22, 2012 | (GB) | 1211177.9 |

(51) Int. Cl.
*G06F 17/30* (2006.01)
*H04L 29/06* (2006.01)

(52) U.S. Cl.
CPC ..... *G06Q 30/0273* (2013.01); *G06Q 30/0277* (2013.01); *H04L 67/20* (2013.01); *H04L 67/28* (2013.01); *H04L 67/2823* (2013.01); *H04L 67/42* (2013.01)

(58) Field of Classification Search
USPC .............. 709/203, 217, 219, 235; 705/14.46, 705/14.73, 26.3
See application file for complete search history.

(56) References Cited

U.S. PATENT DOCUMENTS

| 6,487,538 | B1 | 11/2002 | Gupta |
| 2002/0078191 | A1* | 6/2002 | Lorenz ................ H04L 29/06 709/223 |
| 2006/0036366 | A1 | 2/2006 | Kelly |
| 2006/0267783 | A1 | 11/2006 | Smith |
| 2007/0233857 | A1 | 10/2007 | Cheng |
| 2007/0291739 | A1 | 12/2007 | Sullivan et al. |
| 2008/0120697 | A1* | 5/2008 | Beyer ................ H04L 63/0869 726/4 |
| 2008/0300974 | A1* | 12/2008 | Bhandari ............... G06Q 30/02 705/14.46 |
| 2008/0310446 | A1 | 12/2008 | Bellwood |
| 2010/0153838 | A1 | 6/2010 | Arnold |
| 2010/0306052 | A1 | 12/2010 | Britton et al. |
| 2011/0044167 | A1 | 2/2011 | Kalonji |
| 2011/0151863 | A1 | 6/2011 | Shaw |
| 2011/0276627 | A1* | 11/2011 | Blechar ................ G06F 21/41 709/203 |
| 2011/0302323 | A1 | 12/2011 | Fisk et al. |

FOREIGN PATENT DOCUMENTS

| WO | 2006081680 A1 | 8/2006 |
| WO | 2009092586 A1 | 7/2009 |
| WO | 2010049919 A1 | 5/2010 |

OTHER PUBLICATIONS

International Search Report issued Feb. 5, 2014 on related PCT application PCT/GB2013/051660 filed Jun. 24, 2013.

* cited by examiner

NETWORK COMMUNICATIONS

CROSS-REFERENCE TO RELATED APPLICATIONS

This application is a continuation under 35 U.S.C. §120 of International Application No. PCT/GB2013/051660, filed Jun. 24, 2013 (published by the International Bureau as International Publication No. WO/2013/190334 on Dec. 27, 2013), which claims priority to U.S. Provisional Patent Application No. 61/663,055, filed Jun. 22, 2012, and which also claims priority to foreign Patent Application Nos. GB 1211177.9, GB 1211176.1, GB 1211175.3, GB 1211174.6, GB 1211173.8, and GB 1211172.0, each of which was filed on Jun. 22, 2012. The entire contents of each of the above-referenced applications are hereby incorporated by reference.

BACKGROUND OF THE INVENTION

Field of the Invention

The present invention relates to network communications. In particular, but not exclusively, the present invention relates to processing browser sessions in a telecommunications network.

Description of the Related Technology

Users who wish to access data stored at a remote location typically do so via a telecommunications network, such as the internet. In order to transmit and receive data via a telecommunications network, users conventionally subscribe to a telecommunications service provided by a telecommunications service provider. A telecommunications service typically provides access to a wider telecommunications network for a given subscriber client device, a group of subscriber client devices, or a residential or commercial premises network associated with a given subscriber. The service provider network typically performs subscriber authentication and comprises a routing fabric for routing traffic between an authenticated subscriber and the wider telecommunications network. A service provider may comprise a carrier, a mobile network operator (MNO) or an internet service provider (ISP). Subscriber client devices may include personal computers, laptop computers, mobile telephones (including "smart phones"), tablet computers, personal digital assistants, etc.

FIG. 1 shows an example of a conventional telecommunications network 100. A subscriber client device 102 may initially access a service provider network part 104 of the telecommunications network 100, which contains various entities provisioned by the service provider (not shown). Such service provider entities may be responsible for authentication of subscribers/subscriber client devices, access management, billing, etc. The service provider network 104 also typically acts as a gateway between subscriber client device 102 and a wider network 106, such as the public internet. The wider network 106 is, at least in part, used to route data between service provider network 104 and one or more server entities 108. Telecommunications network 100 may also comprise a number of further network parts (not shown), and a number of border/gateway/caching entities (not shown) used to translate between the various network protocols used in each network part where necessary, cache and serve commonly accessed data so as to reduce load between network parts, and/or manage access to each network part.

Access to data via telecommunications network 100 is typically enabled using browser software or other applications (hereinafter "a browser") on subscriber client device 102. Other applications on subscriber client device 102 may include games or software utilities that also require access to content via telecommunications network 100. For example, some applications accrue revenue by displaying advertisement content to their users. Such advertisement content is typically regularly updated and hosted at a server entity in telecommunications network 100. The application may therefore require access to the server entity via telecommunications network 100 in order to obtain up-to-date advertisement content to display to its users.

A browser enables subscriber client device 102 to take part in a browser session, which comprises a series of one or more requests and responses made to and received from one or more remote entities, such as server entity 108, via telecommunications network 100. A browser may be used to view web pages, obtain files, conduct services such as instant messaging, etc. via telecommunications network 100. Browser session requests and responses typically comprise one or more data packets. Such packetized data is formatted and transported according to one or more network protocols, used in a given part of the network.

FIG. 2 shows an example of a conventional request and response message flow used to obtain data from a server entity 108 over telecommunications network 100 at subscriber client device 102 during a browser session. At step 2a, a request for data is transmitted in the form of a browser session request from subscriber client device 102 into telecommunications network 100, directed at server 108 (for example using a uniform resource locator (URL) or internet protocol (IP) address). Telecommunications network 100 then routes the browser session request to server entity 108 as shown in step 2b; such routing is known in the art and may involve steps such as performing a domain name system (DNS) lookup (not shown) and forwarding by one or more network nodes (not shown).

Server entity 108 then processes the browser session request in order to generate a corresponding browser session response. The response may comprise session control information such as status, and/or data such as a web page or a web page element (such as an image) if the browser session request requested such. At step 2c, server entity 108 transmits the generated browser session response into telecommunications network 100, directed at subscriber client device 102. Telecommunications network 100 then routes the browser session response to subscriber client device 102 as shown in step 2d.

Some browser sessions may contain a series of multiple browser session requests and browser session responses. This will be the case, for example, if the subscriber browses to multiple web pages consecutively in the given browser session. Often, a series of multiple requests and responses will be required to view a single web page. This is particularly true if different elements of the web page are hosted at different server entities. A common example is encountered when a web page includes one or more advertisement elements.

FIG. 3 shows an example of a conventional telecommunications network 100, wherein the various elements of a given web page are hosted across multiple server entities 108a and 108b. The functionality of subscriber client device 102, service provider network part 104, and wider network part 106 are the same as described previously in relation to FIG. 1. However, telecommunications network 100 now comprises multiple server entities 108a and 108b. According to this example, server entity 108a comprises a primary (page) server entity, which hosts a given web page. Primary (page) server entity 108a may be associated with a content publisher or similar entity. Server entity 108b comprises a secondary (element) server entity, which hosts one or more elements of the given web page hosted by primary (page) server entity 108a. Secondary (element) server entity 108b may be associated with a third party content supplier, an advertiser or similar entity.

FIG. 4 shows an example of a conventional request and response message flow used to obtain a complete web page hosted across multiple server entities 108a and 108b via telecommunications network 100 at subscriber client device 102. At step 4a, a browser session request for the given web page is transmitted from subscriber client device 102 into telecommunications network 100, in this case using a URL for the desired web page. Telecommunications network 100 then routes the browser session request to primary (page) server entity 108a as shown in step 4b, for example by performing a DNS lookup for the requested URL to obtain an IP address for primary (page) server entity 108a.

Primary (page) server entity 108a then processes the browser session request of step 4b in order to generate a corresponding browser session response. In this case, the response comprises a web page, which may include some but not all of the web page elements required to view the complete requested web page. For the one or more web page elements that are missing, primary (page) server entity 108a inserts instructions into the browser session response which serves to direct subscriber client device 102 to obtain the missing web page elements from secondary (element) server 108b. Such instructions may comprise one or more further URLs for the missing web page elements. At step 4c, primary (page) server entity 108a transmits the generated browser session response into telecommunications network 100, directed at subscriber client device 102. Telecommunications network 100 then routes the browser session response to subscriber client device 102 as shown in step 4d.

Upon receipt of browser session response 4d, subscriber client device 102 is able to display (or 'render') part of the requested web page. However, in order to display the complete requested web page, subscriber client device 102 must request the missing elements of the web page from secondary (element) server entity 108b. Hence, in step 4e, a browser session request for the one or more missing web page elements is transmitted from subscriber client device 102 into telecommunications network 100, in this case using a URL for the desired web page elements. Telecommunications network 100 then routes the browser session request of step 4e to secondary (element) server entity 108b as shown in step 4f, for example by performing a further DNS lookup for the requested URL to obtain an IP address for secondary (element) server entity 108b.

Secondary (element) server entity 108b then processes the browser session request of step 4f in order to generate a corresponding browser session response. In this case, the response comprises the one or more missing web page elements required to render the complete previously requested web page. At step 4g, secondary (element) server entity 108b transmits the generated browser session response into telecommunications network 100, directed at subscriber client device 102. Telecommunications network 100 then routes the browser session response of step 4g to subscriber client device 102 as shown in step 4h. Upon receipt of browser session response 4h, subscriber client device 102 is able to display the entirety of the originally requested web page.

In some circumstances, the browser session response from primary (page) server 108a may include instructions which serve to direct subscriber client device 102 to obtain multiple missing web page elements from each of a plurality of secondary (element) server entities. In some circumstances, the browser session response from secondary (element) server 108b may include instructions which serve to direct subscriber client device 102 to obtain further missing web page elements from one or more tertiary server entities, and so on.

Network provisioning relates to the allocation of various network resources to entities or communication links in the telecommunication network. This may include the allocation of link resources such as bandwidth or quality of service, or processing resources of one or more service providing network entities, such as content servers or transcoders.

Conventional provisioning is commonly performed on the basis of network logging, such as monitoring the volume of traffic over the network, the types of data accessed, the number of users that access or utilize a certain network resource over a given period of time and so on. Offline analysis is then performed to determine a required provisioning level to support an expected level of use or access. A static provisioning is then applied to the network on the outcome of the offline analysis until the next period of analysis, for example configuring the network to route traffic accordingly, or mirroring/caching content with a high expected demand.

The examples above give an outline of conventional methods and systems for processing browser sessions and network provisioning in a telecommunications network.

SUMMARY

In accordance with various embodiments, improved methods and systems for processing browser sessions and/or network provisioning in a telecommunications network are provided.

In accordance with first embodiments, there is provided a method of processing browser sessions in a telecommunications network, the telecommunications network comprising a service provider network operated by a service provider responsible for providing telecommunications services to a plurality of subscriber client devices, the method comprising, at an entity in the service provider network: receiving, from a subscriber client device in the plurality, a browser session request; transmitting the browser session request to a server entity located outside the service provider network; receiving, from the server entity, a browser session response in relation to the transmitted browser session request; transmitting the browser session response to the subscriber client device; and modifying, prior to the respective transmittal, at least one of the browser session request and the browser session response according to one or more browser session processing modification rules.

In accordance with second embodiments, there is provided an apparatus for use in processing browser sessions in a telecommunications network, the telecommunications network comprising a service provider network operated by a service provider responsible for providing telecommunications services to a plurality of subscriber client devices, the apparatus comprising at least one processor and at least one memory including computer program code, the at least one memory and the computer program code being configured to, with the at least one processor, cause the apparatus at least to, at an entity in the service provider network: receive, from a subscriber client device in the plurality, a browser session request; transmit the browser session request to a server entity located outside the service provider network;

receive, from the server entity, a browser session response in relation to the transmitted browser session request; transmit the browser session response to the subscriber client device; and modify, prior to the respective transmittal, at least one of the browser session request and the browser session response according to one or more browser session processing modification rules.

In accordance with third embodiments, there is provided computer software adapted to perform a method for processing browser sessions in a telecommunications network, the telecommunications network comprising a service provider network operated by a service provider responsible for providing telecommunications services to a plurality of subscriber client devices, the method comprising, at an entity in the service provider network: receiving, from a subscriber client device in the plurality, a browser session request; transmitting the browser session request to a server entity located outside the service provider network; receiving, from the server entity, a browser session response in relation to the transmitted browser session request; transmitting the browser session response to the subscriber client device; and modifying, prior to the respective transmittal, at least one of the browser session request and the browser session response according to one or more browser session processing modification rules.

In accordance with fourth embodiments, there is provided a method of processing browser sessions in a telecommunications network, the telecommunications network comprising a service provider network operated by a service provider responsible for providing telecommunications services to a plurality of subscriber client devices, the method comprising, at an entity in the service provider network: receiving, from a subscriber client device in the plurality, a browser session request; transmitting the browser session request to a server entity located inside the service provider network; receiving, from the server entity, a browser session response in relation to the transmitted browser session request; transmitting the browser session response to the subscriber client device; and modifying, prior to the respective transmittal, at least one of the browser session request and the browser session response according to one or more browser session processing modification rules.

In accordance with fifth embodiments, there is provided a method of processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a subscriber client device in the plurality, a browser session request; transmitting the browser session request to a server entity located outside the service provider network; receiving, from the server entity, a browser session response in relation to the transmitted browser session request; transmitting the browser session response to the subscriber client device; performing a lookup in the subscriber profile database for the subscriber client device in the plurality and/or the associated subscriber; and modifying, prior to the respective transmittal, at least one of the browser session request and the browser session response according to the results of the lookup.

In accordance with sixth embodiments, there is provided an apparatus for use in processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the apparatus comprising at least one processor, and at least one memory including computer program code, the at least one memory and the computer program code being configured to, with the at least one processor, cause the apparatus at least to, at an entity in the service provider network: receive, from a subscriber client device in the plurality, a browser session request; transmit the browser session request to a server entity located outside the service provider network; receive, from the server entity, a browser session response in relation to the transmitted browser session request; transmit the browser session response to the subscriber client device; perform a lookup performed in the subscriber profile database for the subscriber client device in the plurality and/or the associated subscriber; and modify, prior to the respective transmittal, at least one of the browser session request and the browser session response according to the results of the lookup.

In accordance with seventh embodiments, there is provided computer software adapted to perform a method for processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a subscriber client device in the plurality, a browser session request; transmitting the browser session request to a server entity located outside the service provider network; receiving, from the server entity, a browser session response in relation to the transmitted browser session request; transmitting the browser session response to the subscriber client device; performing a lookup performed in the subscriber profile database for the subscriber client device in the plurality and/or the associated subscriber; and modifying, prior to the respective transmittal, at least one of the browser session request and the browser session response according to the results of the lookup.

In accordance with eighth embodiments, there is provided a method of processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a subscriber client device in the plurality, a browser session request; transmitting the browser session request to a server entity located inside the service provider network; receiving, from the server entity, a browser session response in relation to the transmitted browser session request; transmitting the browser session response to the subscriber client device; performing a lookup in the subscriber profile database for the subscriber client device in the plurality and/or the associated subscriber; and modifying, prior to the respective transmittal, at least one of the browser session request and the browser session response according to the results of the lookup.

In accordance with ninth embodiments, there is provided a method for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber and/or each associated subscriber client device, the method comprising, at an entity in the service provider network: receiving an indication that a trigger event has occurred; performing a lookup in the subscriber profile database to identify subscriber profile data for at least a given subscriber associated with the indicated trigger event; and initiating delivery of targeted content data associated with the indicated trigger event to at least one of the one or more subscriber client devices associated with the given subscriber.

In accordance with tenth embodiments, there is provided an apparatus for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber and/or each associated subscriber client device, the apparatus comprising, at least one processor, and at least one memory including computer program code, the at least one memory and the computer program code being configured to, with the at least one processor, cause the apparatus at least to, at an entity in the service provider network: receive an indication that a trigger event has occurred; perform a lookup in the subscriber profile database to identify subscriber profile data for at least a given subscriber associated with the indicated trigger event; and initiate delivery of targeted content data associated with the indicated trigger event to at least one subscriber client device associated with the given subscriber.

In accordance with eleventh embodiments, there is provided computer software adapted to perform a method for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber and/or each associated subscriber client device, the method comprising, at an entity in the service provider network: receiving an indication that a trigger event has occurred; performing a lookup in the subscriber profile database to identify subscriber profile data for at least a given subscriber associated with the indicated trigger event; and initiating delivery of targeted content data associated with the indicated trigger event to at least one subscriber client device associated with the given subscriber.

In accordance with twelfth embodiments, there is provided a method of enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a subscriber client device in the plurality, an advertisement content request; transmitting the advertisement content request to an advertisement server entity located outside the service provider network; receiving, from the advertisement server entity, an advertisement content response in relation to the transmitted advertisement content request; transmitting the advertisement content response to the subscriber client device; performing a lookup in the subscriber profile database for the subscriber client device in the plurality and/or the associated subscriber; and modifying, prior to the respective transmittal, at least one of the advertisement content request and the advertisement content response according to the results of the lookup.

In accordance with thirteenth embodiments, there is provided an apparatus for use in enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the apparatus comprising at least one processor, and at least one memory including computer program code, the at least one memory and the computer program code being configured to, with the at least one processor, cause the apparatus at least to, at an entity in the service provider network: receive, from a subscriber client device in the plurality, an advertisement content request; transmit the advertisement content request to an advertisement server entity located outside the service provider network; receive, from the advertisement server entity, an advertisement content response in relation to the transmitted advertisement content request; transmit the advertisement content response to the subscriber client device; perform a lookup in the subscriber profile database for the subscriber client device in the plurality and/or the associated subscriber; and modify, prior to the respective transmittal, at least one of the advertisement content request and the advertisement content response according to the results of the lookup.

In accordance with fourteenth embodiments, there is provided computer software adapted to perform a method for enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a subscriber client device in the plurality, an advertisement content request; transmitting the advertisement content request to an advertisement server entity located outside the service provider network; receiving, from the advertisement server entity, an advertisement content response in relation to the transmitted advertisement content request; transmitting the advertisement content response to the subscriber client device; performing a lookup in the subscriber profile database for the subscriber client device in the plurality and/or the associated subscriber; and modifying, prior to the respective transmittal, at least one of the advertisement content request and the advertisement content response according to the results of the lookup.

In accordance with fifteenth embodiments, there is provided a method of enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a subscriber client device in the plurality, an advertisement content request; transmitting the advertisement content request to an advertisement server entity located inside the service provider network; receiving, from the advertisement server entity, an advertisement content response in relation to the transmitted advertisement content request; transmitting the advertisement content response to the subscriber client device; performing a lookup in the subscriber profile database for the subscriber client device in the plurality and/or the associated subscriber; and modifying, prior to the respective transmittal, at least one of the advertisement content request and the advertisement content response according to the results of the lookup.

In accordance with sixteenth embodiments, there is provided a method for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the method comprising, at an entity in the service provider network: logging information associated with browser session traffic to/from one or more subscriber client devices associated with a given subscriber in the plurality and one or more entities located outside the service provider network; analyzing the logged information in combination with the subscriber profile data contained in the subscriber profile database specific to the given subscriber for the presence of one or more predetermined characteristics; and in response to the analysis indicating the presence of at least one of the one or more predetermined characteristics, initiating delivery of targeted content data associated with the indicated at least one predetermined characteristic to at least one of the one or more subscriber client devices associated with the given subscriber.

In accordance with seventeenth embodiments, there is provided an apparatus for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the apparatus comprising at least one processor, and at least one memory including computer program code, the at least one memory and the computer program code being configured to, with the at least one processor, cause the apparatus at least to, at an entity in the service provider network: log information associated with browser session traffic to/from one or more subscriber client devices associated with a given subscriber in the plurality and one or more entities located outside the service provider network; analyze the logged information in combination with the subscriber profile data contained in the subscriber profile database specific to the given subscriber for the presence of one or more predetermined characteristics; and in response to the analysis indicating the presence of at least one of the one or more predetermined characteristics, initiate delivery of targeted content data associated with the indicated at least one predetermined characteristic to at least one of the one or more subscriber client devices associated with the given subscriber.

In accordance with eighteenth embodiments, there is provided computer software adapted to perform a method for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the method comprising, at an entity in the service provider network: logging information associated with browser session traffic to/from one or more subscriber client devices associated with a given subscriber in the plurality and one or more entities located outside the service provider network; analyzing the logged information in combination with the subscriber profile data contained in the subscriber profile database specific to the given subscriber for the presence of one or more predetermined characteristics; and in response to the analysis indicating the presence of at least one of the one or more predetermined characteristics, initiating delivery of targeted content data associated with the indicated at least one predetermined characteristic to at least one of the one or more subscriber client devices associated with the given subscriber.

In accordance with nineteenth embodiments, there is provided a method for use in network provisioning in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the method comprising, at an entity in the service provider network: monitoring browser session traffic to/from one or more subscriber client devices associated with a given subscriber in the plurality and one or more entities located outside the service provider network; analyzing the monitored browser session traffic in combination with the subscriber profile data contained in the subscriber profile database specific to the given subscriber for the presence of one or more predetermined characteristics; and in response to the analysis indicating the presence of at least one of the one or more predetermined characteristics, provisioning the service provider network on the basis of the indicated at least one predetermined characteristic.

In accordance with twentieth embodiments, there is provided an apparatus for use in network provisioning in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the apparatus comprising at least one processor, and at least one memory including computer program code, the at least one memory and the computer program code being configured to, with the at least one processor, cause the apparatus at least to, at an entity in the service provider network: monitor browser session traffic to/from one or more subscriber client devices associated with a given subscriber in the plurality and one or more entities located outside the service provider network; analyze the monitored browser session traffic in combination with the subscriber profile data contained in the subscriber profile database specific to the given subscriber for the presence of one or more predetermined characteristics; and in response to the analysis indicating the presence of at least one of the one or more predetermined characteristics, provision the service provider network on the basis of the indicated at least one predetermined characteristic.

In accordance with twenty-first embodiments, there is provided computer software adapted to perform a method for use in network provisioning in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the method comprising, at an entity in the service provider network: monitoring browser session traffic to/from one or more subscriber client devices associated with a given subscriber in the plurality and one or more entities located outside the service provider network; analyzing the monitored browser session traffic in combination with the subscriber profile data contained in the subscriber profile database specific to the given subscriber for the presence of one or more predetermined characteristics; and in response to the analysis indicating the presence of at least one of the one or more predetermined characteristics, provisioning the service provider network on the basis of the indicated at least one predetermined characteristic.

In accordance with further embodiments, there is provided a computer program product comprising a non-transitory computer-readable storage medium having computer readable instructions stored thereon, the computer readable instructions being executable by a computerized device to cause the computerized device to perform the method of any of the aforementioned method embodiments.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Embodiments of the present disclosure introduce an intermediate entity into a service provider network between a plurality of subscriber client devices and the wider network, whereby to enable the modification of standard browser session processing to provide enhanced functionality.

Figure 1:
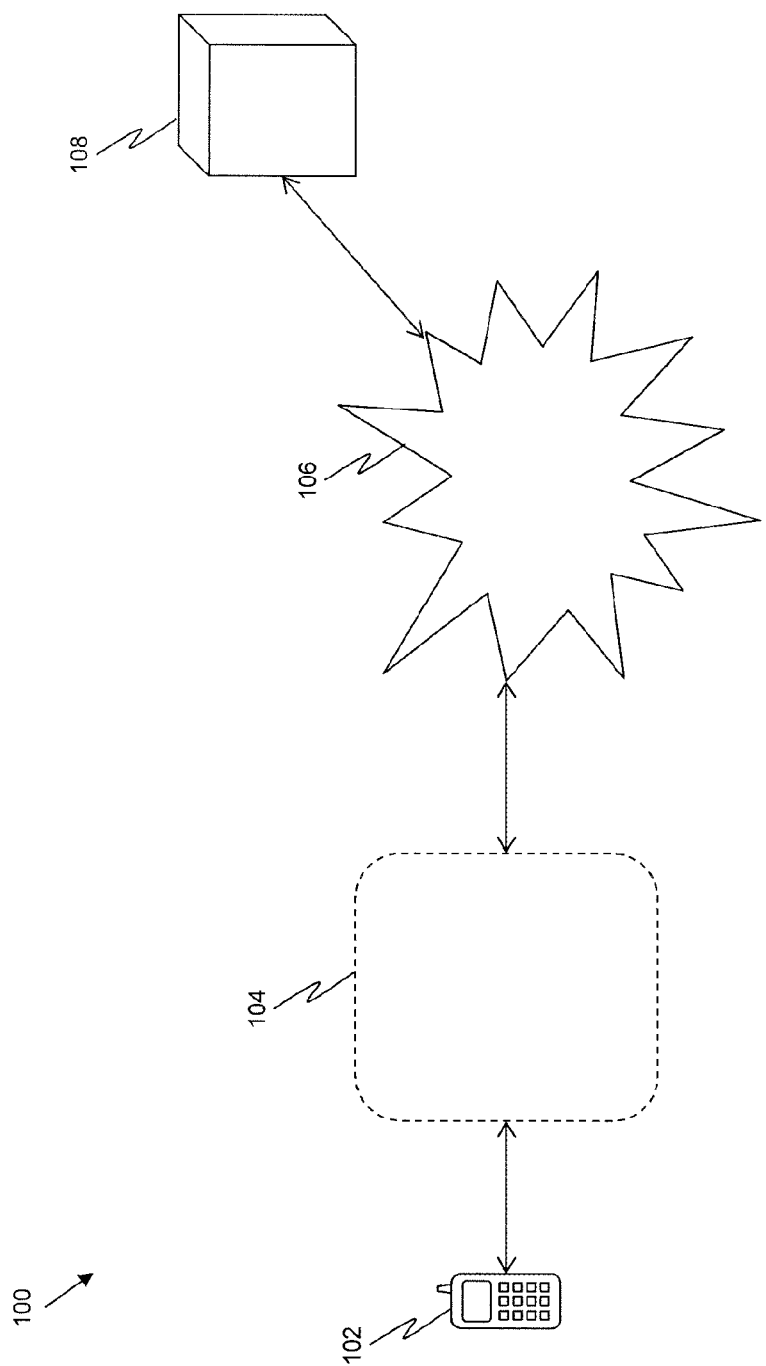
FIG. 1 shows a system diagram according to the prior art.
Figure 2:
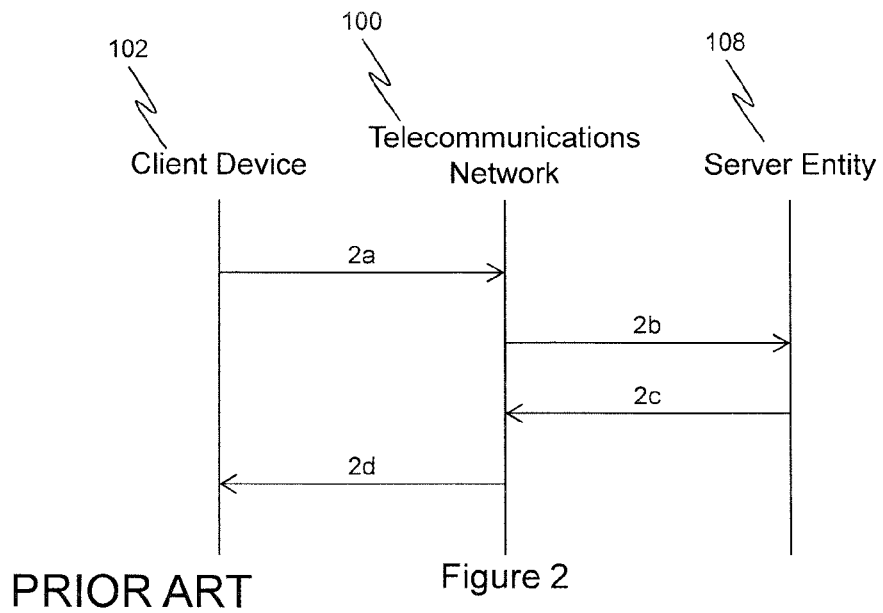
FIG. 2 shows a flow diagram according to the prior art.
Figure 4:
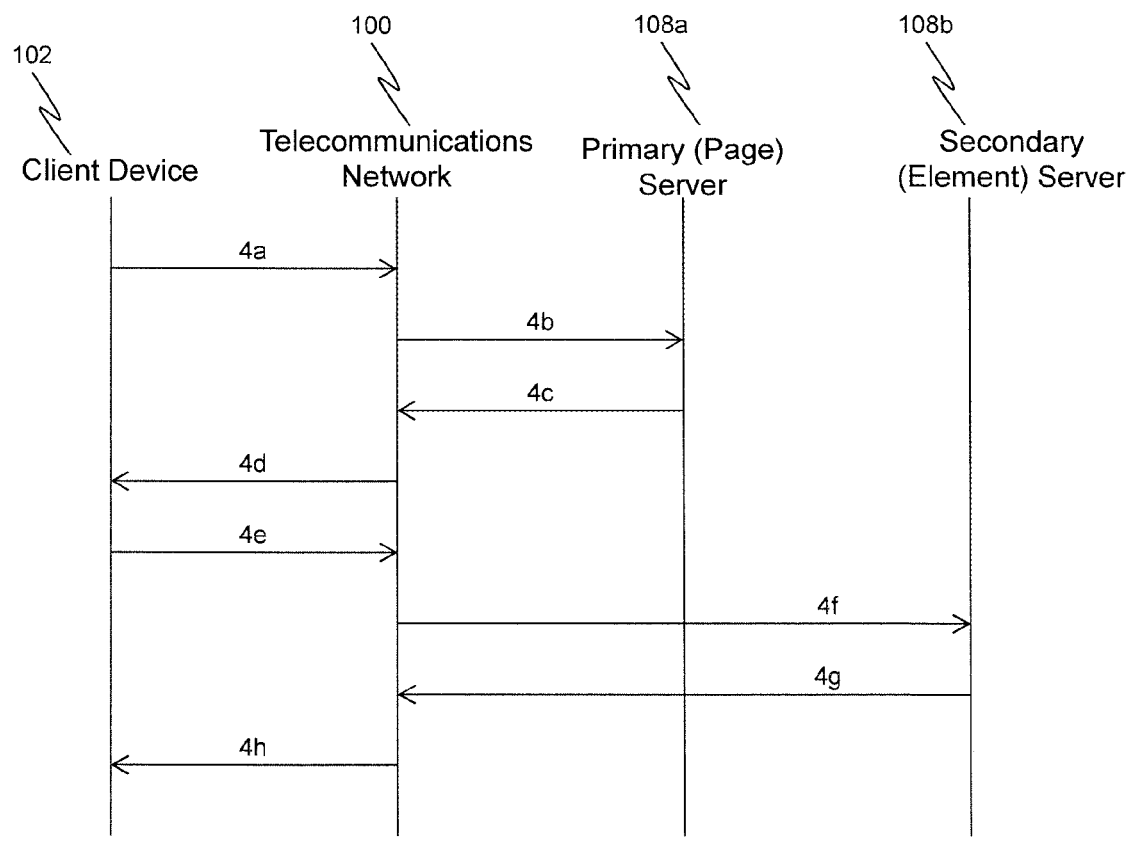
FIG. 4 shows a flow diagram according to the prior art.
Figure 3:
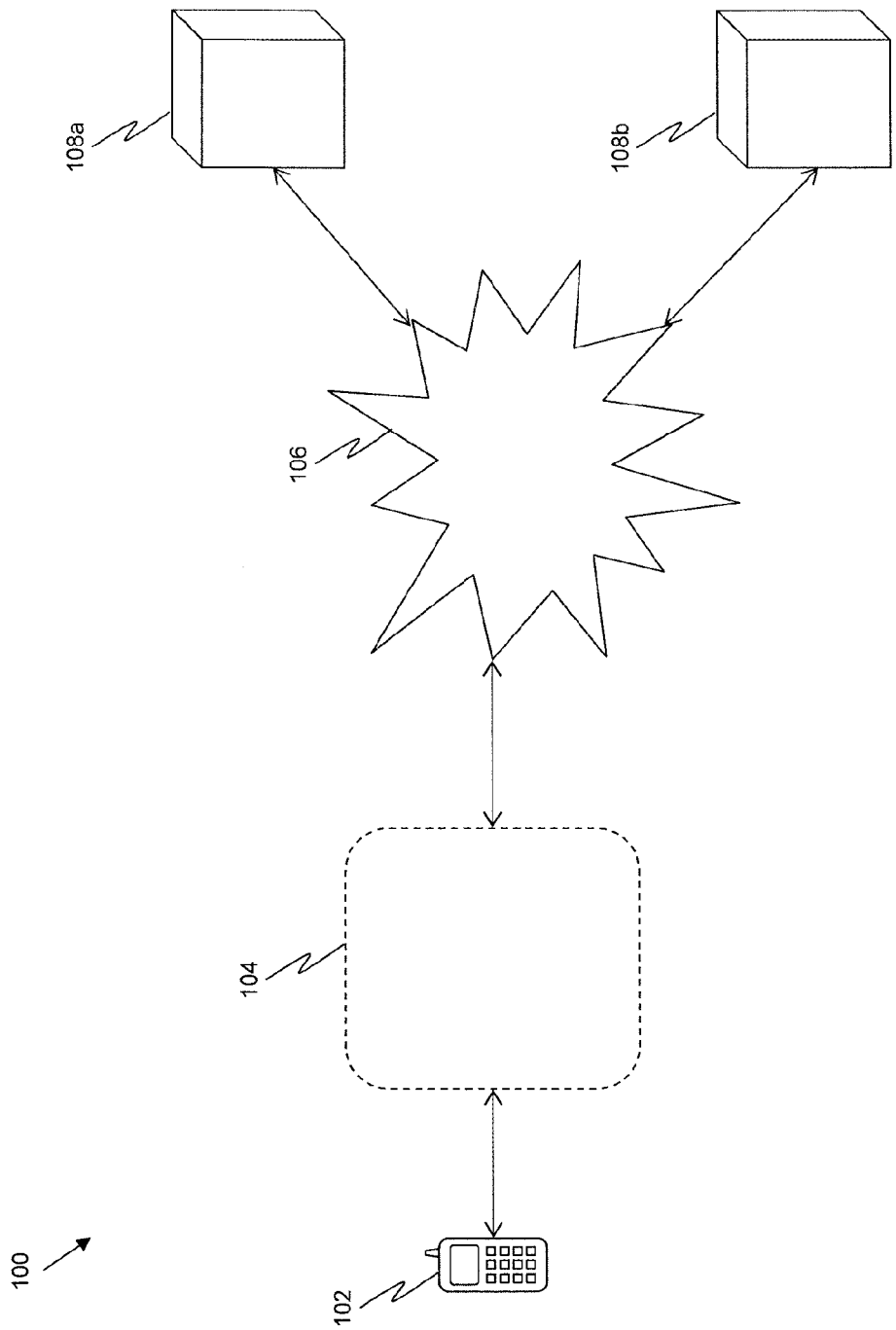
FIG. 3 shows a system diagram according to the prior art.
Figure 5:
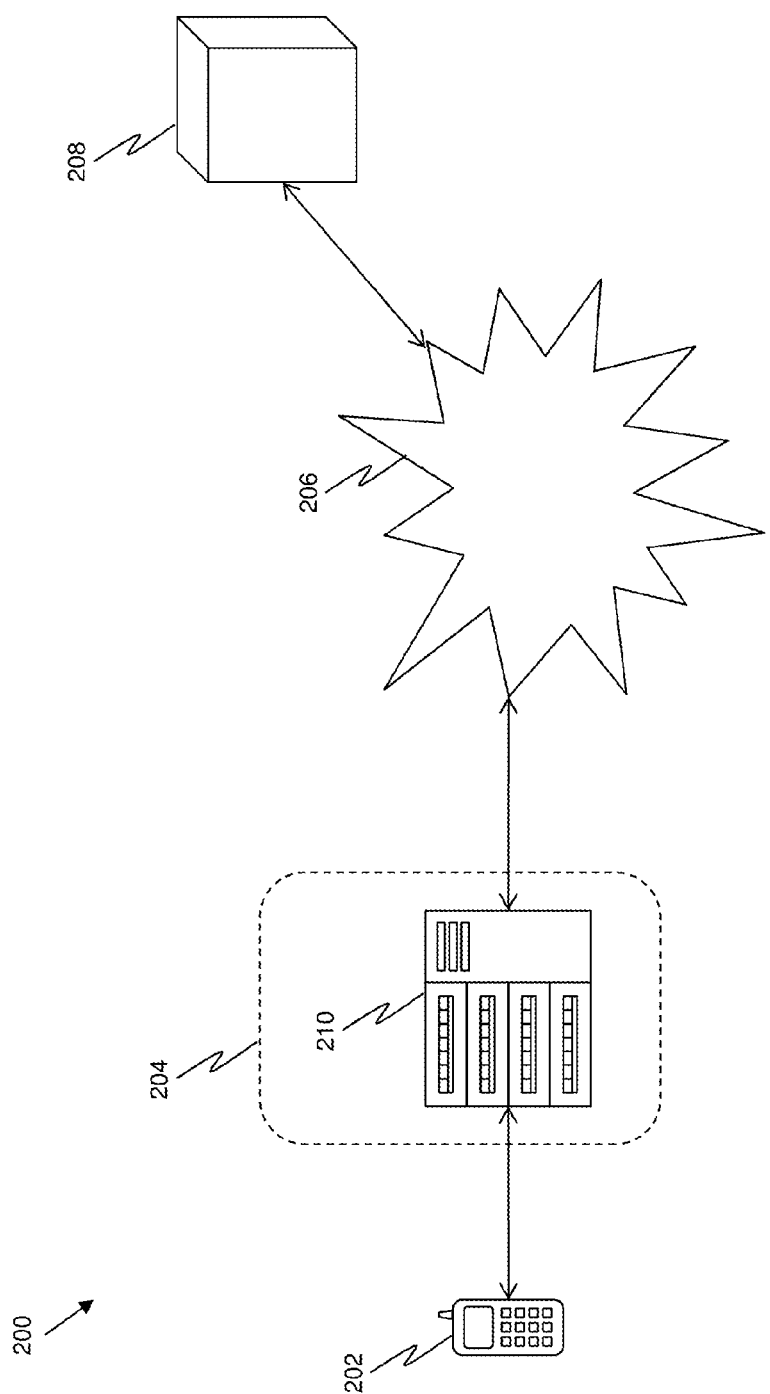
FIG. 5 shows a system diagram according to embodiments.

FIG. 5 shows a telecommunications network 200 according to embodiments of the present disclosure. Telecommunications network 200 comprises at least service provider network part 204 and wider network part 206. Telecommunications network 200 may additionally comprise further network parts (not shown), and or border/gateway/caching entities (not shown) for translating between the various network protocols used in each network part, caching and serving commonly accessed data so as to reduce load between network parts and/or managing access to each network part. Service provider network part 204 is responsible for providing telecommunications services to a plurality of subscriber client devices, including at least subscriber client device 202. A subscriber client device may be configured to communicate voice and data. Examples of subscriber client devices may include personal computers, laptop computers, mobile telephones (including "smart phones"), tablet computers, personal digital assistants, etc.

According to embodiments, service provider network part 204 comprises a carrier network operated by a carrier. According to embodiments, service provider network part 204 comprises a mobile network (which may be in the form of a cellular network) operated by a mobile network operator (MNO). According to embodiments, service provider network part 204 comprises an internet service provider network operated by an internet service provider (ISP). According to embodiments, service provider network part 204 comprises one or more wireless local area network (WLAN) parts, which may for example operate according to an Institute of Electrical and Electronics Engineers (IEEE) 802.11 "Wi-Fi" protocol. Wider network part 206 is responsible for routing traffic (e.g. packetized data traffic encoded according to the Hypertext Transfer Protocol (HTTP)) to and from one or more server entities accessible via wider network part 206, including at least server entity 208.

An intermediate entity 210 is introduced into service provider network 204 between subscriber client device 202 and wider network part 206. Intermediate entity 210 may be physically located in service provider network 204, or logically located in service provider network 204 through the use of, for example, a virtual or backhaul private network, but physically located/hosted elsewhere. Service provider network 204 is adapted to route browser session traffic between subscriber client device 202 and wider network part 206 via intermediate entity 210. Intermediate entity 210 is configured to process browser session traffic according to one or more browser session processing modification rules. According to embodiments, the browser session processing modification rules are defined by the service provider. According to further embodiments, the browser session processing modification rules are initially defined by an equipment supplier, with subsequent browser session processing modification rules being defined by the service provider. According to further embodiments, the defined browser session processing modification rules are configured by a rules administration entity.

In accordance with the browser session processing modification rules, modifications may be made to one or more browser session requests and/or browser session responses comprised in a given browser session between a subscriber client device 202 and one or more server entities, such as server entity 208. Embodiments of the present disclosure utilize a rules engine to process the one or more browser session requests and/or browser session responses according to the browser session processing modification rules. Rules engine is comprised in intermediate entity 210, for example in the form of an installed software application.

By modifying one or more browser session requests and/or browser session responses at intermediate entity 210 in service provider network part 204, embodiments are in contrast to known modification techniques wherein modification is performed by one or more of: a browser on a subscriber client device (according to code running locally on the browser), a server (during construction of a browser session response), a border entity responsible for managing access to a given network part, a gateway entity responsible for translating between network protocols used in different network parts, a caching entity responsible for caching and serving data commonly requested between network parts, a network device outside of the carrier entity, or an encoding entity responsible for modifying browser session traffic for efficient routing. Thus, in certain embodiments, the modification is not performed by a browser on a subscriber client device, by a server during construction of a browser session response, a border entity responsible for managing access to a given network part, a gateway entity responsible for translating between network protocols used in different network parts, a caching entity responsible for caching and serving data commonly requested between network parts, a network device outside of the carrier entity, and/or an encoding entity responsible for modifying browser session traffic for efficient routing.

Further, according to embodiments, by modifying one or more browser session requests and/or browser session responses at intermediate entity 210 in service provider network part 204, the received browser session requests and browser session responses comprise sufficient information to enable routing between subscriber client device 202 and wider network part 206 prior to modification by intermediate entity 210. This is in contrast to the known modification techniques described above, wherein modification at the mentioned locations takes place during the generation of the given browser session request/browser session response, or during modification for conventional traffic routing operations.

According to embodiments, service provider network 204 comprises a routing fabric, responsible for routing traffic between subscriber client device 202 and wider network part 206. The service provider network 204 may include a routing system that selects the route for calls or data. According to embodiments, intermediate entity 210 is located in the routing fabric of service provider network 204. Conventionally, the routing fabric of the service provider network is reserved for routing only, and not the modification of browser session traffic. However, embodiments adapt the routing fabric through the introduction of intermediate entity 210.

Figure 6:
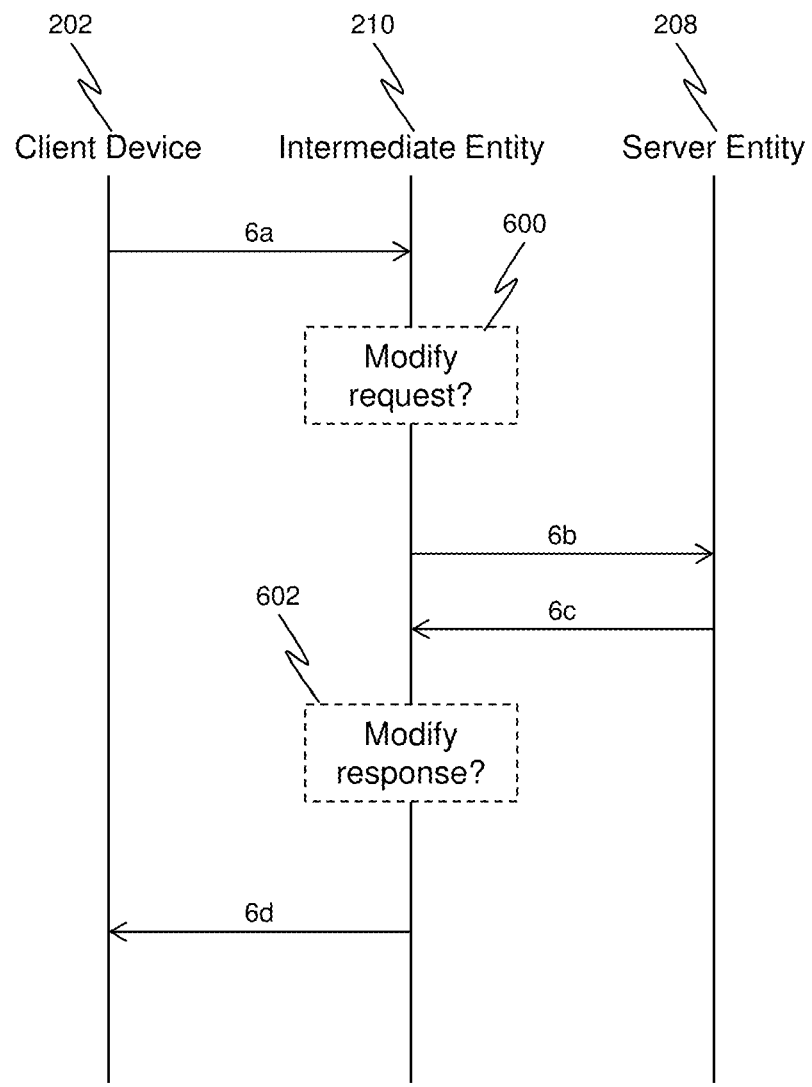
FIG. 6 shows a flow diagram according to embodiments.

FIG. 6 illustrates the operation of intermediate entity 210 in the context of a browser session taking place between subscriber client device 202 and server entity 208. At step 6a, a browser session request is transmitted from subscriber client device 202 into telecommunications network 200. The browser session request of step 6a could comprise a request for a web page, web page element, data file, service, etc. As service provider network 204 is configured to route all browser session traffic via intermediate entity 210, the browser session request is then received at intermediate entity 210 in the service provider network.

Having received the browser session request in step 6a, intermediate entity 210 then processes the received browser session request according to the one or more browser session processing modification rules. As a result of the processing, intermediate entity 200 may modify the received browser session request at step 600. Having processed the browser session request, the processed browser session request is then transmitted, in step 6b, to server entity 208.

Upon receipt of the browser session request transmitted in step 6b, server entity 208 processes the browser session request in order to generate a corresponding browser session response. At step 6c, server entity 208 transmits the generated browser session response into telecommunications network 200, directed at subscriber client device 202. As service provider network 204 is configured to route all browser session traffic via intermediate entity 210, upon entering service provider network 204, the browser session response of step 6c is then received at intermediate entity 200 in service provider network 204.

Having received the browser session request in step 6c, intermediate entity 210 then processes the received browser session response according to the one or more browser session processing modification rules. As a result of the processing, intermediate entity 200 may modify the received browser session response at step 602. Having processed the browser session response, the processed browser session response is then transmitted, in step 6d, to subscriber client device 202.

By defining the browser session processing modification rules, the service provider is able to provide a number of enhanced browser session processing features compared to conventional browser session processing.

According to some embodiments, the browser session request of step 6a comprises a request for a web page. In such cases, server entity 208 typically comprises a publisher server entity. By defining the browser session processing modification rules accordingly, the browser session processing can be made to cause the subscriber client device to receive modified web page content as a result of a modification made to either the browser session request of step 6a in step 600 or the browser session response of step 6c in step 602. In situations where such modification is desirable for a publisher entity associated with the publisher server entity, revenue can be obtained from the publisher entity for carrying out the modification, i.e. on the basis of the modification.

According to some embodiments, the browser session request of step 6a comprises a request for a web page element. In some embodiments, server entity 208 may comprise an advertisement server entity. By defining the browser session processing modification rules accordingly, the browser session processing can be made to cause the subscriber client device to receive modified advertisement content as a result of a modification made to either the browser session request in step 600 or the browser session response in step 602. In situations where such modification is desirable for an advertiser entity associated with the advertisement server entity, revenue can be obtained from the advertiser entity for carrying out the modification, i.e. on the basis of the modification. In some embodiments, the advertisement server entity may comprise an advertisement broker entity responsible for providing advertisement brokering services to a plurality of advertisement server entities. In some embodiments, the advertiser entity may comprise an advertiser network, responsible for serving adverts on behalf of an advertising agency.

The modification performed as a result of processing the browser session traffic according to the one or more browser session processing modification rules may comprise one or more of: deleting a part of the browser session request, deleting a part of the browser session response, altering a part of the browser session request, altering a part of the browser session response, adding to the browser session request, and adding to the browser session response. This may comprise modifying part of the data, a header or another object such as a cookie.

According to some embodiments, the processing of the browser session traffic can be used to modify the browser session request and/or response by altering a URL in the browser session request and/or the browser session response. This could be used to prevent the service provider's subscribers from accessing illegal, age restricted, or otherwise undesirable content that may breach one or more terms of the service provider's service policy. By modifying a browser session request to alter the target URL, requests for such content can be redirected to a more suitable target, such as an alternative web page that complies with the service provider's service policy, or a web page explaining why the browser session request was not fulfilled as expected. Similarly, by modifying the browser session response to alter one or more URLs contained therein, links to such web pages or web page elements can be replaced with links to more suitable content.

According to some embodiments, the processing of the browser session traffic can be used to modify the browser session response by altering or removing such undesirable content from the browser session response directly. For example web page elements, such as pictures, audio, video, text, etc. that may comprise illegal, age restricted, or otherwise undesirable content may be removed from the browser session response by the modification. Alternatively, the browser session response may be altered to replace such content with content that complies with the service provider's service policy.

According to some embodiments, the modification may comprise modifying the browser session request to include additional data. Hence, when the browser session request is received by server entity 208, server entity 208 receives further information regarding the browser session request, and is thus able to generate a more relevant browser session response. This is particularly advantageous when server entity 208 is an advertisement server entity. In such cases, having further information about the browser session request allows the advertisement server entity to serve more highly relevant adverts to the subscriber. More highly relevant adverts can generate greater revenue for advertisers. Further, more highly relevant adverts can also lead to increased business value for advertisers. Hence, according to some embodiments, revenue is obtained from an advertiser entity for carrying out the modification, i.e. on the basis of the modification of the browser session request.

According to some embodiments, intermediate entity 210 may modify the browser session request to include data representative of the identity of the service provider. Hence, server entity 208 is informed as to the identity of the service provider that provides a service to the originator of the received browser session request, and can thus generate a correspondingly more relevant browser session response.

According to some embodiments, intermediate entity 210 may modify the browser session request to include data representative of the geographical location of the subscriber client device. The geographical location of the subscriber client device can be obtained from known service provider networking operations, such as cell-tower location lookup, and/or cell trilateration. Hence, server entity 208 is informed of the geographical location of the subscriber client device, and can thus generate a correspondingly more relevant browser session response.

According to some embodiments, intermediate entity 210 obtains at least one of the one or more browser session processing modification rules in response to querying a rules database located within the service provider network. In some embodiments, the one or more browser session processing modification rules are remotely configurable. The browser session processing modification rules may be configured by a rules administration entity located within the service provider network, for example operated by an employee of the service provider. Alternatively, the browser session processing modification rules may be configured by a rules administration entity located outside the service provider network, for example operated by a contractor, a subscriber, a law enforcement entity, a regulatory body, etc. In such embodiments, the one or more browser session processing modification rules may be remotely configured in response to receipt of a rule configuration message, for example from a rules administration entity.

Figure 7:
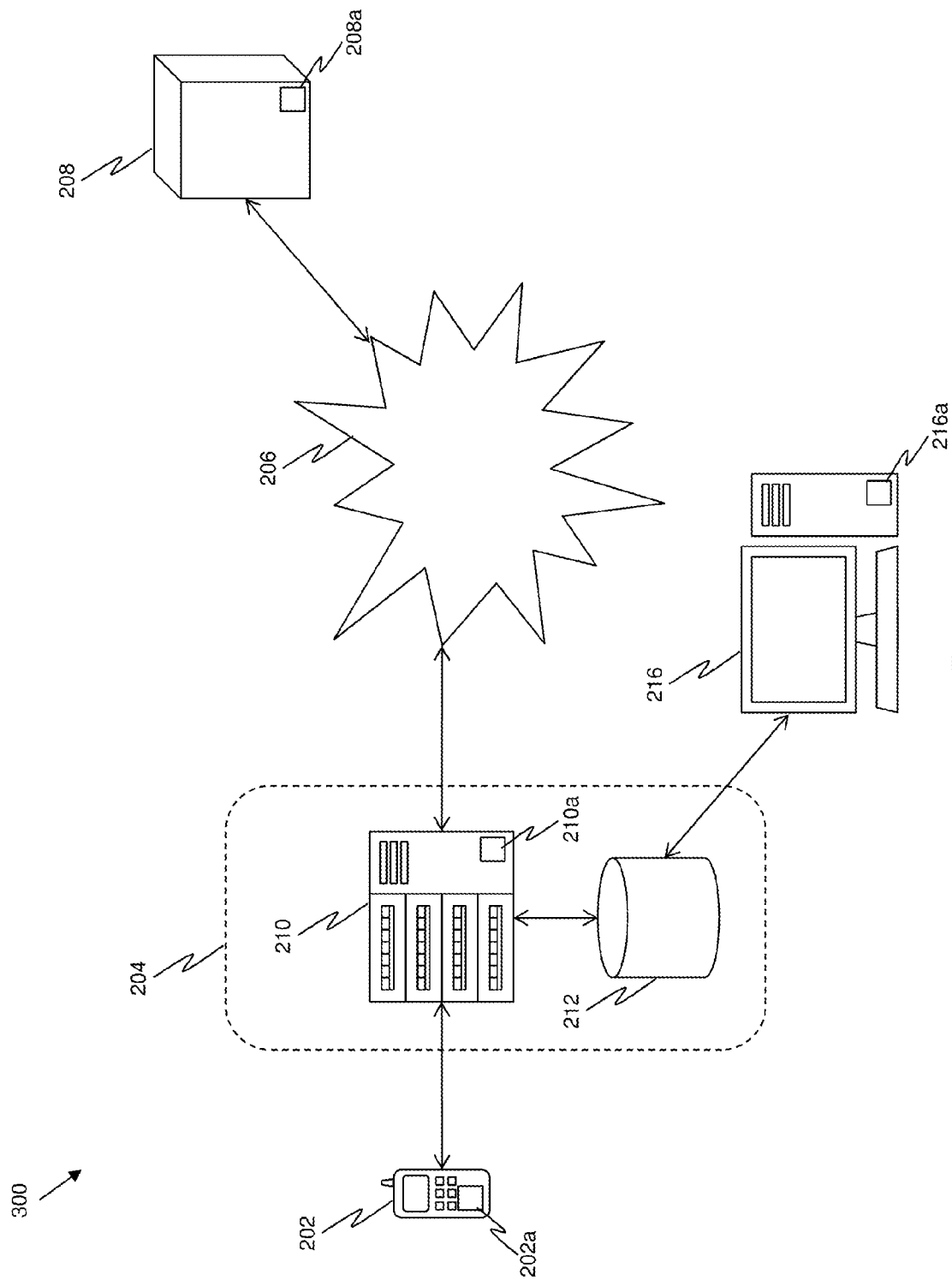
FIG. 7 shows a system diagram according to embodiments.

FIG. 7 shows telecommunications network 300 according to embodiments. The functionality of subscriber client device 202, service provider network part 204, and wider network part 206, server entity 208, and intermediate entity 210 are the same as described above in relation to FIG. 5. However, in the embodiments shown in FIG. 7, service provider network further comprises rules database 212, which contains the one or more browser session processing modification rules. Rules administration entity 216 is capable of configuring the one or more browser session processing modification rules by transmitting a rules configuration message to rules database 212. This may occur via a direct connection to service provider network 204 (as shown) or via wider network part 206. In any of the aforementioned embodiments, one or more of subscriber client device 202, server entity 208, intermediate entity 210 and rules administration entity 216 comprise a processor or a processing system comprising one or more processors and one or more memories (such as a RAM or a ROM), as depicted by processing systems 202a, 208a, 210a and 216a respectively.

One or more of the aspects of the embodiments described herein with reference to the drawings comprise processes performed by one or more of subscriber client device 202, server entity 208, intermediate entity 210 and rules administration entity 216. In embodiments, the subscriber client device 202, server entity 208, intermediate entity 210 and/or rules administration entity 216 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to in the context of rules database 212 may comprise any suitable storage medium, including solid-state drives (SSD) or other semiconductor-based RAM; a ROM, for example a CD ROM or a semiconductor ROM; or a magnetic recording medium, for example a floppy disk or hard disk.

Figure 8:
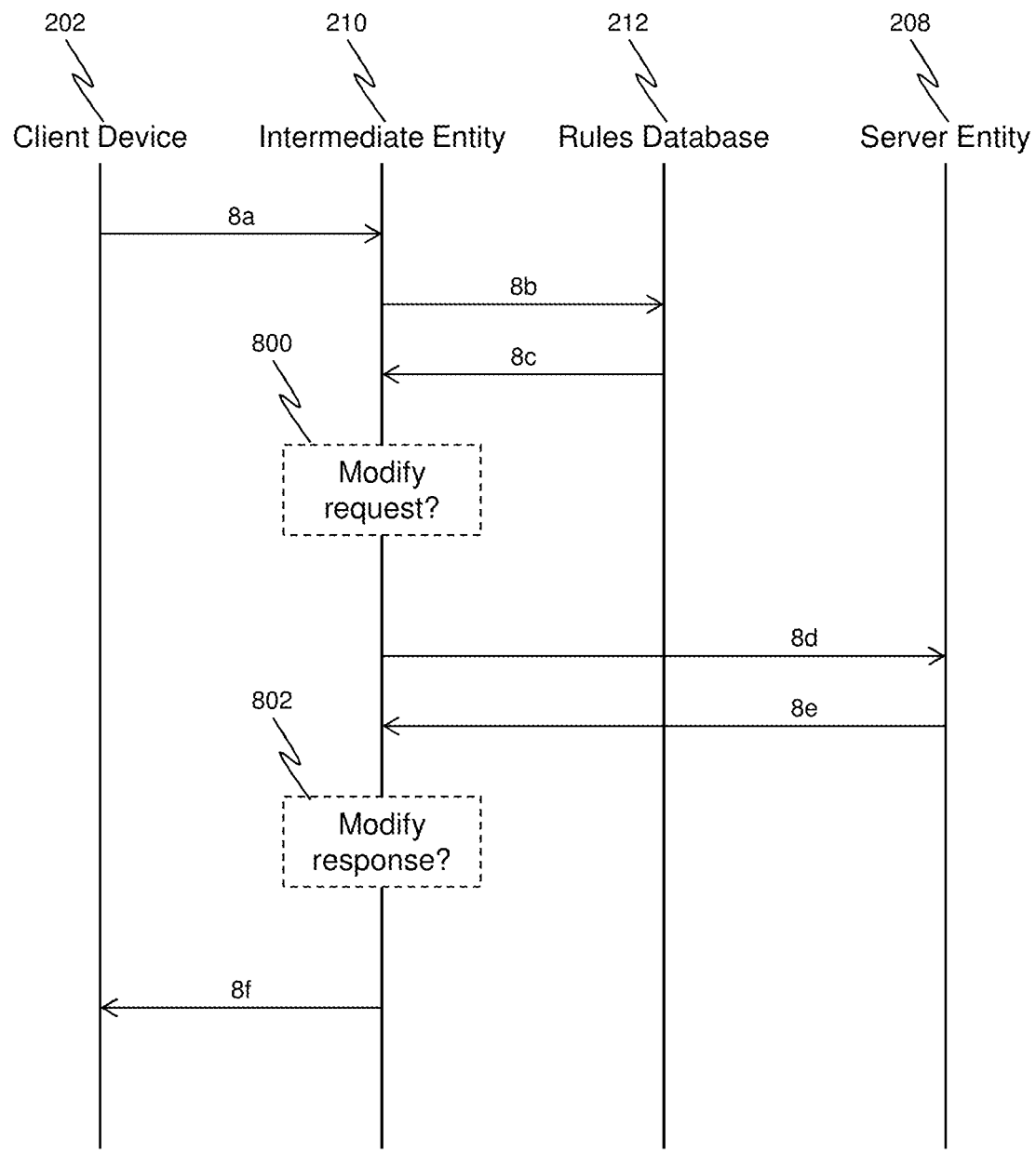
FIG. 8 shows a flow diagram according to embodiments.

FIG. 8 illustrates the operation of intermediate entity 210 in combination with rules database 212. At step 8a, a browser session request is transmitted from subscriber client device 202 into telecommunications network 300. The browser session request of step 8a could be a request for a web page, web page element, data file, service, etc. As service provider network 204 is configured to route all browser session traffic via intermediate entity 210, the browser session request is then received at intermediate entity 210 in the service provider network.

Having received the browser session request in step 8a, intermediate entity 210 queries rules database 212 located within service provider network 204 in step 8b to obtain the one or more browser session processing modification rules. The one or more browser session processing modification rules are received by intermediate entity 210 from rules database 212 in step 8c. Intermediate entity 210 then processes the browser session request received in step 8a according to the received one or more browser session processing modification rules retrieved in step 8c. As a result of the processing, intermediate entity 210 may modify the received browser session request at step 800. Having processed the browser session request, the processed browser session request is then transmitted, in step 8d, to server entity 208.

Upon receipt of the browser session request transmitted in step 8d, server entity 208 processes the browser session request in order to generate a corresponding browser session response. At step 8e, server entity 208 transmits the generated browser session response into telecommunications network 300, directed at subscriber client device 202. Again, as service provider network 204 is configured to route all browser session traffic via intermediate entity 210, upon entering service provider network 204 the browser session response is then received at intermediate entity 210 in the service provider network.

Having received the browser session request in step 8e, intermediate entity 210 then processes the received browser session response according to the one or more received browser session processing modification rules. As a result of the processing, intermediate entity 210 may modify the received browser session response at step 802. Having processed the browser session response, the processed browser session response is then transmitted, in step 8f, to subscriber client device 202.

According to some embodiments, the received browser session processing modification rules are held in memory of intermediate entity 210 for use in future processing of browser session traffic in a given browser session. Hence, whilst in the example described in FIG. 8, the rules database is queried in response to receipt of the browser session request, in some embodiments, the browser session processing modification rules may already be held in memory as a result of a previous query of the rules database performed in relation to the processing of previous browser session traffic in the given browser session.

According to some embodiments, the received browser session processing modification rules are held in memory of intermediate entity 210 for use in processing of all browser session traffic without the need to ever query a database such as rules database 212.

Embodiments described above include obtaining revenue from publisher entities and advertiser entities. However, embodiments of the disclosure are envisaged that comprise obtaining revenue from other entities that benefit from the modified processing of the present disclosure, including, but not limited to, one or more of: an entity associated with the server entity, the subscriber, an advertiser, an advertisement broker, a third party data purchaser, and the service provider.

According to embodiments, the browser session request received at intermediate entity 210 is directed to a server entity located within the service provider network. In such embodiments, the browser session request is transmitted by intermediate entity 210 to the server entity located within the service provider network, and the corresponding browser session response is received at intermediate entity 210 from the server entity located within the service provider network. As in previous embodiments, intermediate entity 210 is configured to modify, prior to the respective transmittal, at least one of the browser session request and the browser session response according to one or more browser session processing modification rules.

Figure 9:
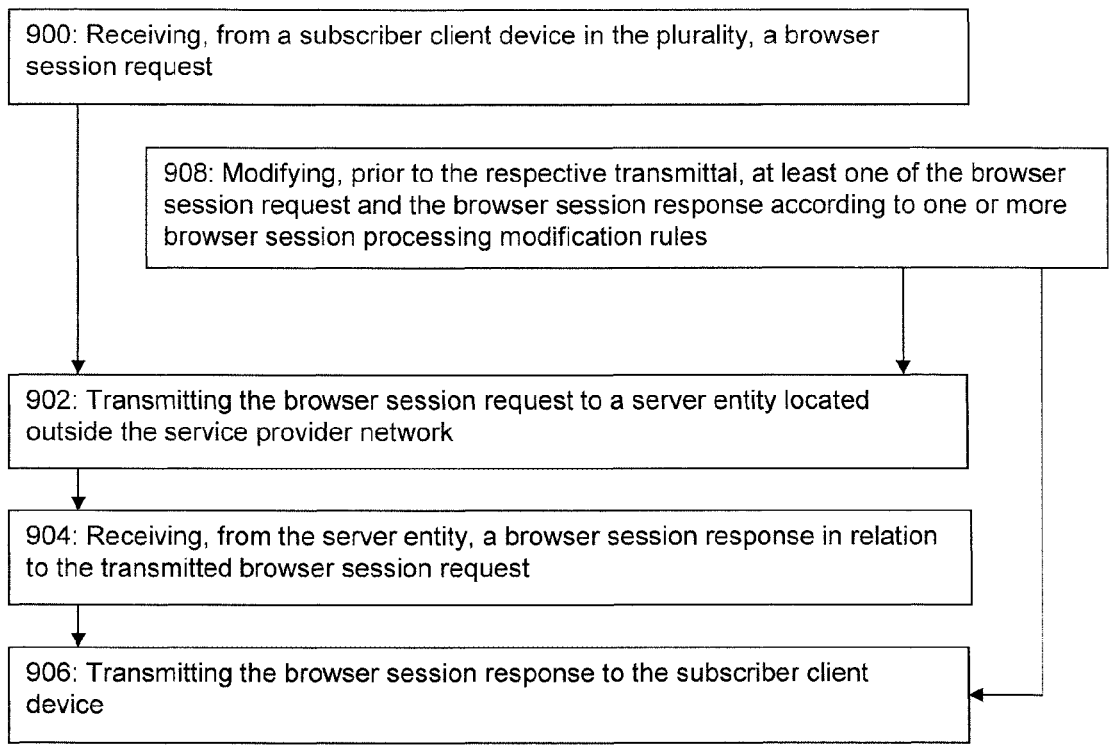
FIG. 9 shows a flow chart according to embodiments.

FIG. 9 is a flow diagram that describes embodiments from the perspective of intermediate entity 210. At step 900, a browser session request is received, from a subscriber client device in the plurality. At step 902, the browser session request is transmitted to a server entity located outside the service provider network. At step 904, a browser session response is received from the server entity in relation to the transmitted browser session request. At step 906 the browser session response is transmitted to the subscriber client device. Wherein, at step 908, prior to the respective transmittal, at least one of the browser session request and the browser session response are modified according to one or more browser session processing modification rules.

Embodiments comprise a method of processing browser sessions in a telecommunications network, the telecommunications network comprising a service provider network operated by a service provider responsible for providing telecommunications services to a plurality of subscriber client devices, the method comprising, at an entity in the service provider network: receiving, from a subscriber client device in the plurality, a browser session request; transmitting the browser session request to a server entity located outside the service provider network; and modifying, prior to the transmittal, the browser session request according to one or more browser session processing modification rules.

Embodiments comprise a method of processing browser sessions in a telecommunications network, the telecommunications network comprising a service provider network operated by a service provider responsible for providing telecommunications services to a plurality of subscriber client devices, the method comprising, at an entity in the service provider network: receiving, from a server entity located outside the service provider network, a browser session response in relation to a browser session request originating from a subscriber client device in the plurality; transmitting the browser session response to the subscriber client device; and modifying, prior to the transmittal, the browser session response according to one or more browser session processing modification rules.

Embodiments comprise a method of processing browser sessions in a telecommunications network, the telecommunications network comprising a carrier network operated by a carrier responsible for providing telecommunications services to a plurality of subscriber client devices, the method comprising, at an entity in the carrier network: receiving, from a subscriber client device in the plurality, a browser session request; transmitting the browser session request to a server entity located outside the carrier network; receiving, from the server entity, a browser session response in relation to the transmitted browser session request; transmitting the browser session response to the subscriber client device; and modifying, prior to the respective transmittal, at least one of the browser session request and the browser session response according to one or more browser session processing modification rules.

Embodiments of the present disclosure introduce an intermediate entity into a service provider network between a plurality of subscriber client devices and the wider network, whereby to enable the modification of standard browser session processing to provide enhanced functionality.

Figure 10:
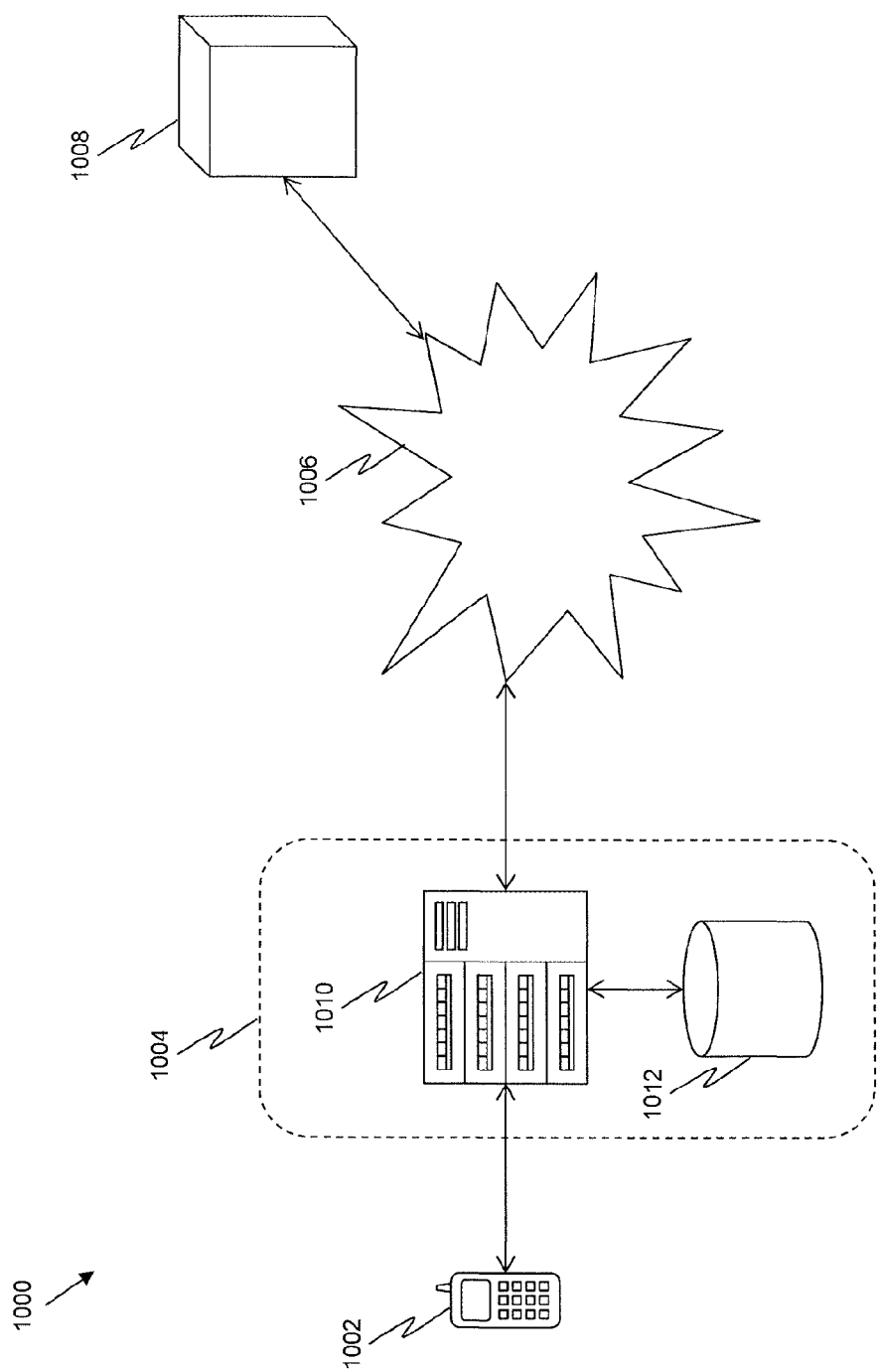
FIG. 10 shows a system diagram according to embodiments.

FIG. 10 shows a telecommunications network 1000 according to embodiments of the present disclosure. Telecommunications network 1000 comprises at least service provider network part 1004 and wider network part 1006. Telecommunications network 1000 may additionally comprise further network parts (not shown), and or border/gateway/caching entities (not shown) for translating between the various network protocols used in each network part, caching and serving commonly accessed data so as to reduce load between network parts and/or and/or managing access to each network part. Service provider network part 1004 is responsible for providing telecommunications services to a plurality of subscriber client devices, including at least subscriber client device 1002. A subscriber client device may be configured to communicate voice and data. Examples of subscriber client devices may include personal computers, laptop computers, mobile telephones (including "smart phones"), tablet computers, personal digital assistants, etc.

According to embodiments, service provider network part 1004 comprises a carrier network operated by a carrier. According to embodiments, service provider network part 1004 comprises a mobile network (which may be in the form of a cellular network) operated by a mobile network operator (MNO). According to embodiments, service provider network part 1004 comprises an internet service provider network operated by an internet service provider (ISP). According to embodiments, service provider network part 1004 comprises one or more wireless local area network (WLAN) parts, which may for example operate according to an Institute of Electrical and Electronics Engineers (IEEE) 802.11 "Wi-Fi" protocol. Service provider network part 1004 also comprises subscriber profile database 1012. Subscriber profile database 1012 stores subscriber profile data for a plurality of subscriber client devices and/or associated subscribers. Wider network part 1006 is responsible for routing traffic (e.g. packetized data traffic encoded according to the Hypertext Transfer Protocol (HTTP)) to and from one or more server entities accessible via wider network part 1006, including at least server entity 1008.

An intermediate entity 1010 is introduced into service provider network 1004 between subscriber client device 1002 and wider network part 1006. Intermediate entity 1010 may be physically located in service provider network 1004, or logically located in service provider network 1004 through the use of, for example, a virtual or backhaul private network, but physically located/hosted elsewhere. Service provider network 1004 is adapted to route browser session traffic between subscriber client device 1002 and wider network part 1006 via intermediate entity 1010. Intermediate entity 1010 is adapted to communicate with subscriber profile database 1012 whereby to be able to perform a lookup in subscriber profile database 1012 for a given subscriber client device and/or associated subscriber. According to embodiments, this lookup is performed on the basis of a unique identifier associated with the subscriber client device, such as a Mobile Subscriber Integrated Services Digital Network Number (MSISDN) or an International Mobile Equipment Identity (IMEI) number. According to embodiments, this lookup is performed on the basis of a unique identifier for the subscriber associated with the given subscriber client device, such as a registration number or user name. Intermediate entity 1010 is configured to process browser session traffic according to the results of such a lookup in subscriber profile database 1012. According to embodiments, the contents of subscriber profile database 1012 are defined by the service provider. In accordance with the results of the lookup in subscriber profile database 1012, modifications may be made to one or more browser session requests and/or browser session responses comprised in a given browser session between a subscriber client device 1002 and one or more server entities, such as server entity 1008.

By modifying one or more browser session requests and/or browser session responses at intermediate entity 1010 in service provider network part 1004, embodiments are in contrast to known modification techniques wherein modification is performed by one or more of: a browser on a subscriber client device (according to code running locally on the browser), a server (during construction of a browser session response), a border entity responsible for managing access to a given network part, a gateway entity responsible for translating between network protocols used in different network parts, a caching entity responsible for caching and serving data commonly requested between network parts, a network device outside of the carrier entity, or an encoding entity responsible for modifying browser session traffic for efficient routing. Thus, in certain embodiments, the modification is not performed by a browser on a subscriber client device, by a server during construction of a browser session response, a border entity responsible for managing access to a given network part, a gateway entity responsible for translating between network protocols used in different network parts, a caching entity responsible for caching and serving data commonly requested between network parts, a network device outside of the carrier entity, and/or an encoding entity responsible for modifying browser session traffic for efficient routing.

Further, according to embodiments, by modifying one or more browser session requests and/or browser session responses at intermediate entity 1010 in service provider network part 1004, the received browser session requests and browser session responses comprise sufficient information to enable routing between subscriber client device 1002 and wider network part 1006 prior to modification by intermediate entity 1010. This is in contrast to the known modification techniques described above, wherein modification at the mentioned locations takes place during the generation of the given browser session request/browser session response, or during modification for conventional traffic routing operations.

According to embodiments, service provider network 1004 comprises a routing fabric, responsible for routing traffic between subscriber client device 1002 and wider network part 1006. The service provider network 1004 may include a routing system that selects the route for calls or data. According to embodiments, intermediate entity 1010 is located in the routing fabric of service provider network 1004. Conventionally, the routing fabric of the service provider network is reserved for routing only, and not the modification of browser session traffic. However, embodiments adapt the routing fabric through the introduction of intermediate entity 1010.

Figure 11:
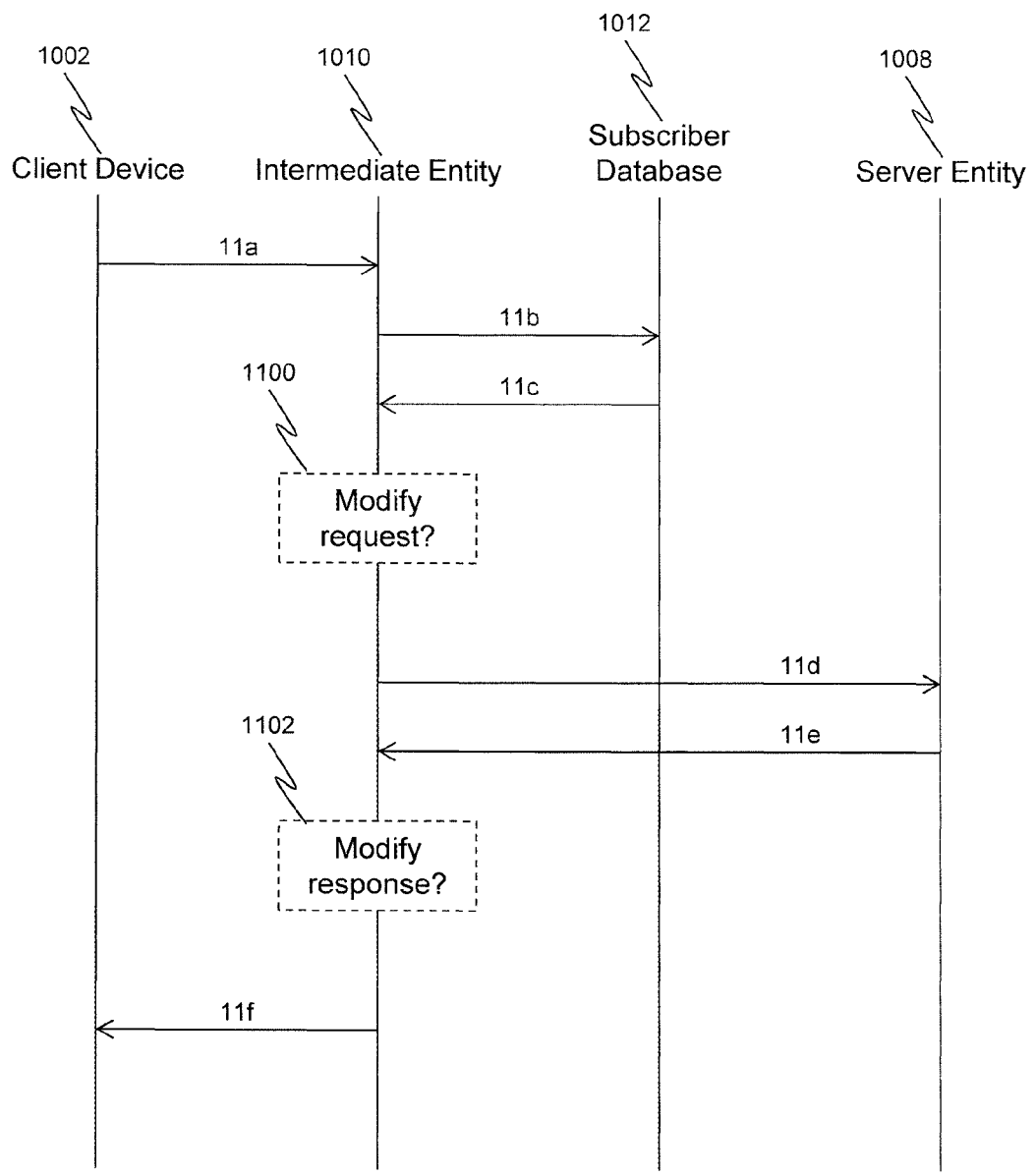
FIG. 11 shows a flow diagram according to embodiments.

FIG. 11 illustrates the operation of intermediate entity 1010 in the context of a browser session taking place between subscriber client device 1002 and server entity 1008. At step 11a, a browser session request is transmitted from subscriber client device 1002 into telecommunications network 1000. The browser session request of step 11a could comprise a request for a web page, web page element, data file, service, etc. As service provider network 1004 is configured to route all browser session traffic via intermediate entity 1010, the browser session request is then received at intermediate entity 1010 in the service provider network.

Having received the browser session request of step 11a, intermediate entity 1010 performs a lookup in subscriber profile database 1012 located within service provider network 1004 for subscriber client device 1012 and/or the associated subscriber in step 11b. The results of the lookup are received by intermediate entity 1010 from subscriber profile database 1012 in step 11c. Intermediate entity 1010 then processes the browser session request received in step 11a according to the results of the lookup received in step 11c. As a result of the processing, intermediate entity 1010 may modify the received browser session request at step 1100. Having processed the browser session request, the processed browser session request is then transmitted, in step 11d, to server entity 1008.

Upon receipt of the browser session request transmitted in step 11d, server entity 1008 processes the browser session request in order to generate a corresponding browser session response. At step 11e, server entity 1008 transmits the generated browser session response into telecommunications network 1000, directed at subscriber client device 1002. Again, as service provider network 1004 is configured to route all browser session traffic via intermediate entity 1010, upon entering service provider network 1004 the browser session response is then received at intermediate entity 1010 in the service provider network.

Having received the browser session response in step 11e, intermediate entity 1010 then processes the received browser session response according to the results of the lookup received in step 11c. As a result of the processing, intermediate entity 1010 may modify the received browser session response at step 1102. Having processed the browser session response, the processed browser session response is then transmitted, in step 11f, to subscriber client device 1002.

According to embodiments, the results of the lookup are held in memory of intermediate entity 1010 for use in future processing of browser session traffic in a given browser session. Hence, whilst in the example described in FIG. 11, the lookup is performed in response to receipt of the browser session request of step 11a at intermediate entity 1010, in some embodiments, the results of the lookup may already be held in memory of intermediate entity 1010 as a result of a previous query of the subscriber profile database performed in relation to the processing of previous browser session traffic in the given browser session.

By defining the data stored in subscriber profile database 1012, the service provider is able to provide a number of enhanced browser session processing features compared to conventional browser session processing.

According to embodiments, the browser session request of step 11a comprises a request for a web page. In such cases, server entity 1008 typically comprises a publisher server entity. By modifying at least one of the browser session request and the browser session response accordingly, the browser session processing can be made to cause the subscriber client device to receive modified web page content as a result of a modification made to either the browser session request of step 11a in step 1100 or the browser session response of step 11e in step 1102. In situations where such modification is desirable for a publisher entity associated with the publisher server entity, revenue can be obtained from the publisher entity for carrying out the modification, i.e. on the basis of the modification.

According to embodiments, the browser session request of step 11a comprises a request for a web page element. According to embodiments, the browser session request of step 11a comprises a request for an advert. In such embodiments, server entity 1008 may comprise an advertisement server entity. By modifying at least one of the browser session request and the browser session response accordingly, the browser session processing can be made to cause the subscriber client device to receive modified advertisement content as a result of a modification made to either the browser session request in step 1100 or the browser session response in step 1102. In situations where such modification is desirable for an advertiser entity associated with the advertisement server entity, revenue can be obtained from the advertiser entity for carrying out the modification, i.e. on the basis of the modification. In some embodiments, server entity 1008 comprises a broker entity responsible for providing advertisement brokering services to a plurality of advertisement server entities. In some embodiments, the advertiser entity comprises an advertiser network, responsible for serving adverts on behalf of an advertising agency or advertiser.

The modification performed as a result of processing the browser session traffic according to the results of the lookup in the subscriber profile database may comprise one or more of: deleting a part of the browser session request, deleting a part of the browser session response, altering a part of the browser session request, altering a part of the browser session response, adding to the browser session request, and adding to the browser session response. This may comprise modifying part of the data, a header or another object such as a cookie.

According to embodiments, the results of the lookup in the subscriber profile database may comprise one or more subscriber browsing rules associated with the subscriber client device and/or the associated subscriber, which cause the subscriber client device to receive modified browsing content.

According to embodiments, the results of the lookup in the subscriber profile database may comprise one or more restrictions on content access which should be applied to the given subscriber client device and/or associated subscriber. Such restrictions might comprise an age related restriction for filtering age-restricted content, a list of content to which access should be denied or some other form of content filter for preventing access to otherwise undesirable content.

According to embodiments the processing of the browser session traffic can be used to modify the browser session request and/or response by altering a URL in the browser session request and/or the browser session response. By modifying a browser session request to alter the target URL, requests for such content can be redirected to a more suitable target, such as an alternative web page that complies with one or more restrictions on content access comprised within the results of the lookup in the subscriber profile database, or a web page explaining why the browser session request was not fulfilled as expected. Similarly, by modifying the browser session response to alter one or more URLs contained therein, links to such web pages or web page elements can be replaced with links to more suitable content.

According to embodiments, the processing of the browser session traffic can be used to modify the browser session response by altering or removing such undesirable content from the browser session response directly. For example web page elements, such as pictures, audio, video, text, etc. that may comprise illegal, age restricted, or otherwise undesirable content may be removed from the browser session response by the modification. Alternatively, the browser session response may be altered to replace such content with content that complies with the service provider's service policy.

According to embodiments, the results of the lookup in the subscriber profile database may comprise one or more special access requirements associated with the given subscriber client device and/or associated subscriber. For example, the results of the lookup in the subscriber profile database may indicate that the given subscriber is color blind, in which case the browser session request may be modified to request a version of the requested webpage with a suitable color palette. Alternatively, the browser session response may be modified to alter the color palette of the received content, or otherwise increase the contrast. Further, the results of the lookup in the subscriber profile database may indicate that the given subscriber is deaf, in which case in which case the browser session request may be modified to request that a version of a requested video be provided with subtitles provided. Alternatively, the browser session response may be modified to insert subtitles over a requested video, etc.

According to embodiments, the results of the lookup in the subscriber profile database may comprise a natural language preference associated with the given subscriber client device and/or associated subscriber. By modifying a browser session request, a version of the requested content can instead be requested in the preferred natural language if available. Alternatively, by modifying the browser session response, the content in the response can be replaced with a translated version of that content.

According to embodiments, the modification may comprise modifying the browser session request to include additional data. Hence, when the browser session request is received by server entity 1008, server entity 1008 receives further information regarding the browser session request, and is thus able to generate a more relevant browser session response. This is particularly advantageous when server entity 1008 is an advertisement server entity. In such cases, having further information about the browser session request allows the advertisement server entity to serve more highly relevant adverts to the subscriber. More highly relevant adverts can generate greater revenue for advertisers. Further, more highly relevant adverts can also lead to increased business value for advertisers. Hence, according to embodiments, revenue is obtained from an advertiser entity for carrying out the modification, i.e. on the basis of the modification of the browser session request.

According to embodiments, performing the lookup comprises retrieving, from subscriber database 1012, one or more subscriber profile attributes associated with the subscriber client device and/or the associated subscriber. According to embodiments, intermediate entity 1010 may modify the browser session request to include an indication of one or more of the subscriber profile attributes retrieved from subscriber database 1012 in the lookup. Hence, server entity 1008 is informed as to one or more subscriber profile attributes associated with the subscriber client device and/or the associated subscriber, and can thus generate a correspondingly more relevant browser session response. According to embodiments, the subscriber profile attributes may identify a given hobby, topic or interest associated with the subscriber, such as cricket, cars or reading. According to embodiments, the subscriber profile attributes identify a given browsing behavior characteristic associated with the subscriber, such as a regularly visited website or regularly used service. Such a browsing behavior characteristic may be determined by logging and analyzing traffic in relation to the given subscriber client device and/or the associated subscriber.

According to embodiments, intermediate entity 1010 may modify the browser session request to include data representative of the identity of the service provider. Hence, server entity 1008 is informed as to the identity of the service provider that provides a service to the originator of the received browser session request, and can thus generate a correspondingly more relevant browser session response.

According to embodiments, intermediate entity 1010 may modify the browser session request to include data representative of the geographical location of the subscriber client device. The geographical location of the subscriber client device can be obtained from known service provider networking operations, such as cell-tower location lookup, and/or cell trilateration. Hence, server entity 1008 is informed of the geographical location of the subscriber client device, and can thus generate a correspondingly more relevant browser session response.

According to embodiments, the subscriber database is remotely configurable. The subscriber database may be configured by a subscriber database administration entity located within the service provider network, for example operated by an employee of the service provider. Alternatively, the subscriber database may be configured by a subscriber database administration entity located outside the service provider network, for example operated by a contractor, a subscriber, a law enforcement entity, a regulatory body, etc. In such embodiments, the subscriber database may be remotely configured in response to receipt of a subscriber database configuration message, for example from a subscriber database administration entity.

According to embodiments, intermediate entity 1010 is further configured to process browser session traffic according to one or more browser session processing modification rules. According to such embodiments, the browser session processing modification rules are defined by the service provider. According to further embodiments, the browser session processing modification rules are initially defined by an equipment supplier, with subsequent browser session processing modification rules being defined by the service provider. According to further embodiments, the defined browser session processing modification rules are configured by a rules administration entity. In such embodiments, modifications may be made to one or more browser session requests and/or browser session responses in accordance with the results of a lookup in subscriber profile database 1012 and the browser session processing modification rules. Some embodiments of the present disclosure utilize a rules engine to process the one or more browser session requests and/or browser session responses according to the browser session processing modification rules. The rules engine is comprised in intermediate entity 1010, for example in the form of an installed software application.

According to embodiments, intermediate entity 1010 holds the one or more browser session processing modification rules in operating memory. According to further embodiments, intermediate entity 1010 obtains at least one of the one or more browser session processing modification rules as a result of querying a rules database located within the service provider network. In some embodiments, the one or more browser session processing modification rules are remotely configurable. The browser session processing modification rules may be configured by a rules administration entity located within the service provider network, for example operated by an employee of the service provider. Alternatively, the browser session processing modification rules may be configured by a rules administration entity located outside the service provider network, for example operated by a contractor, a subscriber, a law enforcement entity, a regulatory body, etc. In such embodiments, the one or more browser session processing modification rules may be remotely configured in response to receipt of a rule configuration message, for example from a rules administration entity.

Figure 12:
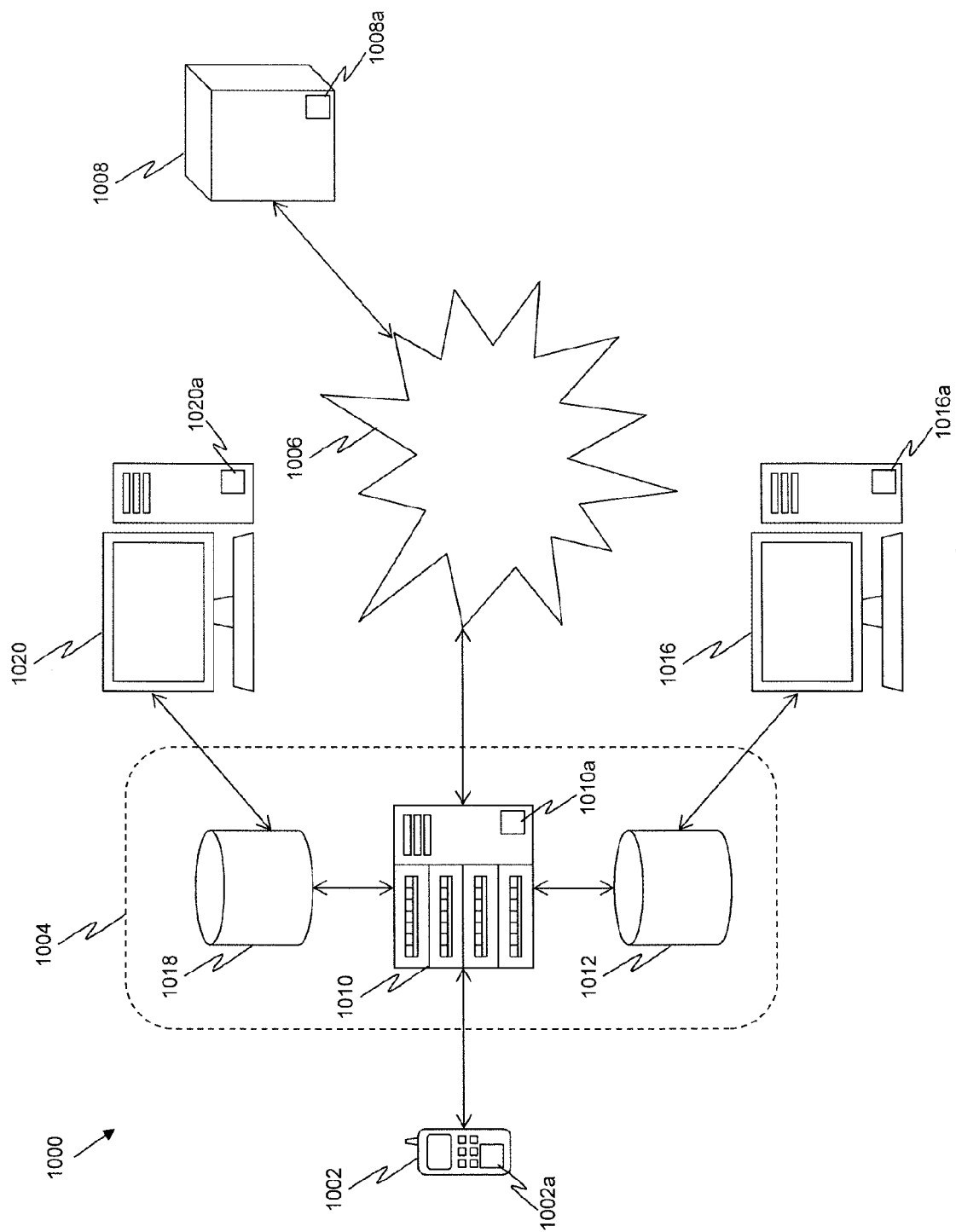
FIG. 12 shows a system diagram according to embodiments.

FIG. 12 shows telecommunications network 1000 according to embodiments. The functionality of subscriber client device 1002, service provider network part 1004, and wider network part 1006, server entity 1008, intermediate entity 1010 and subscriber profile database 1012 are the same as described above in relation to FIG. 10. However, in the embodiments shown in FIG. 12, service provider network further comprises rules database 1018, which contains the one or more browser session processing modification rules. Subscriber database administration entity 1016 is capable of configuring the subscriber profile database by transmitting a subscriber database configuration message to subscriber profile database 1012. This may occur via a direct connection to service provider network 1004 (as shown) or via wider network part 1006. Rules administration entity 1020 is capable of configuring the one or more browser session processing modification rules by transmitting a rules database configuration message to rules database 1018. Again, this may occur via a direct connection to service provider network 1004 (as shown) or via wider network part 1006. In any of the aforementioned embodiments, one or more of subscriber client device 1002, server entity 1008, intermediate entity 1010, subscriber database administration entity 1016 and rules administration entity 1020 comprise a processor or a processing system comprising one or more processors and one or more memories (such as a RAM or ROM), as depicted by processing systems 1002a, 1008a, 1010a, 1016a and 1020a respectively.

One or more of the aspects of the embodiments described herein with reference to the drawings comprise processes performed by one or more of subscriber client device 1002, server entity 1008, intermediate entity 1010, subscriber database administration entity 1016 and rules administration entity 1020. In embodiments, the subscriber client device 1002, server entity 1008, intermediate entity 1010, subscriber database administration entity 1016 and rules administration entity 1020 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to in the context of subscriber profile database 1012 and/or rules database 1018 may comprise any suitable storage medium, including solid-state drives (SSD) or other semiconductor-based RAM; a ROM, for example a CD ROM or a semiconductor ROM; or a magnetic recording medium, for example a floppy disk or hard disk.

According to embodiments, the browser session request received at intermediate entity 1010 is directed to a server entity located within the service provider network. In such embodiments, the browser session request is transmitted by intermediate entity 1010 to the server entity located within the service provider network, and the corresponding browser session response is received at intermediate entity 1010 from the server entity located within the service provider network. As in previous embodiments, intermediate entity 1010 is configured to modify, prior to the respective transmittal, at least one of the browser session request and the browser session response according to the results of the lookup.

Figure 13:
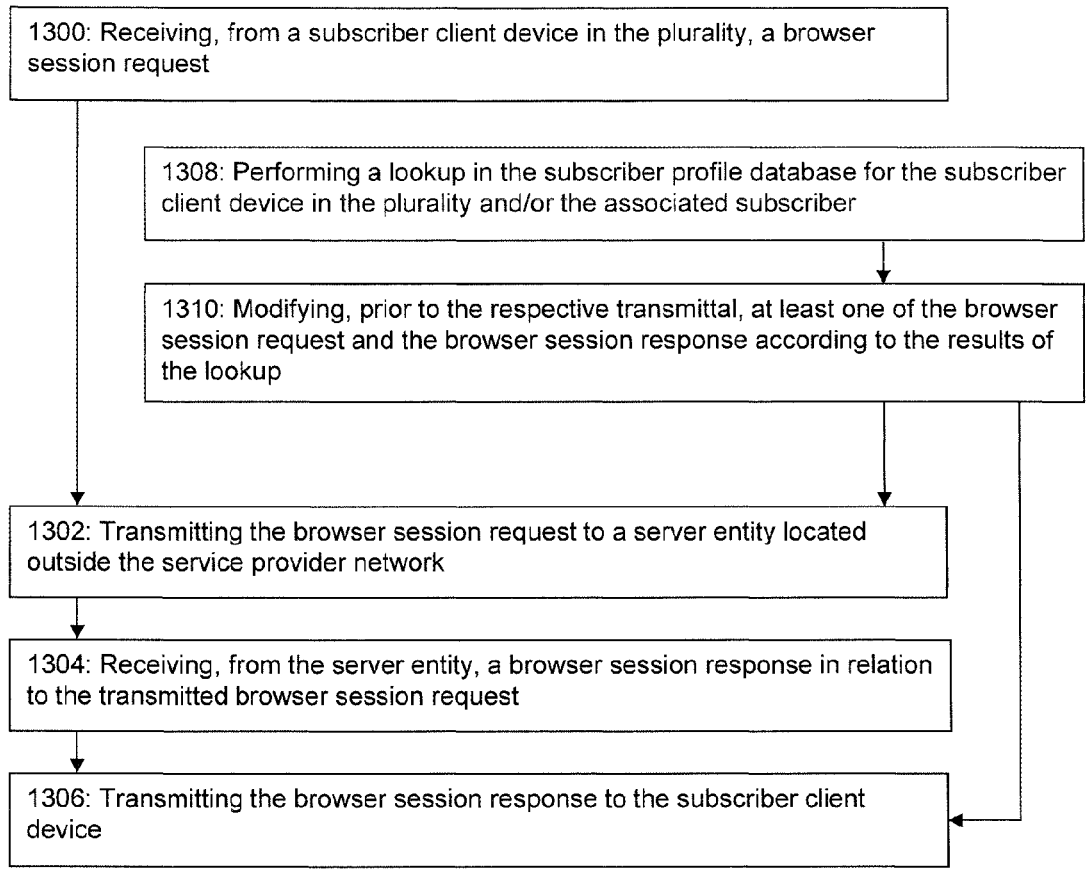
FIG. 13 shows a flow chart according to embodiments.

FIG. 13 is a flow diagram that describes embodiments from the perspective of intermediate entity 1010. At step 1300, a browser session request is received from a subscriber client device in the plurality. At step 1302, the browser session request is transmitted to a server entity located outside the service provider network. At step 1304, a browser session response is received from the server entity in relation to the transmitted browser session request. At step 1306, the browser session response is transmitted to the subscriber client device. At step 1308, a lookup in the subscriber profile database is performed for the subscriber client device in the plurality and/or the associated subscriber. At step 1310, prior to the respective transmittal, at least one of the browser session request and the browser session response are modified according to the results of the lookup.

Embodiments comprise a method of processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a subscriber client device in the plurality, a browser session request; transmitting the browser session request to a server entity located outside the service provider network; performing a lookup in the subscriber profile database for the subscriber client device in the plurality and/or the associated subscriber; and modifying, prior to the transmittal, the browser session request according to the results of the lookup.

Embodiments comprise a method of processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a server entity located outside the service provider network, a browser session response in relation to a browser session request originating from a subscriber client device in the plurality; transmitting the browser session response to the subscriber client device; performing a lookup in the subscriber profile database for the subscriber client device in the plurality and/or the associated subscriber; and modifying, prior to the transmittal, the browser session response according to the results of the lookup.

Embodiments comprise a method of processing browser sessions in a telecommunications network, the telecommunications network comprising a carrier network operated by a carrier responsible for providing telecommunications services to a plurality of subscriber client devices each having an associated subscriber, the carrier network comprising a subscriber profile database containing subscriber profile data specific to each subscriber client device and/or associated subscriber, the method comprising, at an entity in the carrier network: receiving, from a subscriber client device in the plurality, a browser session request; transmitting the browser session request to a server entity located outside the carrier network; receiving, from the server entity, a browser session response in relation to the transmitted browser session request; transmitting the browser session response to the subscriber client device; performing a lookup in the subscriber profile database for the subscriber client device in the plurality and/or the associated subscriber; and modifying, prior to the respective transmittal, at least one of the browser session request and the browser session response according to the results of the lookup.

Embodiments of the present disclosure introduce an intermediate entity into a service provider network between a plurality of subscriber client devices and the wider network, whereby to enable the modification of standard data processing to provide enhanced functionality.

Figure 14:
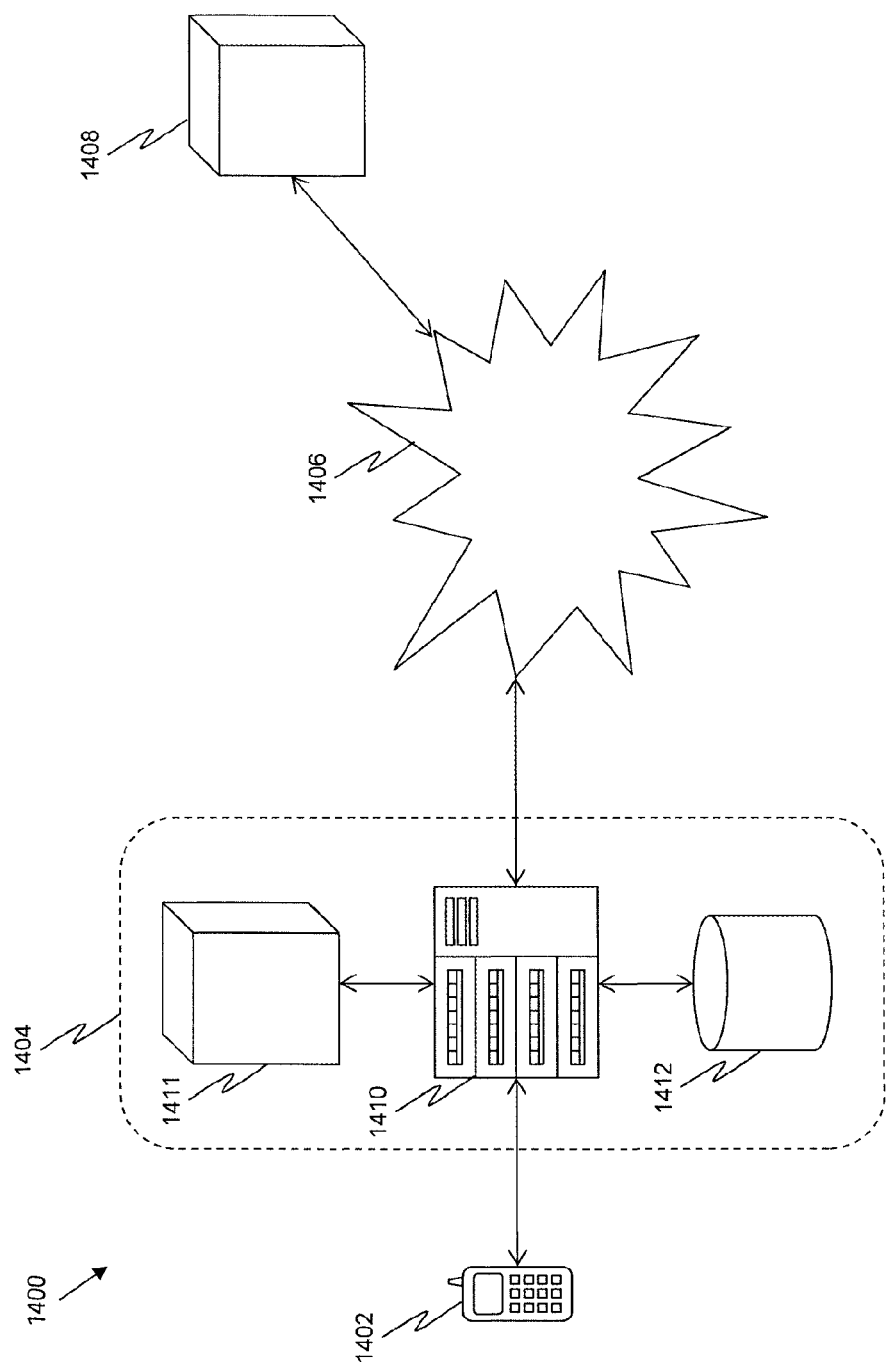
FIG. 14 shows a system diagram according to embodiments.

FIG. 14 shows a telecommunications network 1400 according to embodiments of the present disclosure. Telecommunications network 1400 comprises at least service provider network part 1404 and wider network part 1406. Telecommunications network 1400 may additionally comprise further network parts (not shown), and or border/gateway/caching entities (not shown) for translating between the various network protocols used in each network part, caching and serving commonly accessed data so as to reduce load between network parts and/or managing access to each network part. Service provider network part 1404 is responsible for providing telecommunications services to a plurality of subscriber client devices, including at least subscriber client device 1402. A subscriber client device may be configured to communicate voice and data. Examples of subscriber client devices may include personal computers, laptop computers, mobile telephones (including "smart phones"), tablet computers, personal digital assistants, etc.

According to embodiments, service provider network part 1404 comprises a carrier network operated by a carrier. According to embodiments, service provider network part 1404 comprises a mobile network (which may be in the form of a cellular network) operated by a mobile network operator (MNO). According to embodiments, service provider network part 1404 comprises an internet service provider network operated by an internet service provider (ISP). According to embodiments, service provider network part 1404 comprises one or more wireless local area network (WLAN) parts, which may for example operate according to an Institute of Electrical and Electronics Engineers (IEEE) 802.11 "Wi-Fi" protocol. Service provider network part 1404 also comprises subscriber profile database 1412. Subscriber profile database 1412 stores subscriber profile data for a plurality of subscriber client devices and/or associated subscribers. Wider network part 1406 is responsible for routing traffic (e.g. packetized data traffic encoded according to the Hypertext Transfer Protocol (HTTP)) to and from one or more server entities accessible via wider network part 1406, including at least server entity 1408. According to embodiments service provider network part 1404 further comprises optional event monitoring entity 1411.

An intermediate entity 1410 is introduced into service provider network 1404 between subscriber client device 1402 and wider network part 1406. Intermediate entity 1410 may be physically located in service provider network 1404, or logically located in service provider network 1404 through the use of, for example, a virtual or backhaul private network, but physically located/hosted elsewhere. Intermediate entity 1410 is adapted to respond to receipt of an indication that a trigger event has occurred by initiating delivery of targeted content data associated with the indicated trigger event to one or more subscriber client devices.

Intermediate entity 1410 is further adapted to communicate with subscriber profile database 1412 to perform a lookup in subscriber profile database 1412 in order to identify subscriber profile data for a given subscriber. According to embodiments, the contents of subscriber profile database 1412 are defined by the service provider. According to embodiments, the lookup in subscriber profile database 1412 is performed on the basis of a trigger event, such as an identifier for that trigger event or one or more characteristics associated with that trigger event. Of the plurality of subscriber client devices which are provided telecommunications services by service provider network part 1404, the determination of which subscriber client device(s) should receive the targeted content data is performed on the basis of the results of a lookup performed in subscriber profile database 1412 to identify subscriber profile data for one or more subscribers associated with the indicated trigger event, including at least the subscriber associated with subscriber client device 1402. Having identified the given subscriber, delivery of targeted content data is initiated to at least one subscriber client device 1402 of the one or more subscriber client devices associated with the given subscriber. Targeted content data may be routed to subscriber client device 1402 on the basis of a unique identifier associated with the subscriber client device retrieved from subscriber database 1412, such as an email address, an IP address or a telephone dialing number such as a Mobile Subscriber Integrated Services Digital Network Number (MSISDN).

By initiating delivery of targeted content data at intermediate entity 1410 in service provider network part 1404, embodiments are in contrast to known content delivery techniques wherein delivery may be initiated by one or more of: a browser on a subscriber client device (according to code running locally on the browser), a server (during construction of a browser session response), a border entity responsible for managing access to a given network part, a gateway entity responsible for translating between network protocols used in different network parts, a caching entity responsible for caching and serving data commonly requested between network parts, a network device outside of the carrier entity, or an encoding entity responsible for modifying browser session traffic for efficient routing. Thus, in certain embodiments, the initiation is not performed by a browser on a subscriber client device, by a server during construction of a browser session response, a border entity responsible for managing access to a given network part, a gateway entity responsible for translating between network protocols used in different network parts, a caching entity responsible for caching and serving data commonly requested between network parts, a network device outside of the carrier entity, and/or an encoding entity responsible for modifying browser session traffic for efficient routing.

According to embodiments, service provider network 1404 comprises a routing fabric, responsible for routing traffic between subscriber client device 1402 and wider network part 1406. The service provider network 1404 may include a routing system that selects the route for calls or data. According to embodiments, intermediate entity 1410 is located in the routing fabric of service provider network 1404. Conventionally, the routing fabric of the service provider network is reserved for routing only, and not the initiation of delivery of targeted content data. However, embodiments adapt the routing fabric through the introduction of intermediate entity 1410.

Figure 15:
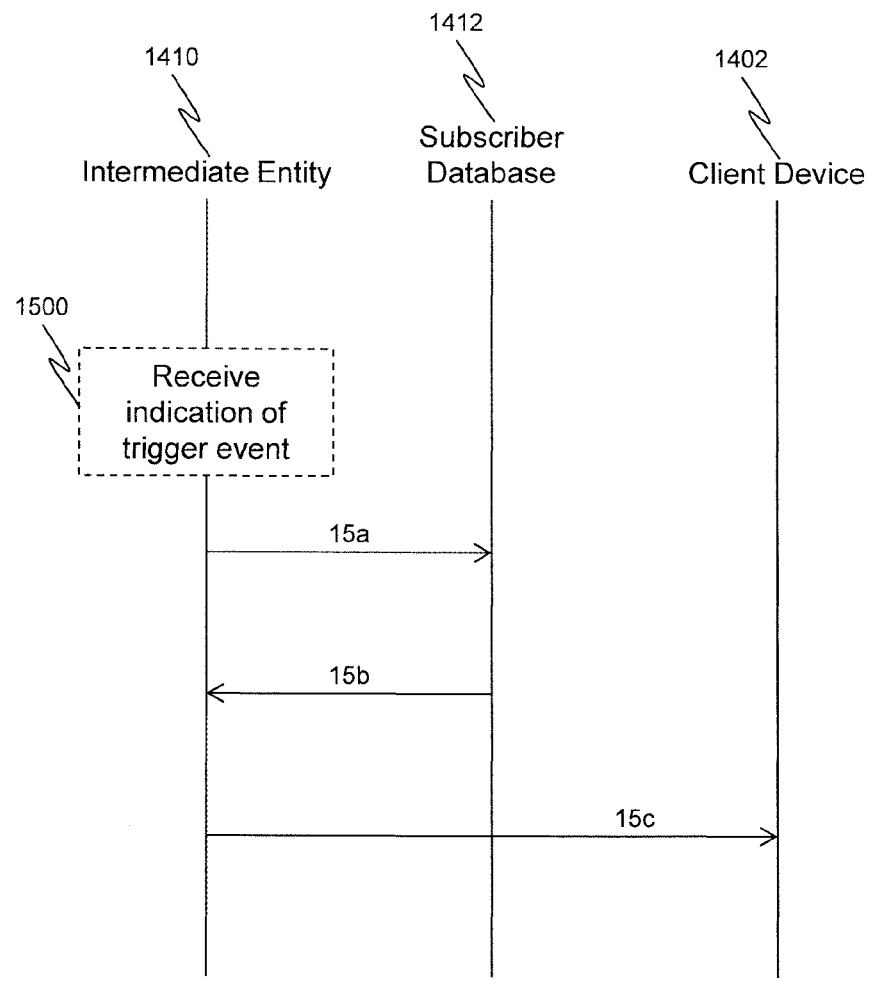
FIG. 15 shows a flow diagram according to embodiments.

FIG. 15 illustrates the operation of intermediate entity 1410 in response to the occurrence of a trigger event. At step 1500, intermediate entity 1410 receives an indication that the trigger event has occurred. Having received the indication that the trigger event has occurred of step 1500, intermediate entity 1410 performs a lookup in step 15*a* in subscriber profile database 1412 located within service provider network 1404 to identify subscriber profile data for at least a given subscriber associated with the indicated trigger event. The results of the lookup are received by intermediate entity 1410 from subscriber profile database 1412 in step 15*b*.

The results of the lookup received in step 15*b* comprise subscriber profile data for one or more subscribers, including at least the given subscriber, and/or data for one or more associated subscriber client devices, including at least subscriber client device 1402. Intermediate entity 1410 then initiates delivery of targeted content data to at least one of the one or more subscriber client devices associated with the given subscriber, including at least subscriber client device 1402 as shown in step 15*c*.

According to embodiments, the indication that the trigger event has occurred is received from an entity within service provider network part 1404, such as event monitoring entity 1411. For example, the trigger event may relate to a change in network service status, which when detected by event monitoring entity 1411 may result in an indication that the network service status has changed being sent to intermediate entity 1410. Intermediate entity 1410 then performs a lookup in subscriber database 1412 to identify subscriber profile data for one or more subscribers who should be notified of changes to the network service status, and initiate delivery of appropriate targeted content data to at least one subscriber client device associated with the one or more identified subscribers.

According to embodiments, the indication that the trigger event has occurred is received from an entity outside the provider network, such as server entity 1408 via wider network part 1406. For example, the trigger event may relate to a severe weather warning, which is reported to intermediate entity 1410 by a server associated with a meteorological organization, governmental body or suchlike. Intermediate entity 1410 then performs a lookup in subscriber database 1412 to identify subscriber profile data for one or more subscribers who should be informed of such severe weather warnings, and initiates delivery of appropriate targeted content data to at least one subscriber client device associated with the one or more identified subscribers.

According to embodiments, the targeted content data comprises advertisement content. In such embodiments, the trigger event relates to an event associated with the subject of the advertisement. For example, the trigger event may relate to the results of a music industry awards ceremony being announced, such that in response to the trigger event occurring, server 1408 associated with an advertiser which provides adverts for the sale of compact discs or audio files of music by a winning artist reports this to intermediate entity 1410. Intermediate entity 1410 then performs a lookup in subscriber profile database 1412 to identify subscriber profile data for one or more subscribers who are interested in receiving such advertisement content, and initiates delivery of advertisement content data to at least one subscriber client device associated with the one or more identified subscribers.

According to embodiments, the targeted content is generated by intermediate entity 1400 on the basis of identified subscriber profile data and the indicated trigger event. According to other embodiments, the targeted content data is generated, at least in part, on the basis of data stored in a targeted content data database (not shown) comprised in the service provider network. For example, the trigger event may relate to the results of a sporting event, which may be reported to intermediate entity 1410 by a server associated with a news organization, sporting body or suchlike. Intermediate entity 1410 then performs a lookup in the targeted content database to find a suitable targeted content relating to the results of the given sporting event. For example, the targeted content database may comprise advertisement content for merchandise of the winning sports team or products/services endorsed by a winning sports person. Subscriber profile database 1412 identifies subscriber profile data for one or more subscribers who are interested in receiving such advertisement content and initiates delivery of the appropriate targeted content data to at least one subscriber client device associated with the one or more identified subscribers.

According to embodiments, the targeted content data is generated at least on the basis of data received from a network entity located outside the service provider network in response to occurrence of the indicated trigger event. For example, in response to receipt of an indication that the trigger event has occurred, intermediate entity 1410 may request data for use in generating the targeted content from server entity 1408 via wider network part 1406. Alternatively, data for use in generating the targeted content may be transmitted from server entity 1408 to intermediate entity 1410 in response to the trigger event occurring. According to embodiments, this data could be transmitted either simultaneously to, or subsequent to, the indication that the trigger event has occurred. For example, an advertiser may transmit an indication that a certain trigger event has occurred along with data for use in generating suitable advertisement content.

According to embodiments, the targeted content data is generated on the basis of an identifier associated with the subscriber client device to which it will be delivered. In this way, the targeted content can be optimized for the device on which it will be received. According to embodiments, the identifier relates to a type of subscriber client device. The type could relate to whether the device is a mobile telephone, tablet, laptop, personal computer, etc. or the particular model or release of mobile telephone, etc. For example, in embodiments where the targeted content data comprises an image, a higher resolution version of the targeted content could be provided to a tablet device, whilst a lower resolution version of the targeted content could be provided to a mobile telephone device. According to further such embodiments, the identifier relates to a capability of the subscriber client device. This could include whether the device is capable of displaying image data, playing audio content, rendering video content etc., thereby allowing appropriate targeted content data to be generated.

According to embodiments, different targeted content data is generated for each of two subscriber client devices associated with a given subscriber, and delivery of the data is initiated accordingly. In such embodiments, the generating comprises generating first targeted content data on the basis of a first identifier associated with the first subscriber client device, and generating second targeted content data on the basis of a second identifier associated with the second subscriber client device. The initiation then comprises initiating delivery of the first targeted content data to the first subscriber client device and initiating delivery of the second targeted content data to the second subscriber client device. In embodiments, the identifiers for each of the two subscriber client devices are stored in subscriber profile database 1412 and retrieved by intermediate entity 1410 during the lookup performed in response to occurrence of the trigger event.

According to embodiments, the targeted content data comprises a web page. According to embodiments, the targeted content data comprises a web page element. According to embodiments, the targeted content data comprises advertisement content. According to embodiments, the targeted content data comprises an image. According to embodiments, the targeted content data comprises natural language text data.

According to embodiments, the initiation of delivery of the targeted content data comprises transmitting the targeted content data to subscriber client device 1402. According to further embodiments, the initiation of delivery of the targeted content data comprises transmitting a targeted content availability notification to subscriber client device 1402, to notify subscriber client device 1402 as to the availability of the targeted content data. In such embodiments the targeted content data may be hosted at intermediate entity 1410, server entity 1408, or a further entity in telecommunications network 1400 (not shown). In such embodiments, subscriber client device 1402 is informed as to the availability of the targeted content data, which is then able to request the targeted content data via conventional processing operations. According to embodiments, the initiation comprises utilizing a push notification system to instruct subscriber client device 1402 to request the targeted content data from an appropriate location in telecommunications network 1400.

According to embodiments, the initiation of delivery of the targeted content data comprises inserting the targeted content data into in an ongoing browser session conducted by subscriber client device 1402. According to such embodiments, service provider network 1404 is configured to route browser session traffic between subscriber client device 1402 and wider network part 1406 via intermediate entity 1410. In such embodiments, the initiating comprises modifying at least one of a browser session request and a browser session response whereby to cause the targeted content data to be inserted into the ongoing browser session. According to such embodiments, the modification comprises one or more of: modifying the browser session response to include the targeted content data, modifying the browser session response to include an instruction to request the targeted content data, modifying the browser session request to include a request for the targeted content data, and modifying a browser session request whereby to trigger the inclusion of an instruction to request the targeted content data in a corresponding browser session response. This may comprise modifying part of the data, a header or another object such as a cookie.

According to embodiments, the targeted content data comprises one or more of: a short message service (SMS) message, an email, a voicemail, and a telephone call. According to embodiments wherein the targeted content data comprises a telephone call, initiating delivery of the targeted content data results in a telephone call being placed to a telephone number associated with the given subscriber client device. According to embodiments the telephone call is then transferred to a suitable entity, such as a call center operator or similar, for conducting the telephone call. According to further embodiments, the telephone call comprises playing a pre-recorded audio message. According to further embodiments, the targeted content data is provided via an interactive television. According to further embodiments, the targeted content data is provided via an electronic billboard capable of detecting the presence of the given subscriber (for example by use of facial recognition functionality) or subscriber device (for example by detecting a radio frequency identification (RFID) tag embedded within a subscriber device).

According to embodiments, the trigger event has at least one associated trigger event attribute, and the subscriber profile data comprises at least one subscriber profile attribute associated with a given subscriber. According to embodiments, performing the lookup in subscriber profile database 1412 comprises: comparing at least one trigger event attribute associated with the trigger event to at least one subscriber profile attribute associated with a given subscriber. On the basis of the comparison, a match may be determined between the trigger event and the given subscriber. Where a match is determined, subscriber profile data for that subscriber can be identified, and delivery of targeted content initiated to a subscriber client device associated with the identified subscriber.

According to embodiments, the trigger event attributes and/or subscriber profile attributes identify a given hobby, topic or interest associated with the subscriber. For example, the trigger event may relate to a reduced price sale of tickets to a cricket match. In this case, the trigger event may be associated with the trigger event attribute "cricket" or "sports tickets" for example. By performing a lookup in the subscriber database for subscribers with a matching subscriber profile attribute, subscribers who are interested in receiving targeted content about reduced price tickets for a cricket match can be informed by initiating delivery of suitable targeted content to subscriber client device(s) associated with them.

According to embodiments, the trigger event attributes and/or subscriber profile attributes identify a given browsing behavior characteristic associated with the subscriber, such as a regularly visited website or regularly used service. Such a browsing behavior characteristic may be determined by logging and analyzing traffic in relation to the given subscriber client device and/or the associated subscriber.

According to embodiments, subscribers define their associated subscriber profile attributes in order to receive relevant content, and/or can subscribe with the service provider to receive specific content. In embodiments, on the basis of initiating delivery of the targeted content, revenue may be obtained from the subscriber for providing the content.

According to embodiments where delivery of the targeted content is initiated on behalf of an advertising entity, revenue may be obtained from an advertiser for carrying out the initiating, i.e. on the basis of the initiating of the delivery of the targeted content. Having further information about the subscriber, such as that stored in subscriber profile database 1412, allows the advertisement server entity to serve adverts only to those subscribers for which the advert is highly relevant. More highly relevant adverts can lead to generation of increased revenue for advertisers or advertisement brokers. Further, providing more highly relevant adverts can also lead to increased business value for advertisers or advertisement brokers, for example via increased brand awareness.

According to embodiments, the results of the lookup in subscriber profile database 1412 comprise one or more subscriber targeted content access rules associated with the subscriber and/or the associated subscriber client device, which influence the targeted content received by the subscriber client device.

According to embodiments, the results of the lookup in subscriber profile database 1412 comprise one or more restrictions on targeted content which should be applied to the given subscriber and/or associated subscriber client device. Such restrictions could comprise an age related restriction for filtering age-restricted targeted content, a list of targeted content types which should not be delivered or some other form of targeted content filter for preventing delivery of undesired targeted content.

According to embodiments, the results of the lookup in the subscriber profile database comprise one or more special access requirements associated with the given subscriber and/or associated subscriber client device. For example, the results of the lookup in the subscriber profile database may indicate that the given subscriber is color blind, in which case the targeted content can be generated using a suitable color palette. Further, the results of the lookup in the subscriber profile database may indicate that the given subscriber is deaf, in which case the targeted content can be generated without audio, or with subtitles provided.

According to embodiments, the results of the lookup in the subscriber profile database comprise a natural language preference associated with the given subscriber and/or associated subscriber client device, in which case, the targeted content can be generated with a translated version of the content instead.

According to embodiments, subscriber profile data is further identified on the basis of the geographical location of the subscriber client device. The geographical location of the subscriber client device can be obtained from known service provider networking operations, such as cell-tower location lookup, and/or cell trilateration. Hence, intermediate entity 1410 can provide targeted content data to those subscriber client devices identified in subscriber profile database 1412 that are also near a given geographical location, or in a given geographical area. According to further embodiments, the targeted content data may be generated on the basis of the geographical location of the subscriber client device, in order to provide more highly relevant targeted content data.

According to embodiments, the subscriber database is remotely configurable. The subscriber database may be configured by a subscriber database administration entity located within the service provider network, for example operated by an employee of the service provider. Alternatively, the subscriber database may be configured by a subscriber database administration entity located outside the service provider network, for example operated by a contractor, a subscriber, a law enforcement entity, a regulatory body, etc. In such embodiments, the subscriber database may be remotely configured in response to receipt of a subscriber database configuration message, for example from a subscriber database administration entity.

According to embodiments, intermediate entity 1410 is further configured to initiate delivery of the targeted content data according to one or more targeted content delivery rules, in combination with the indication of the trigger event having occurred and the subscriber profile data. According to embodiments, the targeted content delivery rules are defined by the service provider. According to further embodiments, the targeted content delivery rules are initially defined by an equipment supplier, with subsequent targeted content delivery rules being defined by the service provider. According to further embodiments, the defined targeted content delivery rules are configured by a rules administration entity. Embodiments of the present disclosure utilize a rules engine to initiate delivery of the targeted content data according to the targeted content delivery rules. Rules engine is comprised in intermediate entity 1410, for example in the form of an installed software application.

According to embodiments, intermediate entity 1410 holds the one or more targeted content delivery rules in operating memory. According to some embodiments, intermediate entity 1410 obtains at least one of the one or more targeted content delivery rules in response to querying a rules database located within the service provider network. In some embodiments, the one or more targeted content delivery rules are remotely configurable. The targeted content delivery rules may be configured by a rules administration entity located within the service provider network, for example operated by an employee of the service provider. Alternatively, the targeted content delivery rules may be configured by a rules administration entity located outside the service provider network, for example operated by a contractor, a subscriber, a law enforcement entity, a regulatory body, etc. In such embodiments, the one or more targeted content delivery rules may be remotely configured in response to receipt of a rule configuration message, for example from a rules administration entity.

Figure 16:
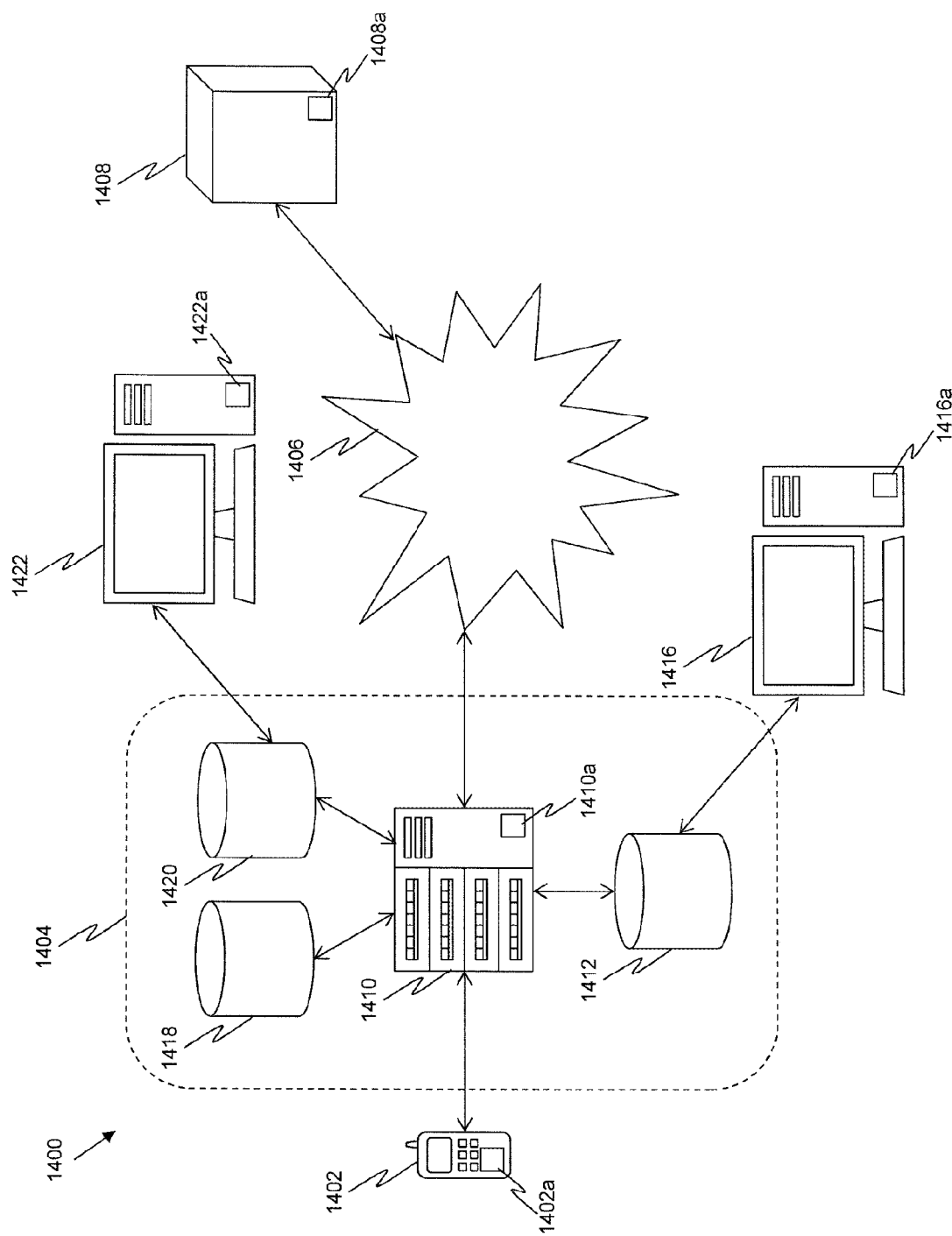
FIG. 16 shows a system diagram according to embodiments.

FIG. 16 shows telecommunications network 1400 according to embodiments. The functionality of subscriber client device 1402, service provider network part 1404, and wider network part 1406, server entity 1408, intermediate entity 1410 and subscriber profile database 1412 are the same as described above in relation to FIG. 14. However, in the embodiments shown in FIG. 16, service provider network further comprises targeted content database 1418, which contains the one or more items of targeted content, and rules database 1420, which contains the one or more targeted content delivery rules. Subscriber database administration entity 1416 is capable of configuring the subscriber profile database 1412 by transmitting a subscriber database configuration message to subscriber profile database 1412. This may occur via a direct connection to service provider network 1404 (as shown) or via wider network part 1406. Rules administration entity 1422 is capable of configuring the one or more targeted content delivery rules by transmitting a rules database configuration message to rules database 1420. This may occur via a direct connection to service provider network 1404 (as shown) or via wider network part 1406. In any of the aforementioned embodiments, one or more of subscriber client device 1402, server entity 1408, intermediate entity 1410, subscriber database administration entity 1416 and rules administration entity 1422 comprise a processor or a processing system comprising one or more processors and one or more memories (such as a RAM or ROM), as depicted by processing systems 1402a, 1408a, 1410a, 1416a and 1422a respectively. Event monitoring entity 1411 may similarly comprise a processor or a processing system comprising one or more processors and one or more memories (not shown).

One or more of the aspects of the embodiments described herein with reference to the drawings comprise processes performed by one or more of subscriber client device 1402, server entity 1408, intermediate entity 1410, event monitoring entity 1411, subscriber database administration entity 1416 and rules administration entity 1422. In embodiments, the subscriber client device 1402, server entity 1408, intermediate entity 1410, event monitoring entity 1411, subscriber database administration entity 1416 and rules administration entity 1422 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to in the context of subscriber profile database 1412, targeted content database 1418 and/or rules database 1420 may comprise any suitable storage medium, including solid-state drives (SSD) or other semiconductor-based RAM; a ROM, for example a CD ROM or a semiconductor ROM; or a magnetic recording medium, for example a floppy disk or hard disk.

Figure 17:
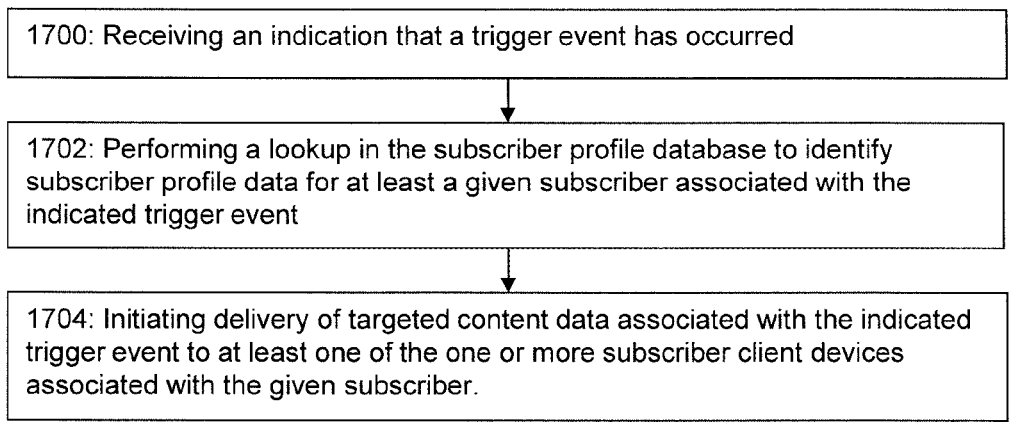
FIG. 17 shows a flow chart according to embodiments.

FIG. 17 is a flow diagram that describes embodiments from the perspective of intermediate entity 1410. At step 1700, an indication that a trigger event has occurred is received. At step 1702, a lookup is performed in the subscriber profile database to identify subscriber profile data for at least a given subscriber associated with the indicated trigger event. At step 1704, delivery of targeted content data associated with the indicated trigger event is initiated to at least one of the one or more subscriber client devices associated with the given subscriber.

Embodiments comprise a method for use in the provision of targeted content data in a telecommunications network, the telecommunications network comprising a carrier network operated by a carrier responsible for providing telecommunications services to a plurality of subscribers, each subscriber having one or more associated subscriber client devices, the carrier network comprising a subscriber profile database containing subscriber profile data specific to each subscriber and/or each associated subscriber client device, the method comprising, at an entity in the carrier network: receiving an indication that a trigger event has occurred; performing a lookup in the subscriber profile database to identify subscriber profile data for at least a given subscriber associated with the indicated trigger event; and initiating delivery of targeted content data associated with the indicated trigger event to at least one of the one or more subscriber client devices associated with the given subscriber.

Embodiments of the present disclosure introduce an intermediate entity into a service provider network between a plurality of subscriber client devices and the wider network, whereby to enable the modification of standard traffic processing to enable enhanced advertising content delivery.

Figure 18:
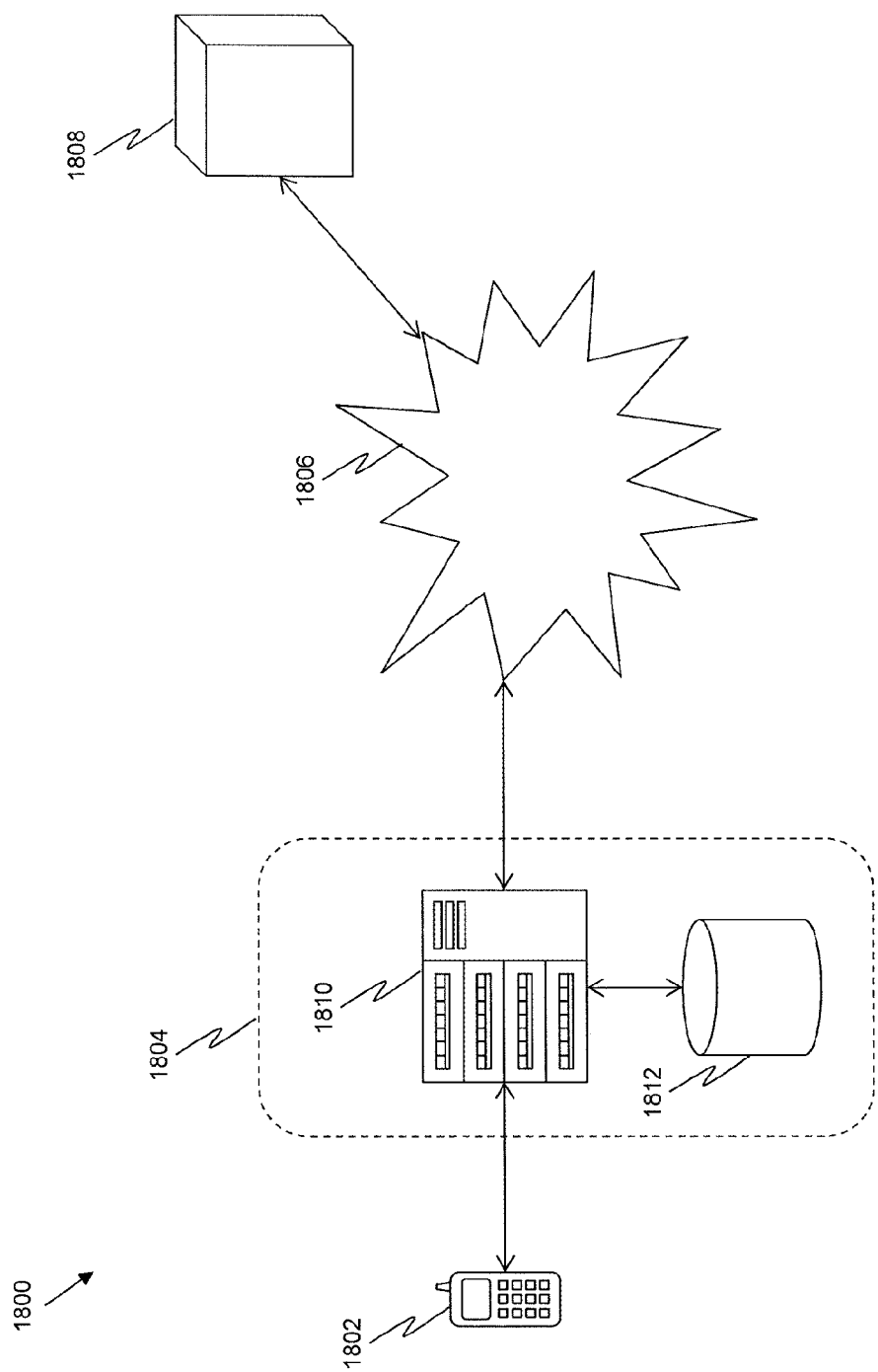
FIG. 18 shows a system diagram according to embodiments.

FIG. 18 shows a telecommunications network 1800 according to embodiments of the present disclosure. Telecommunications network 1800 comprises at least service provider network part 1804 and wider network part 1806. Telecommunications network 1800 may additionally comprise further network parts (not shown), and or border/gateway/caching entities (not shown) for translating between the various network protocols used in each network part, caching and serving commonly accessed data so as to reduce load between network parts and/or managing access to each network part. Service provider network part 1804 is responsible for providing telecommunications services to a plurality of subscriber client devices, including at least subscriber client device 1802. A subscriber client device may be configured to communicate voice and data. Examples of subscriber client devices may include personal computers, laptop computers, mobile telephones (including "smart phones"), tablet computers, personal digital assistants, etc.

According to embodiments, service provider network part 1804 comprises a carrier network operated by a carrier. According to embodiments, service provider network part 1804 comprises a mobile network (which may be in the form of a cellular network) operated by a mobile network operator (MNO). According to embodiments, service provider network part 1804 comprises an internet service provider network operated by an internet service provider (ISP). According to embodiments, service provider network part 1804 comprises one or more wireless local area network (WLAN) parts, which may for example operate according to an Institute of Electrical and Electronics Engineers (IEEE) 802.11 "Wi-Fi" protocol. Service provider network part 1804 also comprises subscriber profile database 1812. Subscriber profile database 1812 stores subscriber profile data for a plurality of subscriber client devices and/or associated subscribers. Wider network part 1806 is responsible for routing traffic (e.g. packetized data traffic encoded according to the Hypertext Transfer Protocol (HTTP)) to and from one or more server entities accessible via wider network part 1806, including at least advertisement server entity 1808.

An intermediate entity 1810 is introduced into service provider network 1804 between subscriber client device 1802 and wider network part 1806. Intermediate entity 1810 may be physically located in service provider network 1804, or logically located in service provider network 1804 through the use of, for example, a virtual or backhaul private network, but physically located/hosted elsewhere. Service provider network 1804 is adapted to route traffic between subscriber client device 1802 and wider network part 1806 via intermediate entity 1810. Intermediate entity 1810 is adapted to communicate with subscriber profile database 1812 whereby to be able to perform a lookup in subscriber profile database 1812 for a given subscriber client device and/or associated subscriber. According to embodiments, this lookup is performed on the basis of a unique identifier associated with the subscriber client device, such as a Mobile Subscriber Integrated Services Digital Network Number (MSISDN) or an International Mobile Equipment Identity (IMEI) number. According to embodiments, this lookup is performed on the basis of a unique identifier for the subscriber associated with the given subscriber client device, such as a registration number or user name. Intermediate entity 1810 is configured to process traffic according to the results of such a lookup in subscriber profile database 1812. According to embodiments, the contents of subscriber profile database 1812 are defined by the service provider. In accordance with the results of the lookup in subscriber profile database 1812, modifications may be made to one or more advertising content requests and/or advertising content responses between a subscriber client device 1802 and one or more server entities, such as advertisement server entity 1808.

By modifying one or more advertising content requests and/or advertising content responses at intermediate entity 1810 in service provider network part 1804, embodiments are in contrast to known modification techniques wherein modification is performed by one or more of: a browser on a subscriber client device (according to code running locally on the browser), a server (during construction of a advertising content response), a border entity responsible for managing access to a given network part, a gateway entity responsible for translating between network protocols used in different network parts, a caching entity responsible for caching and serving data commonly requested between network parts, a network device outside of the carrier entity, or an encoding entity responsible for modifying advertising content traffic for efficient routing. Thus, in certain embodiments, the modification is not performed by a browser on a subscriber client device, by a server during construction of a advertising content response, a border entity responsible for managing access to a given network part, a gateway entity responsible for translating between network protocols used in different network parts, a caching entity responsible for caching and serving data commonly requested between network parts, a network device outside of the carrier entity, and/or an encoding entity responsible for modifying advertising content traffic for efficient routing.

Further, according to embodiments, by modifying one or more advertising content requests and/or advertising content responses at intermediate entity 1810 in service provider network part 1804, the received advertising content requests and advertising content responses comprise sufficient information to enable routing between subscriber client device 1802 and wider network part 1806 prior to modification by intermediate entity 1810. This is in contrast to the known modification techniques described above, wherein modification at the mentioned locations takes place during the generation of the given advertising content request/advertising content response, or during modification for conventional traffic routing operations.

According to embodiments, service provider network 1804 comprises a routing fabric, responsible for routing traffic between subscriber client device 1802 and wider network part 1806. The service provider network 1804 may include a routing system that selects the route for calls or data. According to embodiments, intermediate entity 1810 is located in the routing fabric of service provider network 1804. Conventionally, the routing fabric of the service provider network is reserved for routing only, and not the modification of advertising content traffic. However, embodiments adapt the routing fabric through the introduction of intermediate entity 1810.

Figure 19:
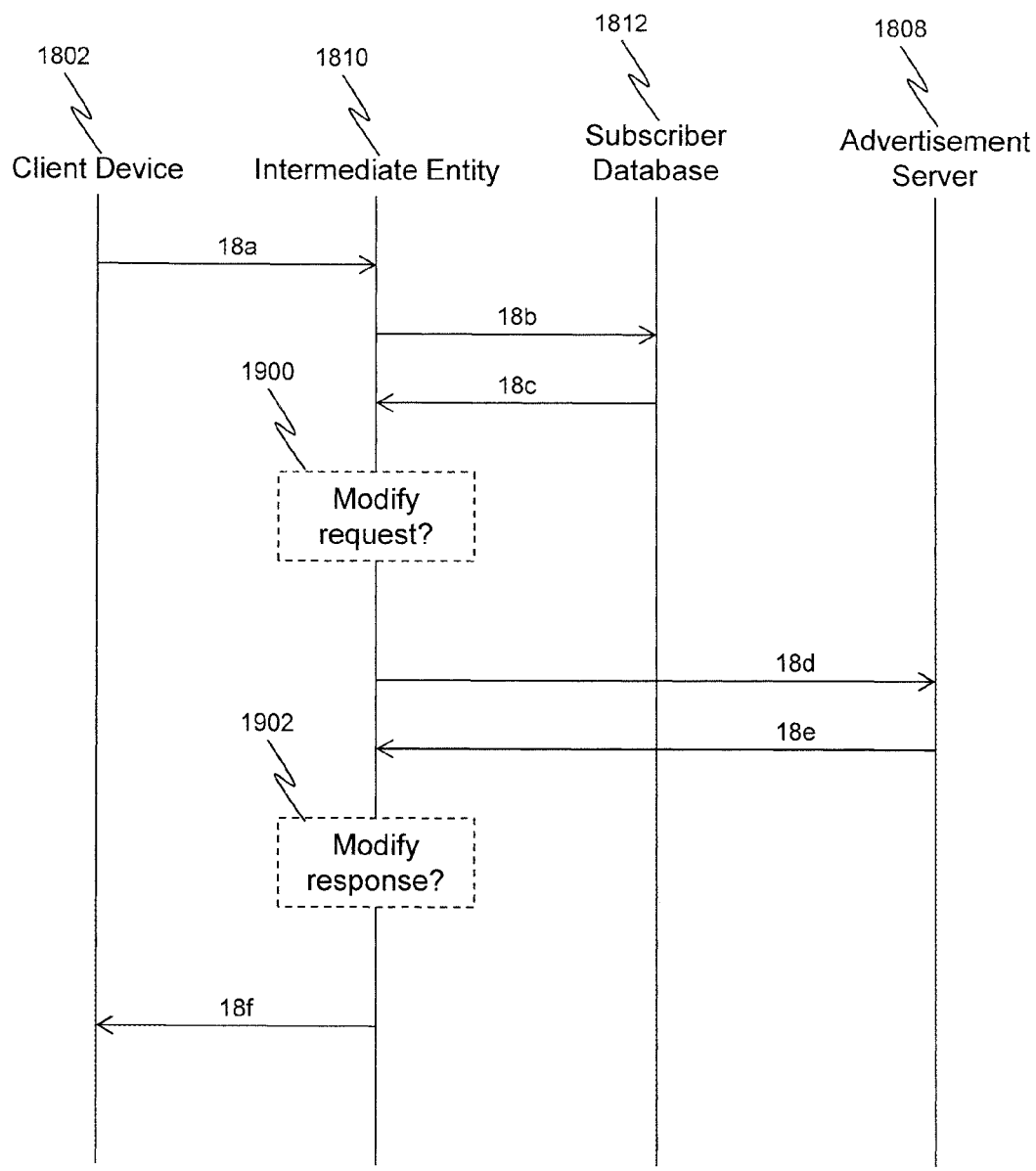
FIG. 19 shows a flow diagram according to embodiments.

FIG. 19 illustrates the operation of intermediate entity 1810 in the context of obtaining advertising content at subscriber client device 1802 from advertisement server entity 1808. At step 18a, an advertisement content request is transmitted from subscriber client device 1802 into telecommunications network 1800. The advertisement content request of step 18a could originate from a browser application on subscriber client device 1802 and form part of an ongoing browser session, or originate from a non browser application on subscriber client device 1802. As service provider network 1804 is configured to route all traffic via intermediate entity 1810, the advertisement content request is then received at intermediate entity 1810 in the service provider network.

Having received the advertisement content request of step 18a, intermediate entity 1810 performs a lookup in subscriber profile database 1812 located within service provider network 1804 for subscriber client device 1812 and/or the associated subscriber in step 18b. The results of the lookup are received by intermediate entity 1810 from subscriber profile database 1812 in step 18c. Intermediate entity 1810 then processes the advertisement content request received in step 18a according to the results of the lookup received in step 18c. As a result of the processing, intermediate entity 1810 may modify the received advertisement content request at step 1900. Having processed the advertisement content request, the processed advertisement content request is then transmitted, in step 18d, to server entity 1808.

Upon receipt of the advertisement content request transmitted in step 18d, server entity 1808 processes the advertisement content request in order to generate a corresponding advertisement content response. At step 18e, server entity 1808 transmits the generated advertisement content response into telecommunications network 1800, directed at subscriber client device 1802. Again, as service provider network 1804 is configured to route all traffic via intermediate entity 1810, upon entering service provider network 1804 the advertisement content response is then received at intermediate entity 1810 in the service provider network.

Having received the advertisement content response in step 18e, intermediate entity 1810 then processes the received advertisement content response according to the results of the lookup received in step 18c. As a result of the processing, intermediate entity 1810 may modify the received advertisement content response at step 1902. Having processed the advertisement content response, the processed advertisement content response is then transmitted, in step 18f, to subscriber client device 1802.

According to embodiments, the results of the lookup are held in memory of intermediate entity 1810 for use in future processing of advertisement content traffic. Hence, whilst in the example described in relation to FIG. 19, the lookup is performed in response to receipt of the advertisement content request of step 18a at intermediate entity 1810, in some embodiments, the results of the lookup may already be held in memory of intermediate entity 1810 as a result of a previous query of the subscriber profile database performed in relation to the processing of previous traffic.

According to embodiments, wherein the advertisement content request forms part of an ongoing browser session, the lookup is performed in response to receipt of a web page request received from subscriber client device 1802 prior to receipt of the advertising content request. Hence, where the web page comprises advertisement content that must be obtained in response to a subsequent advertising content request, by performing the lookup in response to receipt of the web page request, the results of the lookup will have already been obtained when the subsequent advertising content request is received.

By defining the data stored in subscriber profile database 1812, the service provider is able to provide a number of enhanced browser session processing features compared to conventional advertising content traffic processing.

According to embodiments, by modifying at least one of the advertising content request and the advertising content response, the advertising content processing can be made to cause the subscriber client device to receive modified advertisement content as a result of a modification made to either the advertising content request in step 1900 and/or the advertising content response in step 1902. In situations where such modification is desirable for an advertiser entity associated with the advertisement server entity, revenue can be obtained from the advertiser entity for carrying out the modification, i.e. on the basis of the modification. In some embodiments, server entity 1808 comprises a broker entity responsible for providing advertisement brokering services to a plurality of advertisement server entities (not shown). In some embodiments, the advertiser entity comprises an advertiser network, responsible for serving adverts on behalf of an advertising agency or advertiser.

The modification performed as a result of processing the advertising content traffic according to the results of the lookup in the subscriber profile database may comprise one or more of: deleting a part of the advertisement content request, deleting a part of the advertisement content response, altering a part of the advertisement content request, altering a part of the advertisement content response, adding to the advertisement content request, and adding to the advertisement content response. This may comprise modifying part of the data, a header or another object such as a cookie.

According to embodiments, the results of the lookup in the subscriber profile database may comprise one or more subscriber advertising content rules associated with the subscriber client device and/or the associated subscriber, which cause the subscriber client device to receive modified advertising content.

According to embodiments, the results of the lookup in the subscriber profile database may comprise one or more restrictions on advertising content which should be applied to the given subscriber client device and/or associated subscriber. Such restrictions might comprise an age related restriction for filtering age-restricted advertising content, a list of advertising content types which should not be delivered or some other form of advertising content filter for preventing delivery of undesired advertising content.

According to embodiments, the results of the lookup in the subscriber profile database may comprise one or more special access requirements associated with the given subscriber client device and/or associated subscriber. For example, the results of the lookup in the subscriber profile database may indicate that the given subscriber is color blind, in which case the advertising content request may be modified to request advertising content with a suitable color palette. Further, the results of the lookup in the subscriber profile database may indicate that the given subscriber is deaf, in which case in which case the advertising content request may be modified to advertising content without audio, or with subtitles provided.

According to embodiments, the results of the lookup in the subscriber profile database may comprise a natural language preference associated with the given subscriber client device and/or associated subscriber. By modifying an advertising content request, advertising content can instead be requested in the preferred natural language if available. Alternatively, by modifying the advertising content response, the advertising content can be replaced with a translated version of that content.

According to embodiments, the modification may comprise modifying the advertisement content request to include additional data. Hence, when the advertisement content request is received by advertisement server entity 1808, advertisement server entity 1808 receives further information regarding the advertisement content request, and is thus able to generate a more relevant advertisement content response. In such cases, having further information about the advertisement content request allows the advertisement server entity to serve more highly relevant adverts to the subscriber. More highly relevant adverts can generate more revenue for advertisers. Further, more highly relevant adverts can also lead to increased business value for advertisers or advertisement brokers. Hence, according to embodiments, revenue is obtained from an advertiser entity for carrying out the modification, i.e. on the basis of the modification of the advertisement content request and/or the advertisement content response.

According to embodiments, performing the lookup comprises retrieving, from subscriber database 1812, one or more subscriber profile attributes associated with the subscriber client device and/or the associated subscriber. According to embodiments, intermediate entity 1810 may modify the advertisement content request to include an indication of one or more of the subscriber profile attributes retrieved from subscriber database 1812 in the lookup. Hence, advertisement server entity 1808 is informed as to one or more subscriber profile attributes associated with the subscriber client device and/or the associated subscriber, and can thus generate a correspondingly more relevant advertisement content response. According to embodiments, the subscriber profile attributes may identify a given hobby, topic or interest associated with the subscriber, such as cricket, cars or reading. According to embodiments, the subscriber profile attributes identify a given browsing behavior characteristic associated with the subscriber, such as a regularly visited website or regularly used service. Such a browsing behavior characteristic may be determined by logging and analyzing traffic in relation to the given subscriber client device and/or the associated subscriber.

According to embodiments, intermediate entity 1810 may modify the advertisement content request to include data representative of the identity of the service provider. Hence, advertisement server entity 1808 is informed as to the identity of the service provider that provides a service to the originator of the received advertisement content request, and can thus generate a correspondingly more relevant advertisement content response.

According to embodiments, intermediate entity 1810 may modify the advertisement content request to include data representative of the geographical location of the subscriber client device. The geographical location of the subscriber client device can be obtained from known service provider networking operations, such as cell-tower location lookup, and/or cell trilateration. Hence, advertisement server entity 1808 is informed of the geographical location of the subscriber client device, and can thus generate a correspondingly more relevant advertisement content response.

According to embodiments, the subscriber database is remotely configurable. The subscriber database may be configured by a subscriber database administration entity located within the service provider network, for example operated by an employee of the service provider. Alternatively, the subscriber database may be configured by a subscriber database administration entity located outside the service provider network, for example operated by a contractor, a subscriber, a law enforcement entity, a regulatory body, etc. In such embodiments, the subscriber database may be remotely configured in response to receipt of a subscriber database configuration message, for example from a subscriber database administration entity.

According to embodiments, intermediate entity 1810 is further configured to process advertisement content traffic according to one or more advertisement content processing modification rules. According to embodiments, the advertisement content processing modification rules are defined by the service provider. According to further embodiments, the advertisement content processing modification rules are initially defined by an equipment supplier, with subsequent advertisement content processing modification rules being defined by the service provider. According to further embodiments, the defined advertisement content processing modification rules are configured by a rules administration entity. In such embodiments, modifications may be made to one or more advertisement content requests and/or advertisement content responses in accordance with the results of a lookup in subscriber profile database 1812 and the advertisement content processing modification rules.

In embodiments of the present disclosure, a rules engine is utilized to process the one or more advertisement content requests and/or advertisement content responses according to the advertisement content processing modification rules. In embodiments, a rules engine is comprised in intermediate entity 1810, for example in the form of an installed software application.

According to embodiments, intermediate entity 1810 holds the one or more advertisement content processing modification rules in operating memory. According to some embodiments, intermediate entity 1810 obtains at least one of the one or more advertisement content processing modification rules in response to querying a rules database located within the service provider network. In some embodiments, the one or more advertisement content processing modification rules are remotely configurable. The advertisement content processing modification rules may be configured by a rules administration entity located within the service provider network, for example operated by an employee of the service provider. Alternatively, the advertisement content processing modification rules may be configured by a rules administration entity located outside the service provider network, for example operated by a contractor, a subscriber, a law enforcement entity, a regulatory body, etc. In such embodiments, the one or more advertisement content processing modification rules may be remotely configured in response to receipt of a rule configuration message, for example from a rules administration entity.

Figure 20:
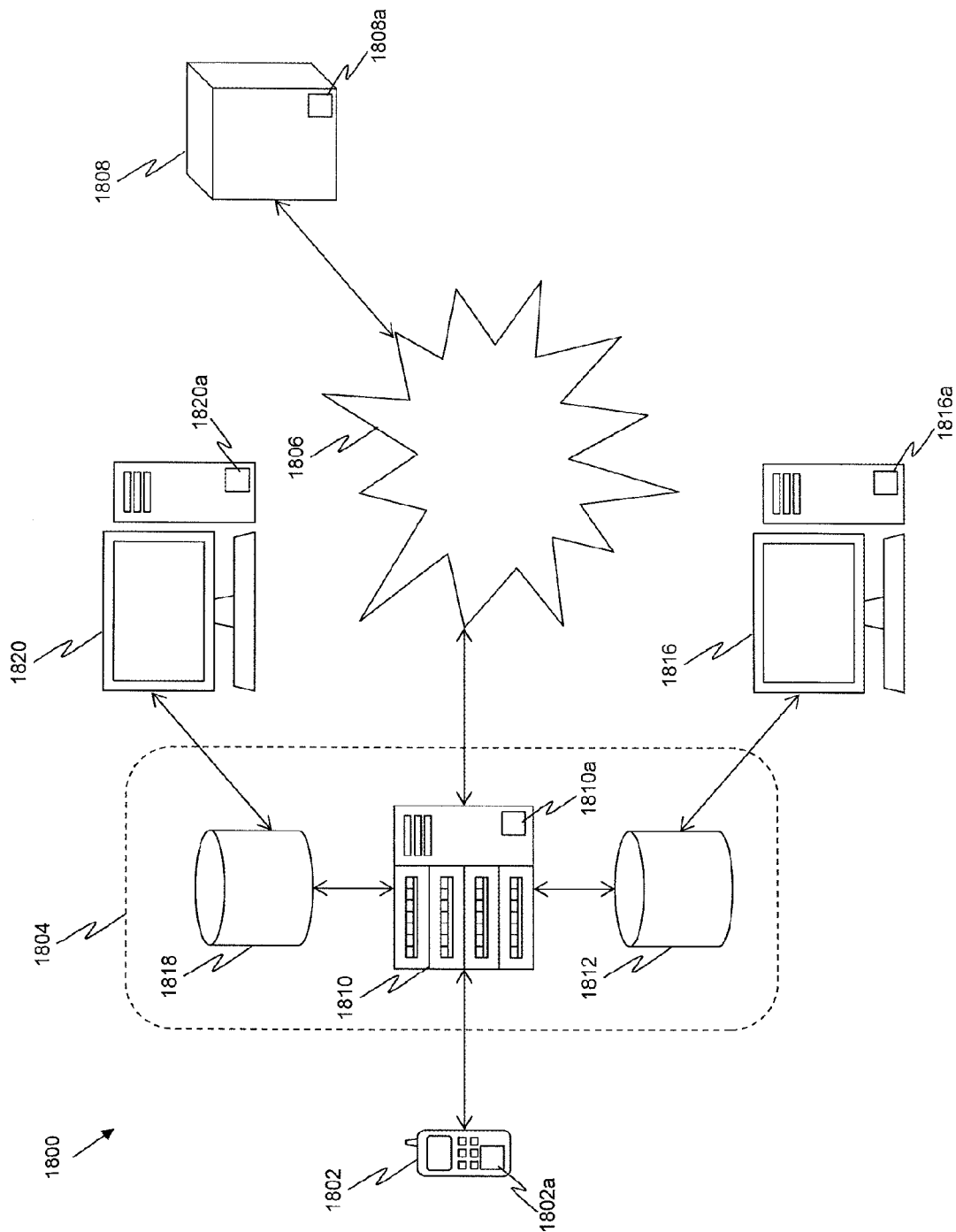
FIG. 20 shows a system diagram according to embodiments.

FIG. 20 shows telecommunications network 1800 according to embodiments. The functionality of subscriber client device 1802, service provider network part 1804, and wider network part 1806, server entity 1808, intermediate entity 1810 and subscriber profile database 1812 are the same as described above in relation to FIG. 18. However, in the embodiments shown in FIG. 20, service provider network further comprises rules database 1818, which contains the one or more advertisement content processing modification rules. Subscriber database administration entity 1816 is capable of configuring the subscriber profile database by transmitting a subscriber database configuration message to subscriber profile database 1812. This may occur via a direct connection to service provider network 1804 (as shown) or via wider network part 1806. Rules administration entity 1820 is capable of configuring the one or more advertisement content processing modification rules by transmitting a rules configuration message to rules database 1818. Again, this may occur via a direct connection to service provider network 1804 (as shown) or via wider network part 1806. In any of the aforementioned embodiments, one or more of subscriber client device 1802, server entity 1808, intermediate entity 1810, subscriber database administration entity 1816 and rules administration entity 1820 comprise a processor or a processing system comprising one or more processors and one or more memories (such as a RAM or ROM), as depicted by processing systems 1802a, 1808a, 1810a, 1816a and 1820a respectively.

One or more of the aspects of the embodiments described herein with reference to the drawings comprise processes performed by one or more of subscriber client device 1802, server entity 1808, intermediate entity 1810, subscriber database administration entity 1816 and rules administration entity 1820. In embodiments, the subscriber client device 1802, server entity 1808, intermediate entity 1810, subscriber database administration entity 1816 and rules administration entity 1820 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to in the context of subscriber profile database 1812 and/or rules database 1818 may comprise any suitable storage medium, including solid-state drives (SSD) or other semiconductor-based RAM; a ROM, for example a CD ROM or a semiconductor ROM; or a magnetic recording medium, for example a floppy disk or hard disk.

According to embodiments, the advertisement content request received at intermediate entity 1810 is directed to a server entity located within the service provider network. In such embodiments, the advertisement content request is transmitted by intermediate entity 1810 to the server entity located within the service provider network, and the corresponding advertisement content response is received at intermediate entity 1810 from the server entity located within the service provider network. As in previous embodiments, intermediate entity 1810 is configured to modify, prior to the respective transmittal, at least one of the browser session request and the advertisement content response according to the results of the lookup.

Figure 21:
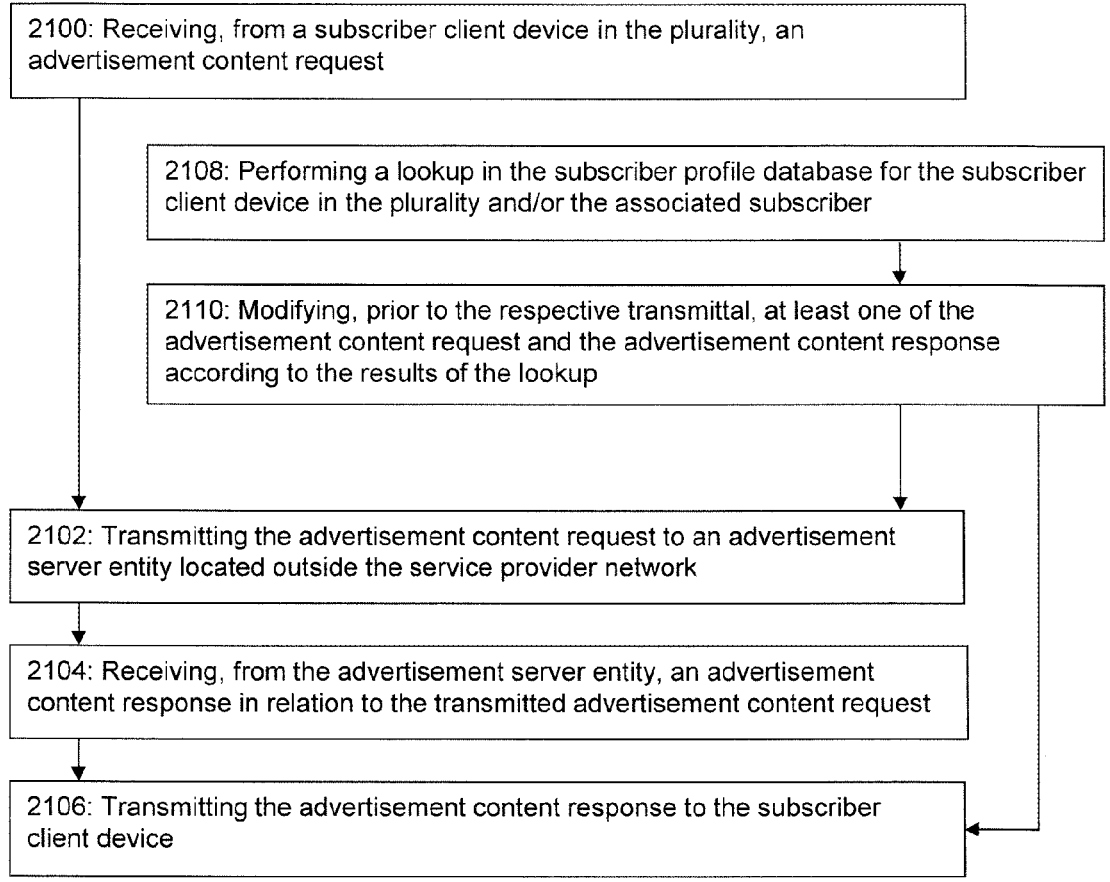
FIG. 21 shows a flow chart according to embodiments.

FIG. 21 is a flow diagram that describes embodiments from the perspective of intermediate entity 1810. At step 2100, an advertisement content request is received from a subscriber client device in the plurality. At step 2102, the advertisement content request is transmitted to a server entity located outside the service provider network. At step 2104, an advertisement content response is received from the server entity in relation to the transmitted advertisement content request. At step 2106, the advertisement content response is transmitted to the subscriber client device. At step 2108, a lookup in the subscriber profile database is performed for the subscriber client device in the plurality and/or the associated subscriber. At step 2110, prior to the respective transmittal, at least one of the advertisement content request and the advertisement content response are modified according to the results of the lookup.

Embodiments comprise a method of enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from a subscriber client device in the plurality, an advertisement content request; transmitting the advertisement content request to an advertisement server entity located outside the service provider network; performing a lookup in the subscriber profile database for the subscriber client device in the plurality and/or the associated subscriber; and modifying, prior to the transmittal, the advertisement content request according to the results of the lookup.

Embodiments comprise a method of enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network: receiving, from an advertisement server entity located outside the service provider network, an advertisement content response in relation to an advertisement content request originating from a subscriber client device in the plurality; transmitting the advertisement content response to the subscriber client device; performing a lookup in the subscriber profile database for the subscriber client device in the plurality and/or the associated subscriber; and modifying, prior to the transmittal, the advertisement content response according to the results of the lookup.

Embodiments comprise a method of enabling advertising content delivery in a telecommunications network, the telecommunications network comprising a carrier network operated by a carrier responsible for providing telecommunications services to a plurality of subscriber client devices each having an associated subscriber, the carrier network comprising a subscriber profile database containing subscriber profile data specific to each subscriber client device and/or associated subscriber, the method comprising, at an entity in the carrier network: receiving, from a subscriber client device in the plurality, an advertisement content request; transmitting the advertisement content request to an advertisement server entity located outside the carrier network; receiving, from the advertisement server entity, an advertisement content response in relation to the transmitted advertisement content request; transmitting the advertisement content response to the subscriber client device; performing a lookup in the subscriber profile database for the subscriber client device in the plurality and/or the associated subscriber; and modifying, prior to the respective transmittal, at least one of the advertisement content request and the advertisement content response according to the results of the lookup.

Embodiments of the present disclosure introduce an intermediate entity into a service provider network between a plurality of subscriber client devices and the wider network, whereby to enable the modification of standard browser session processing to provide enhanced functionality.

Figure 22:
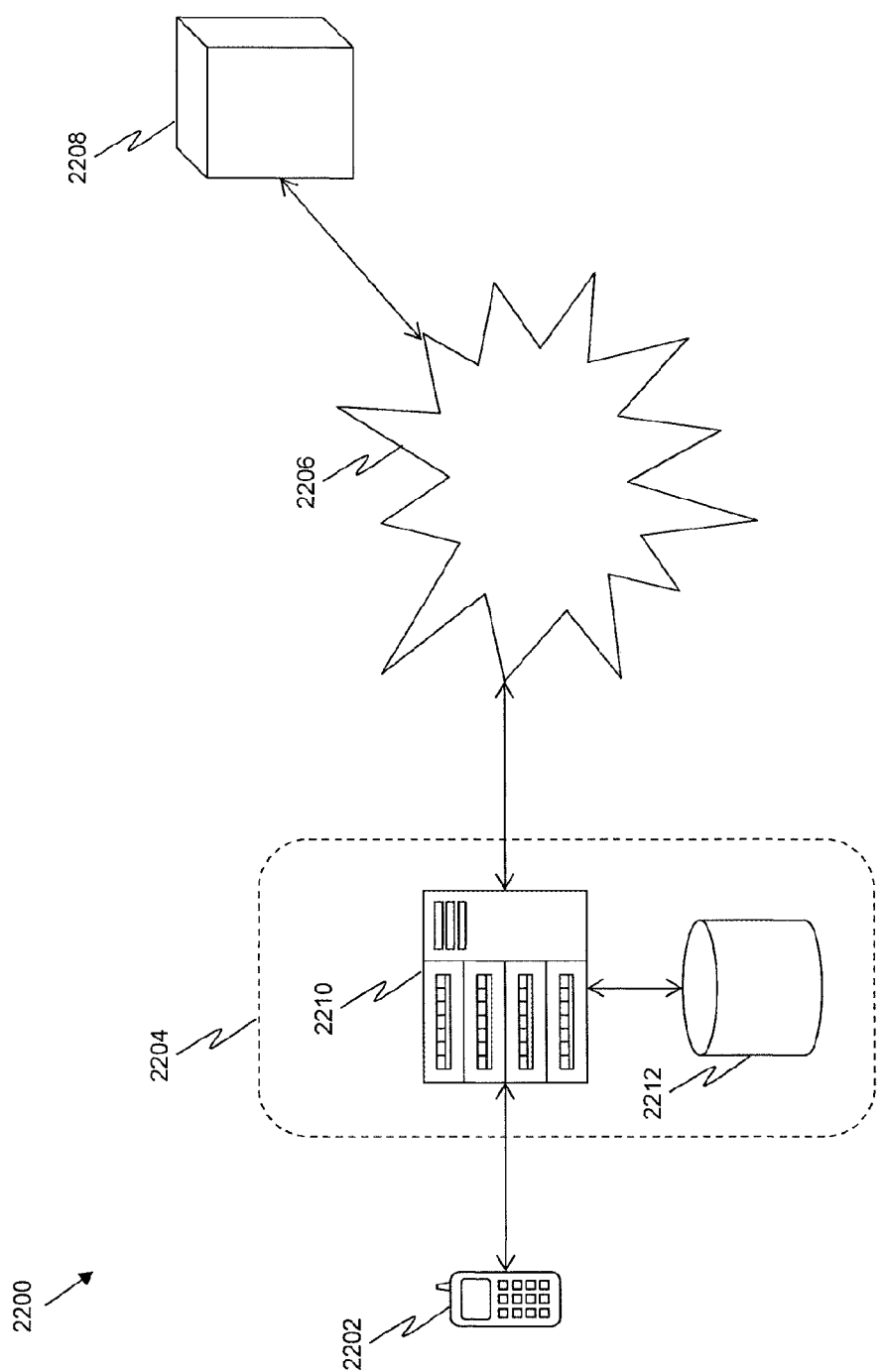
FIG. 22 shows a system diagram according to embodiments.

FIG. 22 shows a telecommunications network 2200 according to embodiments of the present disclosure. Telecommunications network 2200 comprises at least service provider network part 2204 and wider network part 2206. Telecommunications network 2200 may additionally comprise further network parts (not shown), and or border/gateway/caching entities (not shown) for translating between the various network protocols used in each network part, caching and serving commonly accessed data so as to reduce load between network parts and/or managing access to each network part. Service provider network part 2204 is responsible for providing telecommunications services to a plurality of subscribers including at least a given subscriber, each subscriber having one or more associated subscriber client devices, including at least subscriber client device 2202 associated with the given subscriber. A subscriber client device may be configured to communicate voice and data. Examples of subscriber client devices may include personal computers, laptop computers, mobile telephones (including "smart phones"), tablet computers, personal digital assistants, etc.

According to embodiments, service provider network part 2204 comprises a carrier network operated by a carrier. According to embodiments, service provider network part 2204 comprises a mobile network (which may be in the form of a cellular network) operated by a mobile network operator (MNO). According to embodiments, service provider network part 2204 comprises an internet service provider network operated by an internet service provider (ISP). According to embodiments, service provider network part 2204 comprises one or more wireless local area network (WLAN) parts, which may for example operate according to an Institute of Electrical and Electronics Engineers (IEEE) 802.11 "Wi-Fi" protocol. Service provider network part 2204 also comprises subscriber profile database 2212. Subscriber profile database 2212 stores subscriber profile data specific to each subscriber in the plurality and/or associated subscriber client devices. Wider network part 2206 is responsible for routing traffic (e.g. packetized data traffic encoded according to the Hypertext Transfer Protocol (HTTP)) to and from one or more server entities accessible via wider network part 2206, including at least server entity 2208.

An intermediate entity 2210 is introduced into service provider network 2204 between subscriber client device 2202 and wider network part 2206. Intermediate entity 2210 may be physically located in service provider network 2204, or logically located in service provider network 2204 through the use of, for example, a virtual or backhaul private network, but physically located/hosted elsewhere. Service provider network 2204 is adapted to route browser session traffic between subscriber client device 2202 and wider network part 2206 via intermediate entity 2210. Intermediate entity 2210 is adapted to log information associated with browser session traffic to/from one or more subscriber client devices associated with one or more subscribers in the plurality, including at least subscriber client device 2202, and one or more entities located outside service provider network 2204, including at least server entity 2208, accessible via wider network part 2206.

Intermediate entity 2210 is further adapted to analyze the logged information in combination with subscriber profile data contained in the subscriber profile database specific to the given subscriber for the presence of one or more predetermined characteristics. According to embodiments, the subscriber profile data is retrieved from the subscriber profile database 2212 by intermediate entity 2210 performing a lookup in subscriber profile database 2212 for subscriber client device 2202 and/or the associated subscriber. According to embodiments, this lookup is performed on the basis of a unique identifier associated with the subscriber client device, such as a Mobile Subscriber Integrated Services Digital Network Number (MSISDN) or an International Mobile Equipment Identity (IMEI) number. According to embodiments, this lookup is performed on the basis of a unique identifier for the subscriber associated with the given subscriber client device, such as a registration number, username or suchlike.

In response to the analysis indicating the presence of at least one of the one or more predetermined characteristics, intermediate entity 2210 is further adapted to initiate delivery of targeted content data associated with the indicated at least one predetermined characteristic to at least one of the one or more subscriber client devices associated with the given subscriber, including at least subscriber client device 2202.

By initiating delivery of targeted content data at intermediate entity 2210 in service provider network part 2204, embodiments are in contrast to known content delivery techniques wherein delivery may be initiated by one or more of: a browser on a subscriber client device (according to code running locally on the browser), a server (during construction of a browser session response), a border entity responsible for managing access to a given network part, a gateway entity responsible for translating between network protocols used in different network parts, a caching entity responsible for caching and serving data commonly requested between network parts, a network device outside of the carrier entity, or an encoding entity responsible for modifying browser session traffic for efficient routing. Thus, in certain embodiments, the initiation is not performed by a browser on a subscriber client device, by a server during construction of a browser session response, a border entity responsible for managing access to a given network part, a gateway entity responsible for translating between network protocols used in different network parts, a caching entity responsible for caching and serving data commonly requested between network parts, a network device outside of the carrier entity, and/or an encoding entity responsible for modifying browser session traffic for efficient routing.

According to embodiments, service provider network 2204 comprises a routing fabric, responsible for routing traffic between subscriber client device 2202 and wider network part 2206. The service provider network 2204 may include a routing system that selects the route for calls or data. According to embodiments, intermediate entity 2210 is located in the routing fabric of service provider network 2204. Conventionally, the routing fabric of the service provider network is reserved for routing only, and not the initiation of delivery of targeted content data. However, embodiments adapt the routing fabric through the introduction of intermediate entity 2210.

Figure 23:
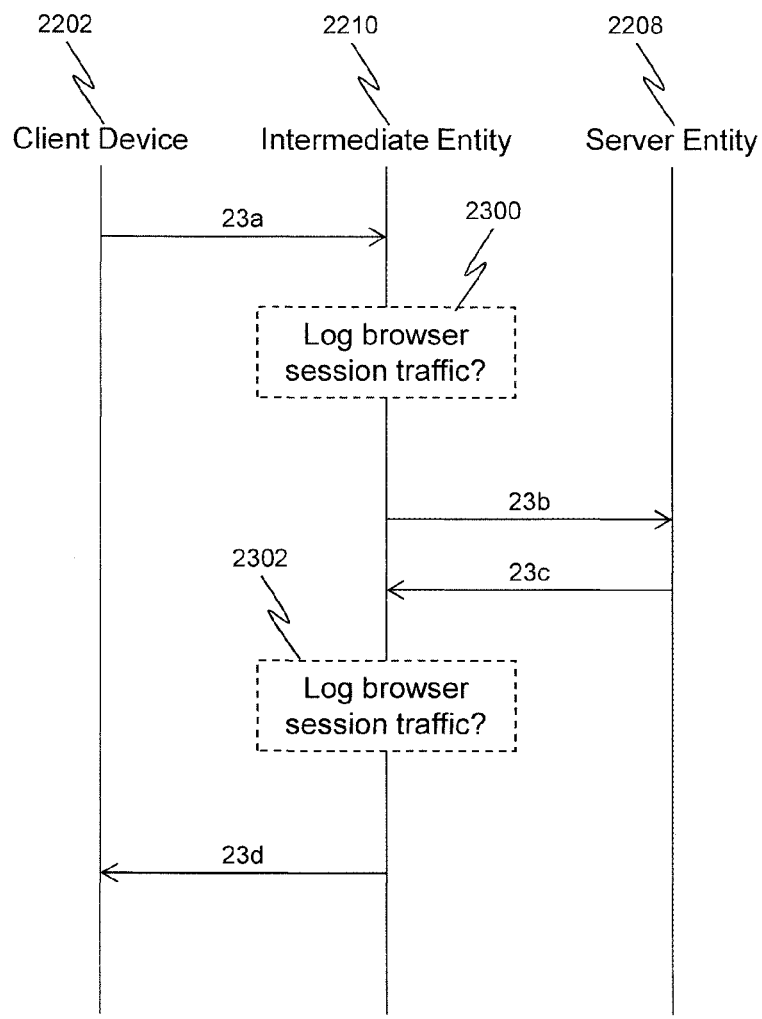
FIG. 23 shows a flow diagram according to embodiments.

FIG. 23 illustrates the operation of intermediate entity 2210 in relation to a browser session taking place between subscriber client device 2202 and server entity 2208 according to embodiments. At step 23a, a browser session request is transmitted from subscriber client device 2202 into telecommunications network 2200. The browser session request of step 23a could comprise a request for a web page, web page element, data file, service, etc. As service provider network 2204 is configured to route all browser session traffic via intermediate entity 2210, the browser session request is then received at intermediate entity 2210 in the service provider network.

Having received the browser session request in step 23a, intermediate entity 2210 may then log information relating to the browsing session by examining one or more parts of the browser session request at step 2300. These parts may include the content data, the header data or other object such as a cookie. Having examined and/or logged information relating to the browser session request, the browser session request is then transmitted, in step 23b, to server entity 2208.

Upon receipt of the browser session request transmitted in step 23b, server entity 2208 processes the browser session request in order to generate a corresponding browser session response. At step 23c, server entity 2208 transmits the generated browser session response into telecommunications network 2200, directed at subscriber client device 2202. As service provider network 2204 is configured to route all browser session traffic via intermediate entity 2210, upon entering service provider network 2204, the browser session response of step 23c is then received at intermediate entity 2210 in service provider network 2204.

Having received the browser session request in step 23c, intermediate entity 2210 may again log information relating to the browsing session by examining one or more parts of the browser session response at step 2302. Having examined and/or logged information relating to the browser session response, the browser session response is then transmitted, in 23d, to subscriber client device 2202.

According to embodiments, the information associated with the browser session traffic comprises one or more of, the specific website being accessed (e.g. Facebook.com), the type of website being accessed (e.g. social networking), the type of content being accessed (e.g. video content), the type of service being used (e.g. instant messaging), the type of application being used (e.g. browser) and the type of data being transmitted (e.g. HTTP).

According to embodiments, the logging comprises holding the information associated with the browser session traffic in operating memory in intermediate entity 2210. According to further embodiments, the logging comprises storing the information associated with the browser session traffic in persistent memory, such as subscriber profile database 2212.

According to embodiments, the analysis is performed in response to logging new information associated with the browser session traffic, for example as per either step 2300 or 2302 above. According to embodiments, the analysis is performed in response to a change in the information associated with the browser session traffic. According to embodiments, the analysis is performed in response a change in the subscriber profile data specific to the given subscriber. According to alternative embodiments, the analysis may be performed offline, subsequent to logging the information associated with the browser session traffic, e.g. periodically, or once a sufficient volume of information has been logged.

According to embodiments, the analysis is performed by an inference engine according to one or more inference rules. The inference engine may be comprised in intermediate entity 2210, for example in the form of an installed software application.

According to embodiments, the targeted content data comprises advertisement content. According to embodiments, the targeted content data comprises a service contract offer. According to embodiments, the service contract offer is associated with a telecommunications service provided by the service provider. In embodiments, the analysis could comprise analysis of browser session traffic of a subscriber currently browsing a news website, and whose subscriber profile data shows that they are interested in sport, and thus the analysis may identify the presence of a predetermined characteristic related to sports news. In response to the analysis identifying this characteristic, intermediate entity 2210 could initiate delivery of targeted content to the subscriber which comprises a service contract offer for a service contract that includes free sports news updates.

According to embodiments, the targeted content data may be generated by intermediate entity 2210 on the basis of identified subscriber profile data and the one or more predetermined characteristics. According to other embodiments, the targeted content data may be generated, at least in part, on the basis of data stored in a targeted content data database (not shown). For example, the targeted content database may comprise a number of items of targeted content, such as information relating to a number of different service contract offers that can be made. In response to the analysis detecting a predetermined characteristic, intermediate entity 2210 may query the targeted content database for an item of targeted content data that corresponds to the predetermined characteristic, and initiate delivery of the targeted content data to one or more of the subscriber client devices associated with the given subscriber. According to embodiments, the targeted content data database is comprised in the service provider network.

According to embodiments, the targeted content data is generated on the basis of an identifier associated with the subscriber client device to which it will be delivered. In this way, the targeted content can be optimized for the device on which it will be received. According to some such embodiments, the identifier relates to a type of subscriber client device. This could include whether the device is a mobile telephone, tablet, laptop, personal computer etc. For example, in embodiments where the targeted content data comprises an image, a higher resolution version of the targeted content could be provided to a tablet device, while a lower resolution version of the targeted content could be provided to a mobile telephone device. According to further such embodiments, the identifier relates to a capability of the subscriber client device. This could include whether the device is capable of displaying image data, playing audio content, rendering video content etc., thereby allowing appropriate targeted content data to be generated. In embodiments, the identifier associated with the subscriber client device is stored in subscriber profile database 2212 and retrieved by intermediate entity 2210 during the analysis of the logged information in combination with the subscriber profile data contained in the subscriber profile database.

According to embodiments, different targeted content data is generated for each of two or more subscriber client devices associated with a given subscriber, and delivery of the targeted content data is initiated accordingly. In such embodiments, the generating comprises generating first targeted content data on the basis of a first identifier associated with the first subscriber client device, and generating second targeted content data on the basis of a second identifier associated with the second subscriber client device. The initiation then comprises initiating delivery of the first targeted content data to the first subscriber client device and initiating delivery of the second targeted content data to the second subscriber client device. In embodiments, the first and second identifiers associated with the subscriber client devices are stored in subscriber profile database 2212 and retrieved by intermediate entity 2210 during the analysis of the logged information in combination with the subscriber profile data contained in the subscriber profile database.

According to embodiments, the initiation of delivery of the targeted content data comprises transmitting the targeted content data to subscriber client device 2202.

According to further embodiments, the initiation of delivery of the targeted content data comprises transmitting a targeted content availability notification to subscriber client device 2202, to notify subscriber client device 2202 as to the availability of the targeted content data. In such embodiments the targeted content data may be hosted at intermediate entity 2210, server entity 2208, or a further entity (not shown). In such embodiments, subscriber client device 2202 is informed as to the availability of the targeted content data, which is then able to request the targeted content data via conventional processing operations. According to embodiments, the initiation comprises utilizing a push notification system to instruct subscriber client device 2202 to request the targeted content data automatically.

According to embodiments, the initiation of delivery of the targeted content data comprises inserting the targeted content data into in an ongoing browser session conducted by subscriber client device 2202. According to such embodiments, service provider network 2204 is configured to route browser session traffic between subscriber client device 2202 and wider network part 2206 via intermediate entity 2210. In such embodiments, the initiating comprises modifying at least one of a browser session request and a browser session response whereby to cause the targeted content data to be inserted into ongoing browser session. According to such embodiments, the modification comprises one or more of: modifying the browser session response to include the targeted content data, modifying the browser session response to include an instruction to request the targeted content data, modifying the browser session request to include a request for the targeted content data, and modifying a browser session request whereby to trigger the inclusion of an instruction to request the targeted content data in a corresponding browser session response. This may comprise modifying part of the data, a header or another object such as a cookie.

According to embodiments, the targeted content data comprises a web page. According to embodiments, the targeted content data comprises a web page element. According to embodiments, the targeted content data comprises advertisement content. According to embodiments, the targeted content data comprises an image. According to embodiments, the targeted content data comprises natural language text data.

According to embodiments, the targeted content data comprises one or more of: a web page, a page element, advertisement content, text data, a short message service (SMS) message, an email, a voicemail, and a telephone call. According to embodiments wherein the targeted content data comprises a telephone call, initiating delivery of the targeted content data results in a telephone call being placed to a telephone number associated with the given subscriber client device. According to embodiments the telephone call is then transferred to a suitable entity, such as a call center operator or similar, for conducting the telephone call. According to further embodiments, the telephone call comprises playing a pre-recorded audio message. According to further embodiments, the targeted content data is provided via an interactive television. According to further embodiments, the targeted content data is provided via an electronic billboard capable of detecting the presence of the given subscriber (for example by use of facial recognition functionality) or subscriber device (for example by detecting a radio frequency identification (RFID) tag embedded within a subscriber device).

According to embodiments, the subscriber profile data comprises the subscriber's current service contract terms. Hence, intermediate entity 2210 can take into account the subscriber's current service contract terms when generating or selecting a service contract offer. For example, if the analysis performed at intermediate entity 2210 on the basis of the monitored browser session traffic and subscriber profile data reveals the predetermined characteristic that the subscriber is exceeding their allocation of internet usage provided by their current service contract, intermediate entity 2210 may select/generate a service contract offer for a service contract that comprises a larger amount of inclusive internet usage, and initiate delivery of that service contract offer to one or more subscriber client devices associated with the given subscriber.

According to embodiments, the subscriber profile data comprises the subscriber's current service contract duration and/or current service contract expiry date. For example, intermediate entity 2210 may refrain from making certain service contract offers until the analysis performed on the basis of the monitored browser session traffic and subscriber profile data reveals the predetermined characteristic that the subscriber is nearing the end of their current service contract.

According to embodiments, the one or more predetermined characteristics comprise a time and/or a frequency related characteristic. According to such embodiments, the one or more predetermined characteristics may comprise one or more of: a remaining duration of the given subscriber's current service contract, a frequency at which the given subscriber accesses a given website, a frequency at which the given subscriber uses a given type of service, a schedule by which the subscriber accesses a given website, a schedule by which the subscriber uses a given type of service, the time subscriber spends accessing a given website, and the time a subscriber spends using a given service.

For example, if the analysis performed at intermediate entity 2210 on the basis of the monitored browser session traffic reveals the predetermined characteristic that the given subscriber frequently visits a given website, or spends a relatively large amount of time accessing the given website, intermediate entity 2210 may select/generate a service contract offer for a service contract that comprises inclusive internet usage for accessing the given website, and initiate delivery of that service contract offer to one or more subscriber client devices associated with the given subscriber.

According to embodiments, intermediate entity 2200 further provisions the service provider network in response to the analysis indicating the presence of at least one predetermined characteristics, on the basis of the indicated at least one predetermined characteristic. For example, if the analysis performed at intermediate entity 2210 on the basis of the monitored browser session traffic reveals the predetermined characteristic that the given subscriber frequently accesses relatively low bandwidth (e.g. text based) content in the morning, but frequently accesses relatively high bandwidth (e.g. high definition video) content in the evening, entity 2210 may provision the service provider network by dynamically altering a bandwidth allocated to the given subscriber in the morning compared to the evening in order to more efficiently manage available network resources.

According to embodiments, the subscriber profile data comprises at least one subscriber profile attribute associated with a given subscriber, enabling targeted content to be delivered, at least in part, on the basis the at least one subscriber profile attribute. According to some such embodiments, the subscriber profile attributes identify a given hobby, topic or interest associated with the subscriber, such as cricket, reading or cars.

According to embodiments where delivery of the targeted content is initiated on behalf of an advertising entity, revenue can be obtained from an advertiser for carrying out the initiating, i.e. on the basis of the initiating of the delivery of the targeted content. Having further information about the subscriber, such as that stored in subscriber database 2212, or associated with browser session traffic allows the advertisement server entity to serve adverts only to those subscribers for which the advert is highly relevant. More highly relevant adverts can lead to generation of increased revenue for advertisers or advertisement brokers. Further, providing more highly relevant adverts can also lead to increased business value for advertisers or advertisement brokers, for example via increased brand awareness.

According to embodiments, the results of the lookup in the subscriber profile database may comprise one or more subscriber targeted content rules associated with the subscriber and/or the associated subscriber client device, which influence the targeted content received by the subscriber client device.

According to embodiments, the results of the lookup in the subscriber profile database comprise one or more restrictions on targeted content which should be applied to the given subscriber and/or associated subscriber client device. Such restrictions might comprise an age-related restriction for filtering age-restricted targeted content, a list of targeted content types which should not be delivered or some other form of targeted content filter for preventing delivery of undesired targeted content.

According to embodiments, the results of the lookup in the subscriber profile database comprise one or more special access requirements associated with the given subscriber and/or associated subscriber client device. For example, the results of the lookup in the subscriber profile database may indicate that the given subscriber is color blind, in which case the targeted content may be generated using a suitable color palette. Further, the results of the lookup in the subscriber profile database may indicate that the given subscriber is deaf, in which case the targeted content can be generated without audio, or with subtitles provided.

According to embodiments, the results of the lookup in the subscriber profile database comprise a natural language preference associated with the given subscriber and/or associated subscriber client device, in which case, the targeted content can be generated with a translated version of the content instead.

According to embodiments, the analysis may be further performed on the basis of the geographical location of the subscriber client device. The geographical location of the subscriber client device can be obtained from known service provider networking operations, such as cell-tower location lookup, and/or cell trilateration. Hence, intermediate entity 2210 can generate/select targeted content data on the basis of the geographical location of the subscriber client device, in order to provide more highly relevant targeted content data.

According to embodiments, the subscriber database is remotely configurable. The subscriber database may be configured by a subscriber database administration entity located within the service provider network, for example operated by an employee of the service provider. Alternatively, the subscriber database may be configured by a subscriber database administration entity located outside the service provider network, for example operated by a contractor, a subscriber, a law enforcement entity, a regulatory body, etc. In such embodiments, the subscriber database may be remotely configured in response to receipt of a subscriber database configuration message, for example from a subscriber database administration entity.

According to embodiments, intermediate entity 2210 is further configured to initiate delivery of the targeted content data according to one or more targeted content delivery rules in combination with the analysis of the monitored browser session traffic and subscriber profile data. According to embodiments, the targeted content delivery rules are defined by the service provider. According to further embodiments, the targeted content delivery rules are initially defined by an equipment supplier, with subsequent targeted content delivery rules being defined by the service provider. According to further embodiments, the defined targeted content delivery rules are configured by a rules administration entity. Embodiments of the present disclosure utilize a rules engine to initiate delivery of the targeted content data according to the targeted content delivery rules. Rules engine is comprised in intermediate entity 2210, for example in the form of an installed software application.

According to embodiments, intermediate entity 2210 holds the one or more targeted content delivery rules in operating memory. According to some embodiments, intermediate entity 2210 obtains at least one of the one or more targeted content delivery rules in response to querying a rules database located within the service provider network. In some embodiments, the one or more targeted content delivery rules are remotely configurable. The targeted content delivery rules may be configured by a rules administration entity located within the service provider network, for example operated by an employee of the service provider. Alternatively, the targeted content delivery rules may be configured by a rules administration entity located outside the service provider network, for example operated by a contractor, a subscriber, a law enforcement entity, a regulatory body, etc. In such embodiments, the one or more targeted content delivery rules may be remotely configured in response to receipt of a rule configuration message, for example from a rules administration entity.

Figure 24:
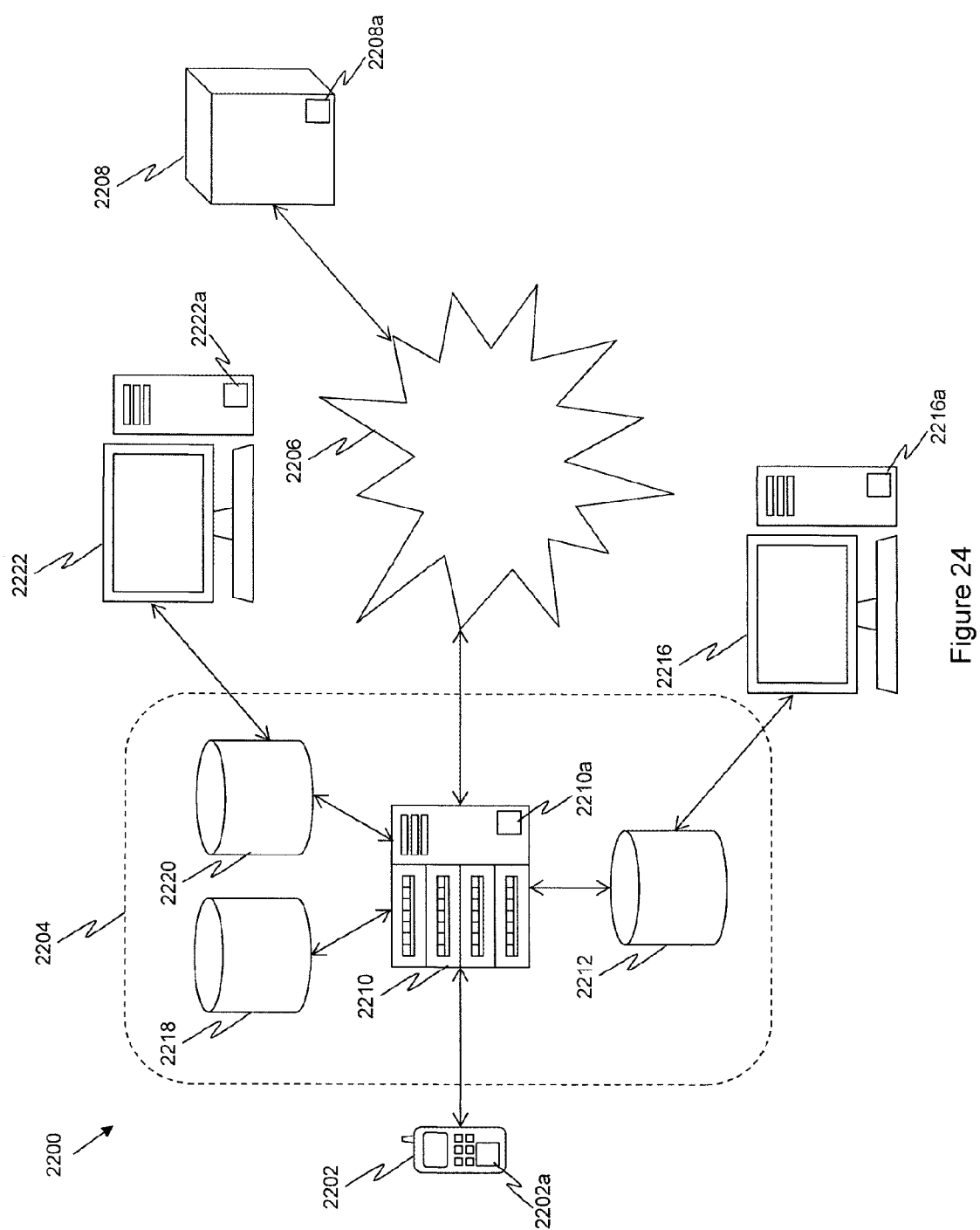
FIG. 24 shows a system diagram according to embodiments.

FIG. 24 shows telecommunications network 2200 according to embodiments. The functionality of subscriber client device 2202, service provider network part 2204, and wider network part 2206, server entity 2208, intermediate entity 2210 and subscriber profile database 2212 are the same as described above in relation to FIG. 22. However, in the embodiments shown in FIG. 24, service provider network further comprises targeted content database 2218, which contains the one or more items of targeted content, and rules database 2220, which contains the one or more targeted content delivery rules. Subscriber database administration entity 2216 is capable of configuring the subscriber profile database by transmitting a subscriber database configuration message to subscriber profile database 2212. This may occur via a direct connection to service provider network 2204 (as shown) or via wider network part 2206. Rules administration entity 2222 is capable of configuring the one or more targeted content delivery rules by transmitting a rules database configuration message to rules database 2220. Again, this may occur via a direct connection to service provider network 2204 (as shown) or via wider network part 2206. In any of the aforementioned embodiments, one or more of subscriber client device 2202, server entity 2208, intermediate entity 2210, subscriber database administration entity 2216 and rules administration entity 2222 comprise a processor or a processing system comprising one or more processors and one or more memories (such as a RAM or ROM), as depicted by processing systems 2202a, 2208a, 2210a, 2216a and 2222a respectively.

One or more of the aspects of the embodiments described herein with reference to the drawings comprise processes performed by one or more of subscriber client device 2202, server entity 2208, intermediate entity 2210, subscriber database administration entity 2216 and rules administration entity 2222. In embodiments, the subscriber client device 2202, server entity 2208, intermediate entity 2210, subscriber database administration entity 2216 and rules administration entity 2222 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to in the context of subscriber profile database 2212, targeted content database 2218 and/or rules database 2220 may comprise any suitable storage medium, including solid-state drives (SSD) or other semiconductor-based RAM; a ROM, for example a CD ROM or a semiconductor ROM; or a magnetic recording medium, for example a floppy disk or hard disk.

Figure 25:
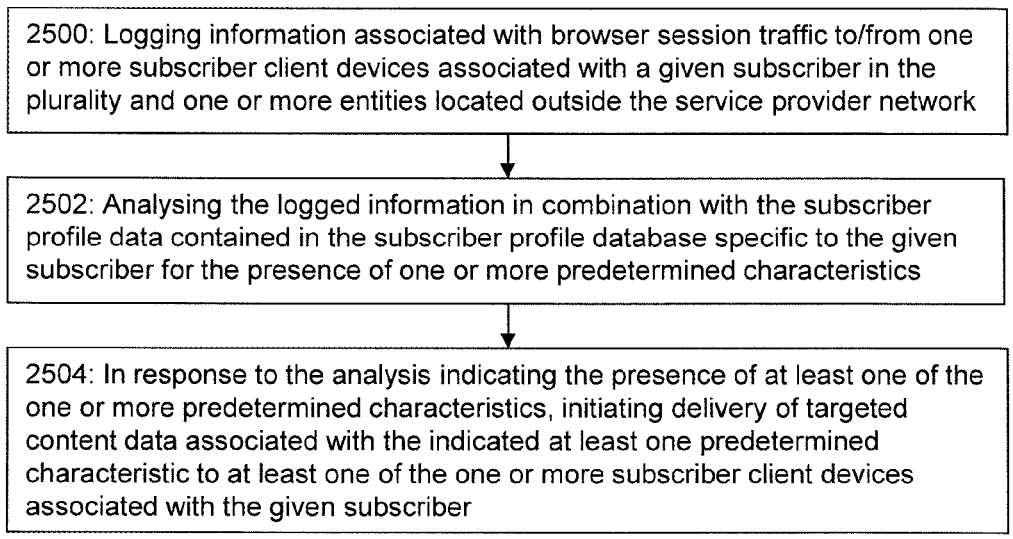
FIG. 25 shows a flow chart according to embodiments.

FIG. 25 is a flow diagram that describes embodiments from the perspective of intermediate entity 2210. At step 2500, information associated with browser session traffic to/from one or more subscriber client devices associated with a given subscriber in the plurality and one or more entities located outside the service provider network is logged. At step 2502, the logged information is analyzed in combination with the subscriber profile data contained in the subscriber profile database specific to the given subscriber for the presence of one or more predetermined characteristics. At step 2504, in response to the analysis indicating the presence of at least one of the one or more predetermined characteristics, delivery of targeted content data associated with the indicated at least one predetermined characteristic is initiated to at least one of the one or more subscriber client devices associated with the given subscriber.

Embodiments comprise a method for use in the provision of targeted content data in a telecommunications network, the telecommunications network comprising a carrier network operated by a carrier responsible for providing telecommunications services to a plurality of subscribers, each subscriber having one or more associated subscriber client devices, the carrier network comprising a subscriber profile database containing subscriber profile data specific to each subscriber in the plurality, the method comprising, at an entity in the carrier network: logging information associated with browser session traffic to/from one or more subscriber client devices associated with a given subscriber in the plurality and one or more entities located outside the carrier network; analyzing the logged information in combination with the subscriber profile data contained in the subscriber profile database specific to the given subscriber for the presence of one or more predetermined characteristics; and in response to the analysis indicating the presence of at least one of the one or more predetermined characteristics, initiating delivery of targeted content data associated with the indicated at least one predetermined characteristic to at least one of the one or more subscriber client devices associated with the given subscriber.

Embodiments of the present disclosure introduce an intermediate entity into a service provider network between a plurality of subscriber client devices and the wider network, whereby to enable improvements over standard network provisioning to provide enhanced functionality.

FIG. 10 shows a telecommunications network 2600 according to embodiments of the present disclosure. Telecommunications network 2600 comprises at least service provider network part 2604 and wider network part 2606. Telecommunications network 2600 may additionally comprise further network parts (not shown), and or border/gateway/caching entities (not shown) for translating between the various network protocols used in each network part, caching and serving commonly accessed data so as to reduce load between network parts and/or managing access to each network part. Service provider network part 2604 is responsible for providing telecommunications services to a plurality of subscribers including at least a given subscriber, each subscriber having one or more associated subscriber client devices, including at least subscriber client device 2602 associated with the given subscriber. A subscriber client device may be configured to communicate voice and data. Examples of subscriber client devices may include personal computers, laptop computers, mobile telephones (including "smart phones"), tablet computers, personal digital assistants, etc.

According to embodiments, service provider network part 2604 comprises a carrier network operated by a carrier. According to embodiments, service provider network part 2604 comprises a mobile network (which may be in the form of a cellular network) operated by a mobile network operator (MNO). According to embodiments, service provider network part 2604 comprises an internet service provider network operated by an internet service provider (ISP). According to embodiments, service provider network part 2604 comprises one or more wireless local area network (WLAN) parts, which may for example operate according to an Institute of Electrical and Electronics Engineers (IEEE) 802.11 "Wi-Fi" protocol. Service provider network part 2604 also comprises subscriber profile database 2612. Subscriber profile database 2612 stores subscriber profile data specific to each subscriber in the plurality and/or associated subscriber client devices. Wider network part 2606 is responsible for routing traffic (e.g. packetized data traffic encoded according to the Hypertext Transfer Protocol (HTTP)) to and from one or more server entities accessible via wider network part 2606, including at least server entity 2608. According to embodiments service provider network part 2604 further comprises optional network provisioning entity 2611.

An intermediate entity 2610 is introduced into service provider network 2604 between subscriber client device 2602 and wider network part 2606. Intermediate entity 2610 may be physically located in service provider network 2604, or logically located in service provider network 2604 through the use of, for example, a virtual or backhaul private network, but physically located/hosted elsewhere. Service provider network 2604 is adapted to route browser session traffic between subscriber client device 2602 and wider network part 2606 via intermediate entity 2610. Intermediate entity 2610 is adapted to monitor browser session traffic to/from one or more subscriber client devices associated with one or more subscribers in the plurality, including at least subscriber client device 2602, and one or more entities located outside service provider network 2604, including at least server entity 2608, accessible via wider network part 2606.

Intermediate entity 2610 is further adapted to analyze the monitored browser session traffic in combination with subscriber profile data contained in the subscriber profile database specific to the given subscriber for the presence of one or more predetermined characteristics. According to embodiments, the subscriber profile data is retrieved from the subscriber profile database 2612 by intermediate entity 2610 performing a lookup in subscriber profile database 2612 for subscriber client device 2602 and/or the associated subscriber. According to embodiments, this lookup is performed on the basis of a unique identifier associated with the subscriber client device, such as a Mobile Subscriber Integrated Services Digital Network Number (MSISDN) or an International Mobile Equipment Identity (IMEI) number. According to embodiments, this lookup is performed on the basis of a unique identifier for the subscriber associated with the given subscriber client device, such as a registration number, username or suchlike.

In response to the analysis indicating the presence of at least one of the one or more predetermined characteristics, intermediate entity 2610 is further adapted to provision the service provider network on the basis of the indicated at least one predetermined characteristic. According to embodiments, the provisioning of the service provider network is specific to telecommunications services provided to/from the given subscriber. According to embodiments, the provisioning of the service provider network is specific to telecommunications services provided to/from a given subscriber client device associated with the given subscriber. According to embodiments, the provisioning of the service provider network is specific to telecommunications services provided to/from a group of subscribers in the plurality of subscribers, the group including at least the given subscriber. According to embodiments, the provisioning of the service provider network is specific to telecommunications services provided to/from a group of subscriber client devices, including at least a subscriber client device associated with the given subscriber.

According to embodiments, service provider network 2604 comprises a routing fabric, responsible for routing traffic between subscriber client device 2602 and wider network part 2606. The service provider network 2604 may include a routing system that selects the route for calls or data. According to embodiments, intermediate entity 2610 is located in the routing fabric of service provider network 2604. Conventionally, the routing fabric of the service provider network is reserved for routing only, and not the provisioning of the service provider network. However, embodiments adapt the routing fabric through the introduction of intermediate entity 2610.

According to embodiments, the intermediate entity is not comprised by the subscriber client device, the server entity, a border entity responsible for managing access to a given network part, a gateway entity responsible for translating between network protocols used in different network parts, a caching entity responsible for caching and serving data commonly requested between network parts, or an encoding entity responsible for modifying browser session traffic for efficient routing.

Figure 27:
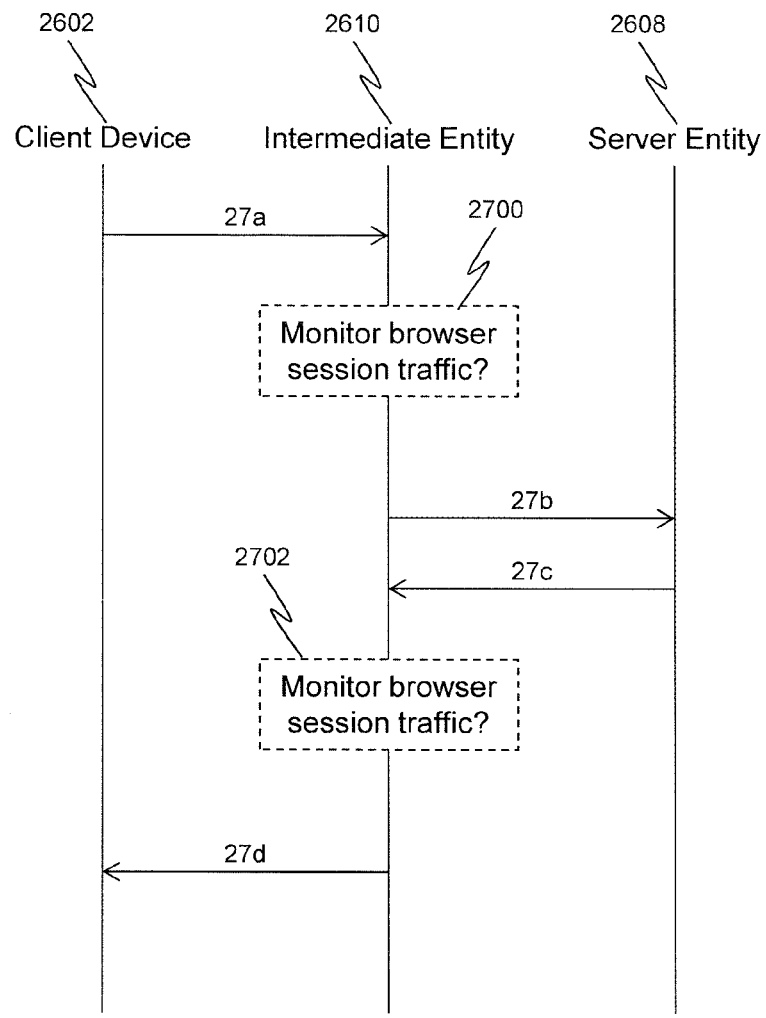
FIG. 27 shows a flow diagram according to embodiments.

FIG. 27 illustrates the operation of intermediate entity 2610 in relation to a browser session taking place between subscriber client device 2602 and server entity 2608 according to embodiments. At step 27a, a browser session request is transmitted from subscriber client device 2602 into telecommunications network 2600. The browser session request of step 27a could comprise a request for a web page, web page element, data file, service, etc. As service provider network 2604 is configured to route all browser session traffic via intermediate entity 2610, the browser session request is then received at intermediate entity 2610 in the service provider network.

Having received the browser session request in step 27a, intermediate entity 2610 may then monitor the browsing session traffic by examining one or more parts of the browser session request at step 2700. These parts may include the content data, the header data or other object such as a cookie. Having examined and/or monitored the browser session request, the browser session request is then transmitted, in step 27b, to server entity 2608.

Upon receipt of the browser session request transmitted in step 27b, server entity 2608 processes the browser session request in order to generate a corresponding browser session response. At step 27c, server entity 2608 transmits the generated browser session response into telecommunications network 2600, directed at subscriber client device 2602. As service provider network 2604 is configured to route all browser session traffic via intermediate entity 2610, upon entering service provider network 2604, the browser session response of step 27c is then received at intermediate entity 2610 in service provider network 2604.

Having received the browser session request in step 27c, intermediate entity 2610 may monitor the browsing session traffic by examining one or more parts of the browser session response at step 2702. Having examined and/or monitored the browser session response, the browser session response is then transmitted, in 27d, to subscriber client device 2602.

According to embodiments, the monitoring comprises examining one or more of, the specific website being accessed (e.g. Facebook.com), the type of website being accessed (e.g. social networking), the type of content being accessed (e.g. video content), the type of service being used (e.g. instant messaging), the type of application being used (e.g. browser) and the type of data being transmitted (e.g. HTTP).

According to embodiments, the monitoring performed in one or more of steps 2700 and 2702 further comprises logging information associated with the browser session traffic. According to embodiments, the logging comprises holding the information associated with the browser session traffic in operating memory in intermediate entity 2610. According to some such embodiments, the logging comprises storing the information associated with the browser session traffic in persistent memory, such as subscriber profile database 2612 as part of the subscriber profile data for the given subscriber. According to embodiments, the analysis is performed on the basis of the current monitored browser session traffic and/or historic browser session traffic stored in the subscriber profile data for the given subscriber. Current monitored browser session traffic may for example comprise browser session traffic within a given time window, for example a sliding window over the last 30 seconds of browser session traffic for the subscriber or suchlike.

According to embodiments, the analysis is performed in response to a change in the monitored browser session traffic, for example as per either step 2700 or 2702 above. According to embodiments, the analysis is performed in response to a change in the subscriber profile data specific to the given subscriber.

According to embodiments, the analysis is performed by an inference engine according to one or more inference rules. The inference engine may be comprised in intermediate entity 2610, for example in the form of an installed software application.

According to embodiments the provisioning of the service provider network is performed dynamically in response to one or more changes in the subscriber profile data for the given subscriber. According to embodiments, the provisioning of the service provider network is performed dynamically in response to one or more changes in the monitored browser session traffic.

According to embodiments, the provisioning of the service provider network is performed on a per-subscriber basis. According to embodiments, the provisioning of the service provider network comprises allocating a specific bandwidth to a given subscriber, or group of subscribers. According to embodiments, the provisioning of the service provider network comprises allocating a level of priority access to network resources for a given subscriber, or group of subscribers.

According to embodiments, the provisioning of the service provider is performed on a per subscriber client device basis. According to embodiments, the provisioning of the service provider network comprises allocating a specific bandwidth to a given subscriber client device, or group of subscriber client devices. According to embodiments, the provisioning of the service provider network comprises allocating a level of priority access to network resources for a given subscriber client device, or group of subscriber client devices.

According to some embodiments, provisioning of the service provider network comprises provisioning telecommunications services on the basis of an identifier associated with the subscriber client device to which it will be delivered. In this way network provisioning can be optimized for the device being provisioned. According to some such embodiments, the identifier relates to a type of subscriber client device. This could include whether the device is a mobile telephone, tablet, laptop, personal computer etc., thereby allowing the network to be provisioned appropriately for the given capability of subscriber client device. According to embodiments, the identifier relates to a capability of the subscriber client device. This could include whether the device is capable of displaying image data, playing audio content, playing video content etc., thereby allowing the network to be provisioned appropriately for the capability of the subscriber client device, for example by provisioning more bandwidth to devices capable of playing high definition video content. In embodiments, the identifier associated with the subscriber client device is stored in subscriber profile database 2612 and retrieved by intermediate entity 2610 during the analysis of the monitored browser session traffic in combination with the subscriber profile data contained in the subscriber profile database.

According to embodiments, the service provider network is provisioned differently for each of two or more subscriber client devices associated with a given subscriber. In such embodiments, the provisioning of the service provider network comprises provisioning telecommunications services provisioned to/from a first subscriber client device associated with the given subscriber differently from telecommunication services provisioned to/from a second subscriber client device associated with the given subscriber. In embodiments, the first and second identifiers associated with the subscriber client devices are stored in subscriber profile database 2612 and retrieved by intermediate entity 2610 during the analysis of the monitored browser session traffic in combination with the subscriber profile data contained in the subscriber profile database.

According to embodiments, the one or more predetermined characteristics comprise a usage trend, for example a given subscriber has begun to use an online gaming service via one or more of their subscriber client devices. According to embodiments, the one or more predetermined characteristics comprise a time and/or a frequency related characteristic. According to embodiments, the one or more predetermined characteristics may comprise one or more of: a frequency at which the given subscriber accesses a given website, a frequency at which the given subscriber uses a given type of service, a schedule by which the subscriber accesses a given website, a schedule by which the subscriber uses a given type of service, the time a subscriber spends accessing a given website, and the time a subscriber spends using a given service.

For example, if the analysis performed at intermediate entity 2610 on the basis of the monitored browser session traffic reveals a predetermined characteristic that the given subscriber is frequently accessing relatively low bandwidth (e.g. text based) content in the morning, but frequently accessing relatively high bandwidth (e.g. high definition video) content in the evening, entity 2610 may provision the service provider network by dynamically altering a bandwidth allocated to the given subscriber in the morning compared to the evening in order to more efficiently manage available network resources.

According to embodiments, the subscriber profile data comprises at least one subscriber profile attribute associated with a given subscriber, enabling the provisioning of the service provider network to take place, at least in part, on the basis of the at least one subscriber profile attribute. According to embodiments, the subscriber profile attributes identify a given subscriber contract type, profession, hobby, topic, sponsorship or interest associated with the subscriber, such as contract priority, public service user, sponsored cricket player, or service provider staff member.

According to embodiments, the analysis is further performed on the basis of the geographical location of the subscriber client device. The geographical location of the subscriber client device can be obtained from known service provider networking operations, such as cell-tower location lookup, and/or cell trilateration. Hence, intermediate entity 2610 can further provision the service provider network on the basis of the geographical location of the subscriber client device, in order to further improve network provisioning such as the allocation of network resources.

According to embodiments, provisioning of the service provider network is implemented by network provisioning entity 2611. According to embodiments, network provisioning entity 2611 is located in the service provider network. In such embodiments, the provisioning of the service provider network by intermediate entity 2610 comprises transmitting one or more network provisioning instructions to such a network provisioning entity.

According to embodiments, network provisioning entity 2611 is located outside of the service provider network. In such embodiments, provisioning of the service provider network comprises transmitting one or more network provisioning instructions to a network provisioning entity located outside of the service provider network. In such embodiments, the network provisioning instructions may enable a network provisioning entity 2611 outside of the service provider network to provision a wider network on the basis of the analysis performed by intermediate entity 2610.

According to embodiments, the subscriber profile database 2612 is remotely configurable. The subscriber database may be configured by a subscriber database administration entity located within the service provider network, for example operated by an employee of the service provider. Alternatively, the subscriber database may be configured by a subscriber database administration entity located outside the service provider network, for example operated by a contractor, a subscriber, a law enforcement entity, a regulatory body, etc. In such embodiments, the subscriber database may be remotely configured in response to receipt of a subscriber database configuration message, for example from a subscriber database administration entity.

According to embodiments, intermediate entity 2610 is further configured to provision the service provider network according to one or more network provisioning rules, in combination with the analysis of the monitored browser session traffic and subscriber profile data. According to embodiments, the network provisioning rules are defined by the service provider. According to further embodiments, the network provisioning rules are initially defined by an equipment supplier, with subsequent network provisioning rules being defined by the service provider. According to further embodiments, the defined network provisioning rules are configured by a rules administration entity.

Embodiments of the present disclosure utilize a rules engine to provision the service provider network according to the network provisioning rules. In embodiments, a rules engine is comprised in intermediate entity 2610, for example in the form of an installed software application.

According to embodiments, intermediate entity 2610 holds the one or more network provisioning rules in operating memory. According to embodiments, intermediate entity 2610 obtains at least one of the one or more network provisioning rules in response to querying a rules database located within the service provider network. In embodiments, the one or more network provisioning rules are remotely configurable. The network provisioning rules may be configured by a rules administration entity located within the service provider network, for example operated by an employee of the service provider. Alternatively, the network provisioning rules may be configured by a rules administration entity located outside the service provider network, for example operated by a contractor, a subscriber, a law enforcement entity, a regulatory body, etc. In such embodiments, the one or more network provisioning rules may be remotely configured in response to receipt of a rule configuration message, for example from a rules administration entity.

Figure 26:
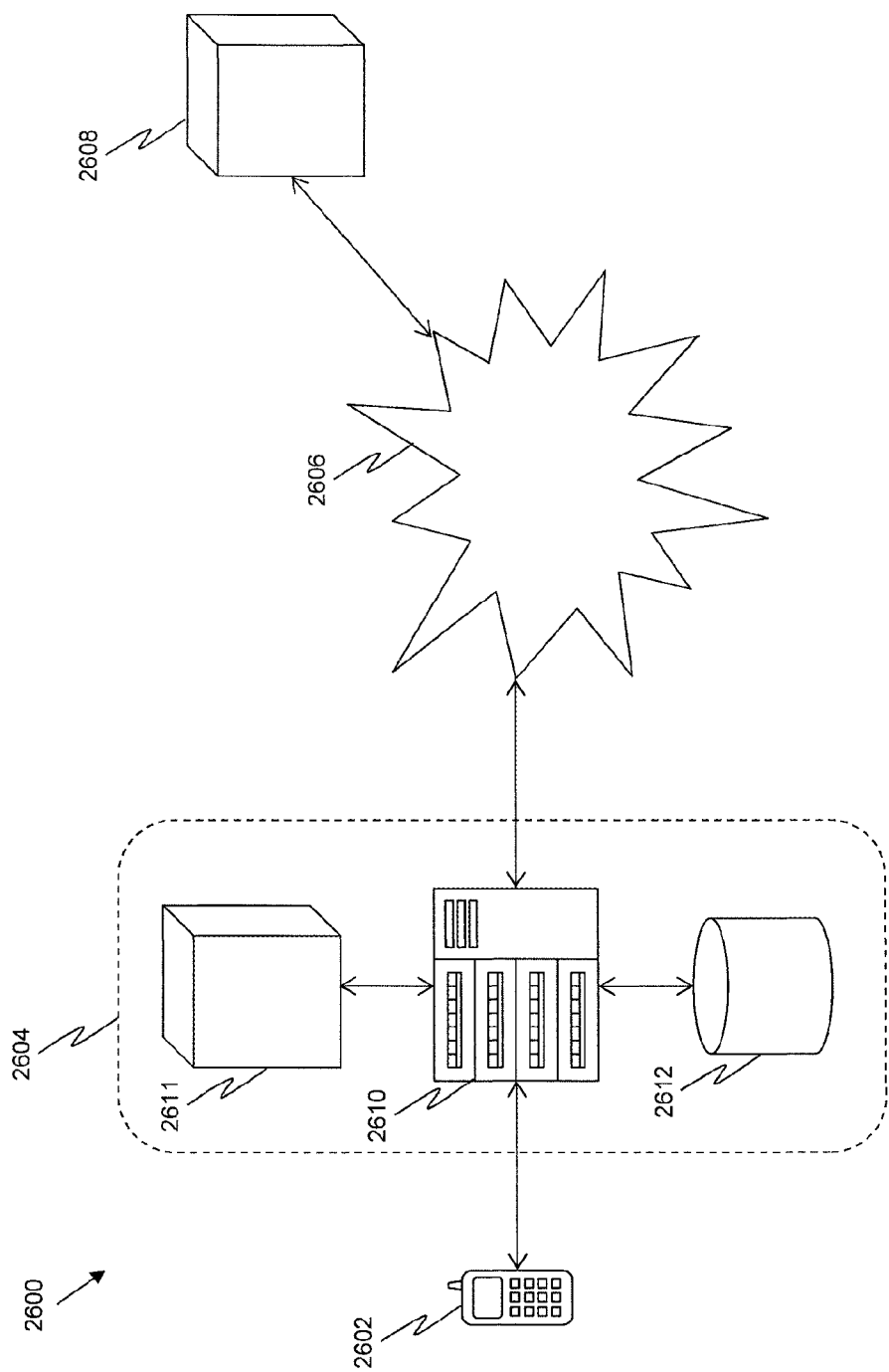
FIG. 26 shows a system diagram according to embodiments.
Figure 28:
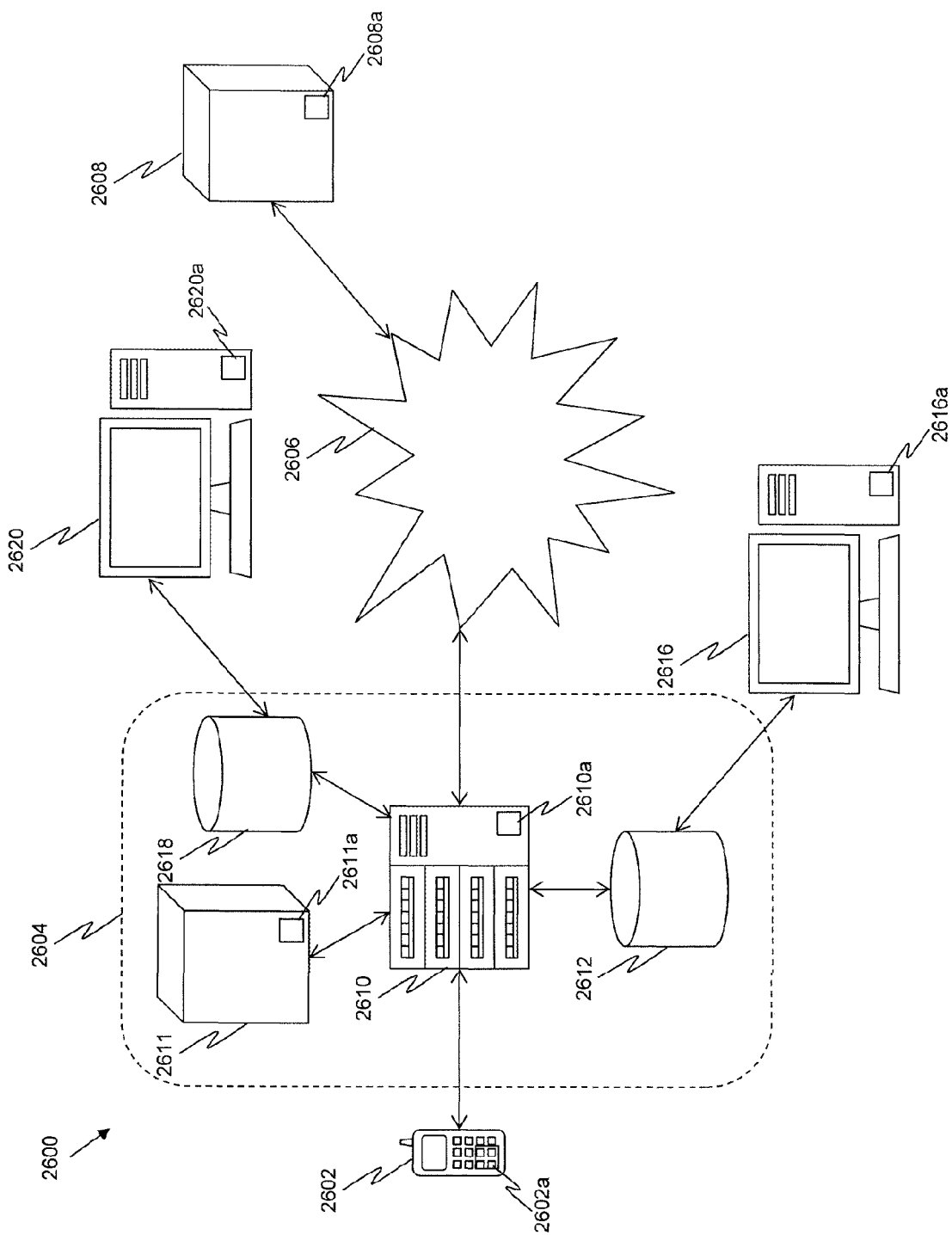
FIG. 28 shows a system diagram according to embodiments.

FIG. 28 shows telecommunications network 2600 according to embodiments. The functionality of subscriber client device 2602, service provider network part 2604, and wider network part 2606, server entity 2608, intermediate entity 2610, network provisioning entity 2611 and subscriber profile database 2612 are the same as described above in relation to FIG. 26. However, in the embodiments shown in FIG. 28, telecommunications network 2600 further comprises rules database 2618, which contains the one or more network provisioning rules. Subscriber database administration entity 2616 is capable of configuring the subscriber profile database by transmitting a subscriber database configuration message to subscriber profile database 2612. This may occur via a direct connection to service provider network 2604 (as shown) or via wider network part 2606. Rules administration entity 2620 is capable of configuring the one or more network provisioning rules by transmitting a rules database configuration message to rules database 2618. Again, this may occur via a direct connection to service provider network 2604 (as shown) or via wider network part 2606. In any of the aforementioned embodiments, one or more of subscriber client device 2602, server entity 2608, intermediate entity 2610, network provisioning entity 2611, subscriber database administration entity 2216 and rules administration entity 2620 comprise a processor or a processing system comprising one or more processors and one or more memories (such as a RAM or ROM), as depicted by processing systems 2602a, 2608a, 2610a, 2611a, 2616a and 2620a respectively.

One or more of the aspects of the embodiments described herein with reference to the drawings comprise processes performed by one or more of subscriber client device 2602, server entity 2608, intermediate entity 2610, network provisioning entity 2611, subscriber database administration entity 2216 and rules administration entity 2620. In embodiments, the subscriber client device 2602, server entity 2608, intermediate entity 2610, network provisioning entity 2611, subscriber database administration entity 2216 and rules administration entity 2620 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to in the context of subscriber profile database 2612 and/or rules database 2618 may comprise any suitable storage medium, including solid-state drives (SSD) or other semiconductor-based RAM; a ROM, for example a CD ROM or a semiconductor ROM; or a magnetic recording medium, for example a floppy disk or hard disk.

Figure 29:
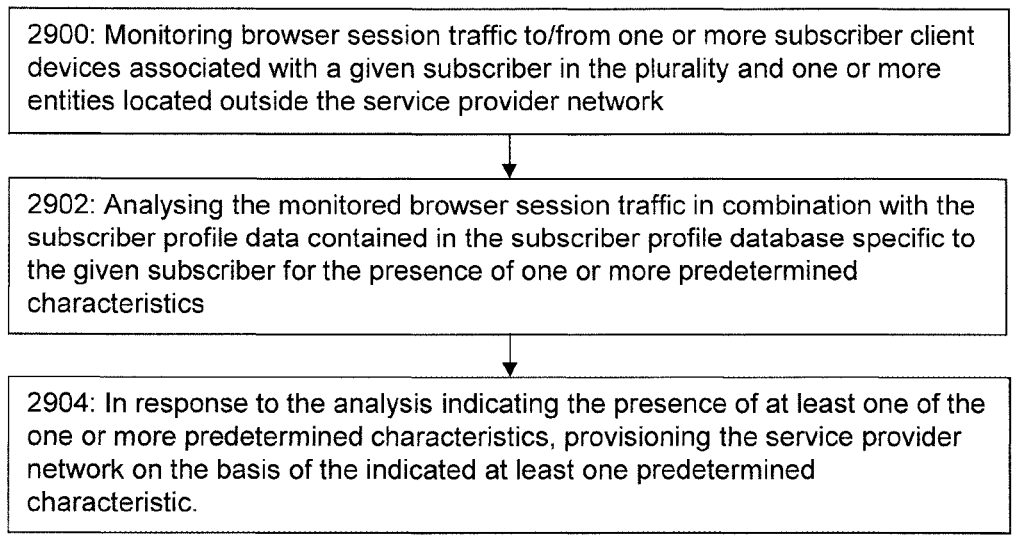
FIG. 29 shows a flow chart according to embodiments.

FIG. 29 is a flow diagram that describes embodiments from the perspective of intermediate entity 2610. At step 2900, browser session traffic to/from one or more subscriber client devices associated with a given subscriber in the plurality and one or more entities located outside the service provider network is monitored. At step 2902, the monitored browser session traffic is analyzed in combination with the subscriber profile data contained in the subscriber profile database specific to the given subscriber for the presence of one or more predetermined characteristics. At step 2904, in response to the analysis indicating the presence of at least one of the one or more predetermined characteristics, the service provider network is provisioned on the basis of the indicated at least one predetermined characteristic.

Embodiments comprise a method for use in network provisioning in a telecommunications network, the telecommunications network comprising a carrier network operated by a carrier responsible for providing telecommunications services to a plurality of subscribers, each subscriber having one or more associated subscriber client devices, the carrier network comprising a subscriber profile database containing subscriber profile data specific to each subscriber in the plurality, the method comprising, at an entity in the carrier network: monitoring browser session traffic to/from one or more subscriber client devices associated with a given subscriber in the plurality and one or more entities located outside the carrier network; analyzing the monitored browser session traffic in combination with the subscriber profile data contained in the subscriber profile database specific to the given subscriber for the presence of one or more predetermined characteristics; and in response to the analysis indicating the presence of at least one of the one or more predetermined characteristics, provisioning the carrier network on the basis of the indicated at least one predetermined characteristic.

The above embodiments are to be understood as illustrative examples of the invention. Further embodiments of the invention are envisaged. For example, whilst the above embodiments have been described in relation to packetized data traffic such as HTTP data, it is to be understood that the methods and systems disclosed herein are also applicable to any similar or equivalent protocol, in particular any request/response based protocol. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

According to certain embodiments, measures in accordance with one or more of the following numbered clauses are provided:

1. A method of processing browser sessions in a telecommunications network, the telecommunications network comprising a service provider network operated by a service provider responsible for providing telecommunications services to a plurality of subscriber client devices, the method comprising, at an entity in the service provider network:
receiving, from a subscriber client device in the plurality, a browser session request;
transmitting the browser session request to a server entity located outside the service provider network;
receiving, from the server entity, a browser session response in relation to the transmitted browser session request;
transmitting the browser session response to the subscriber client device; and
modifying, prior to the respective transmittal, at least one of the browser session request and the browser session response according to one or more browser session processing modification rules.

2. A method according to clause 1, wherein the browser session request comprises a request for a web page.

3. A method according to clause 1 or 2, wherein the server entity comprises a publisher server entity, whereby the subscriber client device receives modified web page content.

4. A method according to clause 3, comprising, on the basis of the modification, obtaining revenue from a publisher entity associated with the publisher server entity.

5. A method according to any preceding clause, wherein the browser session request comprises a request for one or more web page elements.

6. A method according to any preceding clause, wherein the browser session request comprises a request for advertisement content.

7. A method according to clause 6, wherein the server entity comprises an advertisement server entity, whereby the subscriber client device receives modified advertisement content.

8. A method according to clause 7, comprising, on the basis of the modification, obtaining revenue from an advertising entity associated with the advertisement server entity.

9. A method according to any preceding clause, wherein the modification comprises one or more of: deleting a part of the browser session request, deleting a part of the browser session response, altering a part of the browser session request, altering a part of the browser session response, adding to the browser session request, and adding to the browser session response.

10. A method according to any preceding clause, wherein the modification comprises altering a uniform resource locator (URL) in the browser session request and/or the browser session response.

11. A method according to any preceding clause, wherein the modification comprises modifying the browser session request to include data representative of the identity of the service provider.

12. A method according to any preceding clause, wherein the modification comprises modifying the browser session request to include data representative of the geographical location of the subscriber client device.

13. A method according to any preceding clause, wherein the modification comprises denying access to at least a part of the content contained within or obtainable via the received browser session response.

14. A method according to any preceding clause, comprising, prior to the modification, querying a rules database to obtain at least one of the one or more browser session processing modification rules, the rules database being located within the service provider network.

15. A method according to any preceding clause, wherein the one or more browser session processing modification rules are remotely configurable.

16. A method according to any preceding clause, comprising, in response to receipt of a rule configuration message, remotely configuring the one or more browser session processing modification rules.

17. A method according to clause 16, wherein the rule configuration message is received from a rules administration entity located within the service provider network.

18. A method according to clause 16, wherein the rule configuration message is received from a rules administration entity located outside the service provider network.

19. A method according to any preceding clause, wherein one or more of the browser session requests comprise an HTTP request and/or one or more of the browser session responses comprise an HTTP response.

20. A method according to any preceding clause, comprising, on the basis of the modification, obtaining revenue from one or more of: an entity associated with the server entity, the subscriber, an advertiser, an advertisement broker, a third-party data purchaser, and the service provider.

21. A method according to any preceding clause, wherein the one or more browser session processing modification rules are defined by the service provider.

22. A method according to any preceding clause, wherein the service provider network comprises one or more of: a carrier network, a mobile network, a cellular network, and an internet service provider network.

23. A method according to any preceding clause, wherein the service provider network comprises a routing fabric, and wherein the intermediate entity is located in the routing fabric of the service provider network.

24. A method according to any preceding clause, wherein the received browser session request and the received browser session response comprise sufficient information for routing between the subscriber client device and the server entity prior to the modification.

25. A method according to any preceding clause wherein the intermediate entity is not comprised by: the subscriber client device, the server entity, a border entity responsible for managing access to a given network part, a gateway entity responsible for translating between network protocols used in different network parts, a caching entity responsible for caching and serving data commonly requested between network parts, or an encoding entity responsible for modifying browser session traffic for efficient routing.

26. Apparatus for use in processing browser sessions in a telecommunications network, the telecommunications network comprising a service provider network operated by a service provider responsible for providing telecommunications services to a plurality of subscriber client devices, the apparatus comprising at least one processor and at least one memory including computer program code, the at least one memory and the computer program code being configured to, with the at least one processor, cause the apparatus at least to, at an entity in the service provider network:
receive, from a subscriber client device in the plurality, a browser session request;
transmit the browser session request to a server entity located outside the service provider network;

receive, from the server entity, a browser session response in relation to the transmitted browser session request;

transmit the browser session response to the subscriber client device; and modify, prior to the respective transmittal, at least one of the browser session request and the browser session response according to one or more browser session processing modification rules.

27. Computer software adapted to perform a method for processing browser sessions in a telecommunications network, the telecommunications network comprising a service provider network operated by a service provider responsible for providing telecommunications services to a plurality of subscriber client devices, the method comprising, at an entity in the service provider network:

receiving, from a subscriber client device in the plurality, a browser session request;

transmitting the browser session request to a server entity located outside the service provider network;

receiving, from the server entity, a browser session response in relation to the transmitted browser session request;

transmitting the browser session response to the subscriber client device; and modifying, prior to the respective transmittal, at least one of the browser session request and the browser session response according to one or more browser session processing modification rules.

28. A method of processing browser sessions in a telecommunications network, the telecommunications network comprising a service provider network operated by a service provider responsible for providing telecommunications services to a plurality of subscriber client devices, the method comprising, at an entity in the service provider network:

receiving, from a subscriber client device in the plurality, a browser session request;

transmitting the browser session request to a server entity located inside the service provider network;

receiving, from the server entity, a browser session response in relation to the transmitted browser session request;

transmitting the browser session response to the subscriber client device; and modifying, prior to the respective transmittal, at least one of the browser session request and the browser session response according to one or more browser session processing modification rules.

29. A method of processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network:

receiving, from a subscriber client device in the plurality, a browser session request;

transmitting the browser session request to a server entity located outside the service provider network;

receiving, from the server entity, a browser session response in relation to the transmitted browser session request;

transmitting the browser session response to the subscriber client device;

performing a lookup in the subscriber profile database for the subscriber client device in the plurality and/or the associated subscriber; and modifying, prior to the respective transmittal, at least one of the browser session request and the browser session response according to the results of the lookup.

30. A method according to clause 29, wherein the lookup is performed in response to receipt of the browser session request.

31. A method according to clause 29 or 30, wherein the browser session request comprises a request for a web page.

32. A method according to clause 31, wherein the server entity comprises a publisher server entity, whereby the subscriber client device receives modified web page content.

33. A method according to clause 32, comprising, on the basis of the modification, obtaining revenue from a publisher entity associated with the publisher server entity.

34. A method according to any of clauses 29 to 33, wherein the browser session request comprises a request for one or more web page elements.

35. A method according to clause 34, wherein the browser session request comprises advertisement content.

36. A method according to clause 35, wherein the server entity comprises an advertisement server entity, whereby the subscriber client device receives modified advertisement content.

37. A method according to clause 36, wherein the advertisement server entity comprises a broker entity responsible for providing advertisement brokering services to a plurality of advertisement server entities.

38. A method according to clause 36 or 37, comprising, on the basis of the modification, obtaining revenue from an advertising entity associated with the advertisement server entity.

39. A method according to any of clauses 29 to 38, wherein the modification comprises one or more of: deleting a part of the browser session request, deleting a part of the browser session response, altering a part of the browser session request, altering a part of the browser session response, adding to the browser session request, and adding to the browser session response.

40. A method according to any of clauses 29 to 39, wherein the modification comprises altering a uniform resource locator (URL) in the browser session request and/or the browser session response.

41. A method according to any of clauses 29 to 40, wherein performing the lookup comprises retrieving, from the subscriber database, one or more subscriber profile attributes associated with the subscriber client device and/or the associated subscriber.

42. A method according to clause 41, wherein one or more of the subscriber profile attributes identify a given hobby, topic or interest associated with the subscriber.

43. A method according to clause 41 or 42, wherein one or more of the subscriber profile attributes identify a given browsing behavior characteristic associated with the subscriber.

44. A method according to any of clauses 41 to 43, wherein the modification comprises modifying the transmitted browser session request to include an indication of at least one of the one or more subscriber profile attributes associated with the subscriber client device and/or the associated subscriber.

45. A method according to any of clauses 29 to 44, wherein performing the lookup comprises retrieving, from the subscriber database, one or more subscriber browsing rules associated with the subscriber client device and/or the associated subscriber, whereby the subscriber client device receives modified browsing content.

46. A method according to clause 45, wherein the subscriber browsing rules comprise one or more of: a list of content to which access should be denied, a special access requirement, and a natural language preference.

47. A method according to any of clauses 29 to 46, wherein the modification comprises modifying the browser session request to include one or more of: data representative of the identity of the service provider, and data representative of the geographical location of the subscriber client device.

48. A method according to any of clauses 29 to 47, wherein the modification comprises denying access to at least a part of the content contained within or obtainable via the received browser session response.

49. A method according to any of clauses 29 to 48, wherein the modification is further performed according to one or more browser session processing modification rules.

50. A method according to clause 49, wherein the browser session processing modification rules are defined by the service provider.

51. A method according to clause 49 or 50, comprising, prior to the modification, querying a rules database whereby to obtain at least one of the one or more browser session processing modification rules.

52. A method according to clause 51, wherein the rules database is remotely configurable.

53. A method according to clause 51 or 52, comprising, in response to receipt of a rules database configuration message, remotely configuring the rules database.

54. A method according to clause 53, wherein the rules database configuration message is received from a rules database administration entity located within the service provider network.

55. A method according to clause 53, wherein the rules database configuration message is received from a rules database administration entity located outside the service provider network.

56. A method according to any of clauses 29 to 55, wherein one or more of the browser session requests comprise an HTTP request and/or one or more of the browser session responses comprise an HTTP response.

57. A method according to any of clauses 29 to 56, comprising, in response to the modification, obtaining revenue from one or more of: the publisher; the subscriber; an advertiser, an advertisement broker, the service provider.

58. A method according to any of clauses 29 to 57, wherein the service provider network comprises one or more of: a carrier network, a mobile network, a cellular network, and an internet service provider network.

59. A method according to any of clauses 29 to 58, wherein the service provider network comprises a routing fabric, and wherein the intermediate entity is located in the routing fabric of the service provider network.

60. A method according to any of clauses 29 to 59, wherein the received browser session request and the received browser session response comprise sufficient information for routing between the subscriber client device and the server entity prior to the modification.

61. A method according to any of clauses 29 to 60, wherein the intermediate entity is not comprised by: the subscriber client device, the server entity, a border entity responsible for managing access to a given network part, a gateway entity responsible for translating between network protocols used in different network parts, a caching entity responsible for caching and serving data commonly requested between network parts, or an encoding entity responsible for modifying browser session traffic for efficient routing.

62. Apparatus for use in processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the apparatus comprising at least one processor, and at least one memory including computer program code, the at least one memory and the computer program code being configured to, with the at least one processor, cause the apparatus at least to, at an entity in the service provider network:
receive, from a subscriber client device in the plurality, a browser session request;
transmit the browser session request to a server entity located outside the service provider network;
receive, from the server entity, a browser session response in relation to the transmitted browser session request;
transmit the browser session response to the subscriber client device;
perform a lookup performed in the subscriber profile database for the subscriber client device in the plurality and/or the associated subscriber; and
modify, prior to the respective transmittal, at least one of the browser session request and the browser session response according to the results of the lookup.

63. Computer software adapted to perform a method for processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network:
receiving, from a subscriber client device in the plurality, a browser session request;
transmitting the browser session request to a server entity located outside the service provider network;
receiving, from the server entity, a browser session response in relation to the transmitted browser session request;
transmitting the browser session response to the subscriber client device;
performing a lookup performed in the subscriber profile database for the subscriber client device in the plurality and/or the associated subscriber; and
modifying, prior to the respective transmittal, at least one of the browser session request and the browser session response according to the results of the lookup.

64. A method of processing browser sessions in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network:

receiving, from a subscriber client device in the plurality, a browser session request;

transmitting the browser session request to a server entity located inside the service provider network;

receiving, from the server entity, a browser session response in relation to the transmitted browser session request;

transmitting the browser session response to the subscriber client device;

performing a lookup in the subscriber profile database for the subscriber client device in the plurality and/or the associated subscriber; and modifying, prior to the respective transmittal, at least one of the browser session request and the browser session response according to the results of the lookup.

65. A method for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber and/or each associated subscriber client device, the method comprising, at an entity in the service provider network:

receiving an indication that a trigger event has occurred;

performing a lookup in the subscriber profile database to identify subscriber profile data for at least a given subscriber associated with the indicated trigger event; and initiating delivery of targeted content data associated with the indicated trigger event to at least one of the one or more subscriber client devices associated with the given subscriber.

66. A method according to clause 65, comprising generating the targeted content data at least on the basis of the identified subscriber profile data and the indicated trigger event.

67. A method according to clause 65 or 66, comprising generating the targeted content data at least on the basis of data retrieved from a targeted content data database comprised in the service provider network.

68. A method according to any of clauses 65 to 67, comprising generating the targeted content data at least on the basis of data received from a network entity located outside the service provider network in response to occurrence of the indicated trigger event.

69. A method according to any of clauses 65 to 68, comprising generating the targeted content data at least on the basis of an identifier associated with the at least one of the one or more subscriber client devices associated with the given subscriber.

70. A method according to clause 69, wherein the identifier relates to a type of the at least one of the one or more subscriber client devices.

71. A method according to clause 69 or 70, wherein the identifier relates to a capability of the at least one of the one or more subscriber client devices.

72. A method according to any of clauses 65 to 71, comprising:

generating first targeted content data on the basis of a first identifier associated with a first subscriber client device associated with the given subscriber; and generating second targeted content data on the basis of a second identifier associated with a second subscriber client device associated with the given subscriber, wherein the initiation comprises initiating delivery of the first targeted content data to the first subscriber client device and initiating delivery of the second targeted content data to the second subscriber client device, and wherein the first targeted content data and the second targeted content data are different.

73. A method according to any of clauses 65 to 72, wherein the initiating comprises transmitting a targeted content availability notification to the at least one subscriber client device, whereby to notify the at least one subscriber client device as to the availability of the targeted content data.

74. A method according to any of clauses 65 to 72, wherein the initiating comprises modifying at least one of a browser session request and a browser session response in an ongoing browser session conducted by the at least one subscriber client device.

75. A method according to clause 74, wherein the modification comprises one or more of:

modifying the browser session response to include the targeted content data, modifying the browser session response to include an instruction to request the targeted content data, modifying the browser session request to include a request for the targeted content data, and modifying a browser session request whereby to trigger the inclusion of an instruction to request the targeted content data in a corresponding browser session response.

76. A method according to clause 74 or 75, wherein the browser session request comprises an HTTP request and/or the browser session response comprises an HTTP response.

77. A method according to any of clauses 65 to 76, wherein the targeted content data comprises a web page.

78. A method according to any of clauses 65 to 77, wherein the targeted content data comprises a web page element.

79. A method according to any of clauses 65 to 78, wherein the targeted content data comprises advertisement content.

80. A method according to any of clauses 65 to 79, wherein performing the lookup comprises:

comparing at least one trigger event attribute associated with the trigger event to at least one subscriber profile attribute associated with the given subscriber; and determining, on the basis of the comparison, a match between the trigger event and the given subscriber, whereby to identify subscriber profile data for the given subscriber.

81. A method according to clause 80, wherein one or more of the trigger event attributes identify a given hobby, topic or interest associated with the subscriber.

82. A method according to clause 80 or 81, wherein one or more of the trigger event attributes identify a given browsing behavior characteristic associated with the subscriber.

83. A method according to any of clauses 65 to 82, wherein the indication comprises a targeted content initiation message from a network entity located outside the service provider network.

84. A method according to any of clauses 65 to 83, comprising, on the basis of the delivery, obtaining revenue from one or more of: the provider of said targeted content; the subscriber; an advertiser, an advertisement broker, the service provider.

85. A method according to any of clauses 65 to 84, wherein the service provider network comprises one or more of: a carrier network, a mobile network, a cellular network, and an internet service provider network.

86. A method according to any of clauses 65 to 85, wherein the service provider network comprises a routing fabric, and wherein the intermediate entity is located in the routing fabric of the service provider network.

87. A method according to any of clauses 65 to 86 wherein the intermediate entity is not comprised by: the subscriber client device, the server entity, a border entity responsible for managing access to a given network part, a gateway entity responsible for translating between network protocols used in different network parts, a caching entity responsible for caching and serving data commonly requested between network parts, or an encoding entity responsible for modifying browser session traffic for efficient routing.

88. Apparatus for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber and/or each associated subscriber client device, the apparatus comprising, at least one processor, and at least one memory including computer program code, the at least one memory and the computer program code being configured to, with the at least one processor, cause the apparatus at least to, at an entity in the service provider network:
  receive an indication that a trigger event has occurred;
  perform a lookup in the subscriber profile database to identify subscriber profile data for at least a given subscriber associated with the indicated trigger event; and
  initiate delivery of targeted content data associated with the indicated trigger event to at least one subscriber client device associated with the given subscriber.

89. Computer software adapted to perform a method for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber and/or each associated subscriber client device, the method comprising, at an entity in the service provider network:
  receiving an indication that a trigger event has occurred;
  performing a lookup in the subscriber profile database to identify subscriber profile data for at least a given subscriber associated with the indicated trigger event; and
  initiating delivery of targeted content data associated with the indicated trigger event to at least one subscriber client device associated with the given subscriber.

90. A method of enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network:
  receiving, from a subscriber client device in the plurality, an advertisement content request;
  transmitting the advertisement content request to an advertisement server entity located outside the service provider network;
  receiving, from the advertisement server entity, an advertisement content response in relation to the transmitted advertisement content request;
  transmitting the advertisement content response to the subscriber client device;
  performing a lookup in the subscriber profile database for the subscriber client device in the plurality and/or the associated subscriber; and
  modifying, prior to the respective transmittal, at least one of the advertisement content request and the advertisement content response according to the results of the lookup.

91. A method according to clause 90, wherein the lookup is performed in response to receipt of the advertisement content request.

92. A method according to clause 90 or 91, wherein the advertisement server entity comprises a broker entity responsible for providing advertisement brokering services to a plurality of advertisement server entities.

93. A method according to any of clauses 90 to 92, wherein the received advertisement content request relates to an ongoing browser session being conducted by the subscriber client device 94. A method according to clause 93, wherein the ongoing browser session comprises, prior to receipt of the advertisement content request, receiving a web page request from the subscriber client device in the plurality, and wherein the lookup is performed in response to receipt of the web page request.

95. A method according to any of clauses 90 to 94, wherein the received advertisement content request originates from a software application installed on the subscriber client device.

96. A method according to any of clauses 90 to 95, wherein the modification comprises one or more of: deleting a part of the advertisement content request, deleting a part of the advertisement content response, altering a part of the advertisement content request, altering a part of the advertisement content response, adding to the advertisement content request, and adding to the advertisement content response.

97. A method according to any of clauses 90 to 96, wherein performing the lookup comprises retrieving, from the subscriber database, one or more subscriber profile attributes associated with the subscriber client device and/or the associated subscriber.

98. A method according to clause 97, wherein one or more of the subscriber profile attributes identify a given hobby, topic or interest associated with the subscriber.

99. A method according to clause 97 or 98, wherein one or more of the subscriber profile attributes identify a given browsing behavior characteristic associated with the subscriber.

100. A method according to any of clauses 97 to 99, wherein the modification comprises modifying the transmitted advertisement content request to include an indication of at least one of the one or more subscriber profile attributes associated with the subscriber client device and/or the associated subscriber.

101. A method according to any of clauses 90 to 100, wherein the modification comprises modifying the advertisement content request to include one or more of: data representative of the identity of the service provider, and data representative of the geographical location of the subscriber client device.

102. A method according to any of clauses 90 to 101, wherein the modification is further performed according to one or more advertisement content processing modification rules.

103. A method according to clause 102, wherein the advertisement content processing modification rules are defined by the service provider.

104. A method according to clause 102 or 103, comprising, prior to the modification, querying a rules database whereby to obtain at least one of the one or more advertisement content processing modification rules.

105. A method according to clause 104, wherein the rules database is remotely configurable.

106. A method according to clause 104 or 105, comprising, in response to receipt of a rules database configuration message, remotely configuring the rules database.

107. A method according to clause 106, wherein the rules database configuration message is received from a rules database administration entity located within the service provider network.

108. A method according to clause 106, wherein the rules database configuration message is received from a rules database administration entity located outside the service provider network.

109. A method according to any of clauses 90 to 108, wherein one or more of the advertisement content requests comprise an HTTP request and/or one or more of the advertisement content responses comprise an HTTP response.

110. A method according to any of clauses 90 to 109, comprising, on the basis of the modification, obtaining revenue from one or more of: an advertiser entity associated with the advertisement server entity, a provider of the advertisement content, the subscriber, a publisher, an advertisement broker, and the service provider.

111. A method according to any of clauses 90 to 110, wherein the service provider network comprises one or more of: a carrier network, a mobile network, a cellular network, and an internet service provider network.

112. A method according to any of clauses 90 to 111, wherein the service provider network comprises a routing fabric, and wherein the intermediate entity is located in the routing fabric of the service provider network.

113. A method according to any of clauses 90 to 112, wherein the received advertisement content request and the received advertisement content response comprise sufficient information for routing between the subscriber client device and the advertisement server entity prior to the modification.

114. A method according to any of clauses 90 to 113 wherein the intermediate entity is not comprised by: the subscriber client device, the advertisement server entity, a border entity responsible for managing access to a given network part, a gateway entity responsible for translating between network protocols used in different network parts, a caching entity responsible for caching and serving data commonly requested between network parts, or an encoding entity responsible for modifying browser session traffic for efficient routing.

115. Apparatus for use in enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the apparatus comprising at least one processor, and at least one memory including computer program code, the at least one memory and the computer program code being configured to, with the at least one processor, cause the apparatus at least to, at an entity in the service provider network:
   receive, from a subscriber client device in the plurality, an advertisement content request;
   transmit the advertisement content request to an advertisement server entity located outside the service provider network;
   receive, from the advertisement server entity, an advertisement content response in relation to the transmitted advertisement content request;
   transmit the advertisement content response to the subscriber client device; perform a lookup in the subscriber profile database for the subscriber client device in the plurality and/or the associated subscriber; and
   modify, prior to the respective transmittal, at least one of the advertisement content request and the advertisement content response according to the results of the lookup.

116. Computer software adapted to perform a method for enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network:
   receiving, from a subscriber client device in the plurality, an advertisement content request;
   transmitting the advertisement content request to an advertisement server entity located outside the service provider network;
   receiving, from the advertisement server entity, an advertisement content response in relation to the transmitted advertisement content request;
   transmitting the advertisement content response to the subscriber client device;
   performing a lookup in the subscriber profile database for the subscriber client device in the plurality and/or the associated subscriber; and
   modifying, prior to the respective transmittal, at least one of the advertisement content request and the advertisement content response according to the results of the lookup.

117. A method of enabling advertising content delivery in a telecommunications network, the telecommunications network comprising a service provider network operated by a service provider responsible for providing telecommunications services to a plurality of subscriber client devices each having an associated subscriber, the service provider network comprising a subscriber profile database containing subscriber profile data specific to each subscriber client device and/or associated subscriber, the method comprising, at an entity in the service provider network:
   receiving, from a subscriber client device in the plurality, an advertisement content request;
   transmitting the advertisement content request to an advertisement server entity located inside the service provider network;

receiving, from the advertisement server entity, an advertisement content response in relation to the transmitted advertisement content request;

transmitting the advertisement content response to the subscriber client device;

performing a lookup in the subscriber profile database for the subscriber client device in the plurality and/or the associated subscriber; and modifying, prior to the respective transmittal, at least one of the advertisement content request and the advertisement content response according to the results of the lookup.

118. A method for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the method comprising, at an entity in the service provider network:

logging information associated with browser session traffic to/from one or more subscriber client devices associated with a given subscriber in the plurality and one or more entities located outside the service provider network;

analyzing the logged information in combination with the subscriber profile data contained in the subscriber profile database specific to the given subscriber for the presence of one or more predetermined characteristics; and in response to the analysis indicating the presence of at least one of the one or more predetermined characteristics, initiating delivery of targeted content data associated with the indicated at least one predetermined characteristic to at least one of the one or more subscriber client devices associated with the given subscriber.

119. A method according to clause 118, comprising generating the targeted content data at least on the basis of the identified subscriber profile data and the one or more predetermined characteristics.

120. A method according to clause 118 or 119, comprising generating the targeted content data at least on the basis of data retrieved from a targeted content data database.

121. A method according to clause 120, wherein the targeted content data database is comprised in the service provider network.

122. A method according to any of clauses 118 to 121, comprising generating the targeted content data at least on the basis of data received from a network entity located outside the service provider network.

123. A method according to any of clauses 118 to 122, comprising generating the targeted content data at least on the basis of an identifier associated with the at least one of the one or more subscriber client devices associated with the given subscriber.

124. A method according to clause 123, wherein the identifier relates to a type of the at least one of the one or more subscriber client devices associated with the given subscriber.

125. A method according to clause 123 or 124, wherein the identifier relates to a capability of the at least one of the one or more subscriber client devices associated with the given subscriber.

126. A method according to any of clauses 118 to 125, comprising:

generating first targeted content data on the basis of a first identifier associated with a first subscriber client device associated with the given subscriber; and generating second targeted content data on the basis of a second identifier associated with a second subscriber client device associated with the given subscriber, wherein the initiation comprises initiating delivery of the first targeted content data to the first subscriber client device and initiating delivery of the second targeted content data to the second subscriber client device, and wherein the first targeted content data and the second targeted content data are different.

127. A method according to any of clauses 118 to 126, wherein the initiation comprises transmitting a targeted content availability notification to the at least one subscriber client device, whereby to notify the at least one subscriber client device as to the availability of the targeted content data.

128. A method according to any of clauses 118 to 127, wherein the initiation comprises modifying at least one of a browser session request and a browser session response in an ongoing browser session conducted by the at least one subscriber client device.

129. A method according to clause 128, wherein the modification comprises one or more of:

modifying the browser session response to include the targeted content data, modifying the browser session response to include an instruction to request the targeted content data, modifying the browser session request to include a request for the targeted content data, and modifying a browser session request whereby to trigger the inclusion of an instruction to request the targeted content data in a corresponding browser session response.

130. A method according to clause 128 or 129, wherein the browser session request comprises an HTTP request and/or the browser session response comprises an HTTP response.

131. A method according to any of clauses 118 to 130, wherein the targeted content data comprises a service contract offer.

132. A method according to clause 131, wherein the service contract offer is associated with a telecommunications service provided by the service provider.

133. A method according to any of clauses 118 to 132, wherein the targeted content data comprises one or more of: a web page, a page element, advertisement content, text data, a short message service (SMS) message, an email, content for display via an interactive television, content for display via an electronic billboard, a voicemail, and a telephone call.

134. A method according to any of clauses 118 to 133, wherein the subscriber profile data comprises one or more of: current service contract terms, current service contract duration, and current service contract expiry date.

135. A method according to any of clauses 118 to 134, wherein the analysis comprises analyzing the browser session traffic for accessing of a given website.

136. A method according to any of clauses 118 to 135, wherein the analysis comprises analyzing the browser session traffic for use of a given type of service.

137. A method according to any of clauses 118 to 136, wherein the analysis is performed by an inference engine according to one or more inference rules.

138. A method according to any of clauses 118 to 137, wherein the one or more predetermined characteristics comprise a time and/or a frequency related characteristic.

139. A method according to clause 138, wherein the one or more predetermined characteristics comprise one or more of: a remaining duration of the given subscriber's current service contract, a frequency at which the given subscriber accesses a given website, a frequency at which the given subscriber uses a given type of service, a schedule by which the subscriber accesses a given website, a schedule by which the subscriber uses a given type of service, the time subscriber spends accessing a given website, and the time a subscriber spends using a given service.

140. A method according to any of clauses 118 to 139, comprising, in response to the analysis indicating the presence of at least one of the one or more predetermined characteristics, provisioning the service provider network on the basis of the indicated at least one predetermined characteristic.

141. A method according to any of clauses 118 to 140, wherein the service provider network comprises one or more of: a carrier network, a mobile network, a cellular network, and an internet service provider network.

142. A method according to any of clauses 118 to 141, wherein the service provider network comprises a routing fabric, and wherein the intermediate entity is located in the routing fabric of the service provider network.

143. A method according to any of clauses 118 to 142, wherein the intermediate entity is not comprised by: the subscriber client device, the server entity, a border entity responsible for managing access to a given network part, a gateway entity responsible for translating between network protocols used in different network parts, a caching entity responsible for caching and serving data commonly requested between network parts, or an encoding entity responsible for modifying browser session traffic for efficient routing.

144. Apparatus for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the apparatus comprising at least one processor, and at least one memory including computer program code, the at least one memory and the computer program code being configured to, with the at least one processor, cause the apparatus at least to, at an entity in the service provider network:
  log information associated with browser session traffic to/from one or more subscriber client devices associated with a given subscriber in the plurality and one or more entities located outside the service provider network;
  analyze the logged information in combination with the subscriber profile data contained in the subscriber profile database specific to the given subscriber for the presence of one or more predetermined characteristics; and
  in response to the analysis indicating the presence of at least one of the one or more predetermined characteristics, initiate delivery of targeted content data associated with the indicated at least one predetermined characteristic to at least one of the one or more subscriber client devices associated with the given subscriber.

145. Computer software adapted to perform a method for use in the provision of targeted content data in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the method comprising, at an entity in the service provider network:
  logging information associated with browser session traffic to/from one or more subscriber client devices associated with a given subscriber in the plurality and one or more entities located outside the service provider network;
  analyzing the logged information in combination with the subscriber profile data contained in the subscriber profile database specific to the given subscriber for the presence of one or more predetermined characteristics; and
  in response to the analysis indicating the presence of at least one of the one or more predetermined characteristics, initiating delivery of targeted content data associated with the indicated at least one predetermined characteristic to at least one of the one or more subscriber client devices associated with the given subscriber.

146. A method for use in network provisioning in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the method comprising, at an entity in the service provider network:
  monitoring browser session traffic to/from one or more subscriber client devices associated with a given subscriber in the plurality and one or more entities located outside the service provider network;
  analyzing the monitored browser session traffic in combination with the subscriber profile data contained in the subscriber profile database specific to the given subscriber for the presence of one or more predetermined characteristics; and
  in response to the analysis indicating the presence of at least one of the one or more predetermined characteristics, provisioning the service provider network on the basis of the indicated at least one predetermined characteristic.

147. A method according to clause 146, wherein the provisioning comprises dynamically provisioning the service provider network in response to one or more changes in the subscriber profile data for the given subscriber.

148. A method according to clause 146 or 147, wherein the provisioning comprises dynamically provisioning the service provider network in response to one or more changes in the monitored browser session traffic.

149. A method according to any of clauses 146 to 148, wherein the provisioning of the service provider network is specific to telecommunications services provided to/from the given subscriber.

150. A method according to any of clauses 146 to 148, wherein the provisioning of the service provider network is specific to telecommunications services provided to/from a group of subscribers in the plurality of subscribers, the group of subscribers comprising at least the given subscriber.

151. A method according to any of clauses 146 to 148, wherein the provisioning of the service provider network is specific to telecommunications services provided to/from a given subscriber client device associated with the given subscriber.

152. A method according to any of clauses 146 to 148, wherein the provisioning of the service provider network is specific to telecommunications services provided to/from a group of subscriber client devices, the group of subscriber client devices comprising at least a given subscriber client device associated with the given subscriber.

153. A method according to any of clauses 146 to 152, wherein the provisioning of the service provider network comprises provisioning telecommunications services provisioned to/from a first subscriber client device associated with the given subscriber differently from telecommunication services provisioned to/from a second subscriber client device associated with the given subscriber.

154. A method according to clause 153, wherein the provisioning of the service provider network comprises provisioning telecommunications services on the basis of an identifier stored in the subscriber profile data for at least one of the one or more subscriber client devices associated with the given subscriber.

155. A method according to clause 154, wherein the identifier relates to a type of the at least one of the one or more subscriber client devices associated with the given subscriber.

156. A method according to clause 154 or 155, wherein the identifier relates to a capability of the at least one of the one or more subscriber client devices associated with the given subscriber.

157. A method according to any of clauses 146 to 156, wherein the provisioning of the service provider network comprises allocating a specific bandwidth to the given subscriber.

158. A method according to any of clauses 146 to 156, wherein the provisioning of the service provider network comprises allocating a specific bandwidth to a given subscriber client device associated with the subscriber.

159. A method according to any of clauses 146 to 156, wherein the provisioning of the service provider network comprises allocating a level of priority access to network resources for the given subscriber.

160. A method according to any of clauses 146 to 156, wherein the provisioning of the service provider network comprises allocating a level of priority access to a given subscriber client device associated with the subscriber.

161. A method according to any of clauses 146 to 160, wherein the analysis comprises analyzing the browser session traffic for accessing of a given website.

162. A method according to any of clauses 146 to 161, wherein the analysis comprises analyzing the browser session traffic for use of a given type of service.

163. A method according to any of clauses 146 to 162, wherein the analysis comprises analyzing the browser session traffic for use of a given type of application.

164. A method according to any of clauses 146 to 163, wherein the analysis comprises analyzing the browser session traffic for use of a given type of data.

165. A method according to any of clauses 146 to 164, wherein the analysis is performed by an inference engine according to one or more inference rules.

166. A method according to any of clauses 146 to 165, wherein the one or more predetermined characteristics comprise a time and/or a frequency related characteristic.

167. A method according to any of clauses 146 to 166, wherein the one or more predetermined characteristics comprise one or more of: a frequency at which the given subscriber accesses a given website, a frequency at which the given subscriber uses a given type of service, a schedule by which the subscriber accesses a given website, a schedule by which the subscriber uses a given type of service, the time subscriber spends accessing a given website, and the time a subscriber spends using a given service.

168. A method according to any of clauses 146 to 167, wherein the provisioning of the service provider network comprises transmitting one or more network provisioning instructions to a network provisioning entity within the service provider network.

169. A method according to any of clauses 146 to 167, wherein the provisioning of the service provider network comprises transmitting one or more network provisioning instructions to a network provisioning entity outside of the service provider network.

170. A method according to any of clauses 146 to 169, wherein the provisioning of the service provider network is further performed on the basis of one or more network provisioning rules.

171. A method according to any of clauses 146 to 170, wherein the service provider network comprises one or more of: a carrier network, a mobile network, a cellular network, and an internet service provider network.

172. A method according to any of clauses 146 to 171, wherein the service provider network comprises a routing fabric, and wherein the intermediate entity is located in the routing fabric of the service provider network.

173. A method according to any of clauses 146 to 172, wherein the intermediate entity is not comprised by: the subscriber client device, the server entity, a border entity responsible for managing access to a given network part, a gateway entity responsible for translating between network protocols used in different network parts, a caching entity responsible for caching and serving data commonly requested between network parts, or an encoding entity responsible for modifying browser session traffic for efficient routing.

174. Apparatus for use in network provisioning in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the apparatus comprising at least one processor, and at least one memory including computer program code, the at least one memory and the computer program code being configured to, with the at least one processor, cause the apparatus at least to, at an entity in the service provider network:

monitor browser session traffic to/from one or more subscriber client devices associated with a given subscriber in the plurality and one or more entities located outside the service provider network;

analyze the monitored browser session traffic in combination with the subscriber profile data contained in the subscriber profile database specific to the given subscriber for the presence of one or more predetermined characteristics; and in response to the analysis indicating the presence of at least one of the one or more predetermined characteristics, provision the service provider network on the basis of the indicated at least one predetermined characteristic.

175. Computer software adapted to perform a method for use in network provisioning in a telecommunications network, the telecommunications network comprising a service provider network operated by a service provider responsible for providing telecommunications services to a plurality of subscribers, each subscriber having one or more associated subscriber client devices, the service provider network comprising a subscriber profile database containing subscriber profile data specific to each subscriber in the plurality, the method comprising, at an entity in the service provider network:

monitoring browser session traffic to/from one or more subscriber client devices associated with a given subscriber in the plurality and one or more entities located outside the service provider network;

analyzing the monitored browser session traffic in combination with the subscriber profile data contained in the subscriber profile database specific to the given subscriber for the presence of one or more predetermined characteristics; and in response to the analysis indicating the presence of at least one of the one or more predetermined characteristics, provisioning the service provider network on the basis of the indicated at least one predetermined characteristic.

What is claimed is:

1. A method of provisioning targeted content data in a telecommunications network, the method comprising:

performing a lookup in a subscriber profile database to identify subscriber profile data for at least a given subscriber of a plurality of subscribers, the telecommunications network comprising a service provider network operated by a service provider responsible for providing telecommunications services to the plurality of subscriber, wherein performing the lookup is performed by an entity in the service provider network;

at the entity in the service provider network, generating targeted content data at least on the basis of the identified subscriber profile data; and at the entity in the service provider network, initiating delivery of targeted content data based at least in part on the generated targeted content data to a subscriber client device associated with the given subscriber, by modifying at least one of a browser session request and a browser session response in a browser session of the given subscriber, wherein a browser session of the given subscriber comprises:

at the entity in the service provider network, receiving, from the subscriber client device of the given subscriber, a browser session request;

at the entity in the service provider network, transmitting the browser session request to a server entity located outside the service provider network;

at the entity in the service provider network, receiving, from the server entity, a browser session response in relation to the transmitted browser session request; and at the entity in the service provider network, transmitting the browser session response to the subscriber client device, wherein the modifying is conducted at the entity in the service provider network prior to the respective transmittal of the at least one of the browser session request and the browser session response, and wherein the modifying comprises, at the entity in the service provider network, further modifying the at least one of a browser session request or browser session response according to one or more browser session processing modification rules.

2. The method of claim 1, wherein the browser session request comprises a request for a web page.

3. The method of claim 1, wherein the server entity comprises a publisher server entity, whereby the subscriber client device receives modified web page content.

4. The method of claim 3, comprising, on the basis of the modification, obtaining revenue from a publisher entity associated with the publisher server entity.

5. The method of claim 1, wherein the browser session request comprises a request for one or more web page elements.

6. The method of claim 1, wherein the browser session request comprises a request for advertisement content.

7. The method of claim 6, wherein the server entity comprises an advertisement server entity, whereby the subscriber client device receives modified advertisement content.

8. The method of claim 7, comprising, on the basis of the modification, obtaining revenue from an advertising entity associated with the advertisement server entity.

9. The method of claim 1, wherein the modification comprises one or more of:

deleting a part of the browser session request,
deleting a part of the browser session response,
altering a part of the browser session request,
altering a part of the browser session response,
altering a uniform resource locator (URL) in the browser session request,
altering a uniform resource locator (URL) in the browser session response,
adding to the browser session request, and
adding to the browser session response.

10. The method of claim 1, wherein the modification comprises one or more of:

modifying the browser session request to include data representative of the identity of the service provider, and modifying the browser session request to include data representative of the geographical location of the subscriber client device.

11. The method of claim 1, wherein the modification comprises denying access to at least a part of the content contained within or obtainable via the received browser session response.

12. The method of claim 1, comprising, prior to the modification, querying a rules database to obtain at least one of the one or more browser session processing modification rules, the rules database being located within the service provider network.

13. The method of claim 1, wherein the one or more browser session processing modification rules are remotely configurable.

14. The method of claim 1, comprising, in response to receipt of a rule configuration message, remotely configuring the one or more browser session processing modification rules.

15. The method of claim 1, wherein one or more of the browser session requests comprise an HTTP request and/or one or more of the browser session responses comprise an HTTP response.

16. The method of claim 1, comprising, on the basis of the modification, obtaining revenue from one or more of:
 an entity associated with the server entity,
 the subscriber,
 an advertiser,
 an advertisement broker,
 a third-party data purchaser, and
 the service provider.

17. The method of claim 1, wherein the service provider network comprises one or more of:
 a carrier network,
 a mobile network,
 a cellular network, and
 an internet service provider network.

18. The method of claim 1, wherein the service provider network comprises a routing fabric, and wherein the intermediate entity is located in the routing fabric of the service provider network.

19. A system for use in provisioning targeted content data in a telecommunications network, the system comprising at least one memory including computer program code; and at least one processor in data communication with the at least one memory, wherein the at least one hardware processor is configured to cause the system at least to:
 perform a lookup in a subscriber profile database to identify subscriber profile data for at least a given subscriber of a plurality of subscribers, telecommunications network comprising a service provider network operated by a service provider responsible for providing telecommunications services to the plurality of subscribers, wherein performing the lookup is performed by an entity in the service provider network;
 at the entity in the service provider network, generate targeted content data at least on the basis of the identified subscriber profile data; and
 at the entity in the service provider network, initiate delivery of targeted content data based on at least in part on the generated targeted content data to a subscriber client device associated with the given subscriber, by modifying at least one of a browser session request and a browser session response in a browser session of the given subscriber,
 wherein a browser session of the given subscriber comprises:
  at the entity in the service provider network, transmit the browser session request to a server entity located outside the service provider network;
  at the entity in the service provider network, receive, from the subscriber client device of the given subscriber, a browser session request;
  at the entity in the service provider network, transmit the browser session response to the subscriber client device;
 wherein the modifying is conducted at the entity in the service provider network prior to the respective transmittal of the at least one of the browser session requests and the browser session response, and wherein the modifying comprises, at the entity in the service provider network, further modifying the at least one of a browser session request or browser session response according to one or more browser session processing modification rules.

20. A non-transitory computer-readable storage medium comprising computer-executable instructions which, when executed by a processor, cause a computing device to perform a method for provisioning targeted content data in a telecommunications network, the method comprising:
 performing a lookup in a subscriber profile database to identify subscriber profile data for at least a given subscriber of a plurality of subscribers, the telecommunications network comprising a service provider network operated by a service provider responsible for providing telecommunications services to the plurality of subscriber, wherein performing the lookup is performed by an entity in the service provider network;
 at the entity in the service provider network, generating targeted content data at least on the basis of the identified subscriber profile data; and
 at the entity in the service provider network, initiating delivery of targeted content data based at least in part on the generated targeted content data to a subscriber client device associated with the given subscriber, by modifying at least one of a browser session request and a browser session response in a browser session of the given subscriber,
 wherein a browser session of the given subscriber comprises:
  at the entity in the service provider network, receiving, from the subscriber client device of the given subscriber, a browser session request;
  at the entity in the service provider network, transmitting the browser session request to a server entity located outside the service provider network;
  at the entity in the service provider network, receiving, from the server entity, a browser session response in relation to the transmitted browser session request; and
  at the entity in the service provider network, transmitting the browser session response to the subscriber client device,
 wherein the modifying is conducted at the entity in the service provider network prior to the respective transmittal of the at least one of the browser session request and the browser session response, and
 wherein the modifying comprises, at the entity in the service provider network, further modifying the at least one of a browser session request or browser session response according to one or more browser session processing modification rules.

* * * * *